United States Patent
Dealey et al.

(10) Patent No.: US 12,221,728 B2
(45) Date of Patent: Feb. 11, 2025

(54) KNITTED TEXTILE STRUCTURES FORMED BY ALTERING KNIT PATTERNS TO ACCOMMODATE EXTERNAL MEDIUMS, AND MANUFACTURING PROCESSES ASSOCIATED THEREWITH

(71) Applicant: Meta Platforms Technologies, LLC, Menlo Park, CA (US)

(72) Inventors: Stuart Wayne Dealey, Redmond, WA (US); Gaige DeHaven, Redmond, WA (US); Amy Lynne Stoltzfus, Kirkland, WA (US); Simon John Baines, Redmond, WA (US); Christopher Bradford Doughty, Marysville, WA (US); Priyanshu Agarwal, Kirkland, WA (US); Leah Resneck, Redmond, WA (US); Simge Uzun, Kirkland, WA (US)

(73) Assignee: Meta Platforms Technologies, LLC

( * ) Notice: Subject to any disclaimer, the term of this patent is extended or adjusted under 35 U.S.C. 154(b) by 58 days.

(21) Appl. No.: 18/174,593

(22) Filed: Feb. 24, 2023

(65) Prior Publication Data

US 2023/0376112 A1    Nov. 23, 2023

Related U.S. Application Data

(60) Provisional application No. 63/485,878, filed on Feb. 17, 2023, provisional application No. 63/485,875, (Continued)

(51) Int. Cl.
   *D04B 1/12*    (2006.01)
   *D04B 1/10*    (2006.01)
   (Continued)

(52) U.S. Cl.
   CPC .......... *D04B 1/102* (2013.01); *D04B 1/12* (2013.01); *D04B 1/28* (2013.01); *D04B 37/02* (2013.01); *G06F 3/014* (2013.01)

(58) Field of Classification Search
   CPC .......... D04B 1/123; D04B 1/102; D04B 1/22; D04B 1/28; D04B 1/12; D04B 37/02
   See application file for complete search history.

(56) References Cited

U.S. PATENT DOCUMENTS

| | | | | | |
|---|---|---|---|---|---|
| 3,964,277 | A | * | 6/1976 | Miles | D04B 1/123 66/190 |
| 4,715,235 | A | * | 12/1987 | Fukui | G01D 5/16 600/595 |

(Continued)

FOREIGN PATENT DOCUMENTS

| | | | | |
|---|---|---|---|---|
| WO | WO-2020081557 A1 | * | 4/2020 | ............. D04B 21/14 |
| WO | 2021113864 A1 | | 6/2021 | |
| WO | WO-2023164189 A1 | * | 8/2023 | ........... A61B 5/1114 |

OTHER PUBLICATIONS

International Search Report and Written Opinion for International Application No. PCT/US2023/013905, mailed May 31, 2023, 10 pages.

(Continued)

*Primary Examiner* — Danny Worrell
(74) *Attorney, Agent, or Firm* — Morgan, Lewis & Bockius LLP

(57) ABSTRACT

An example method of manufacturing a knitted fabric that includes a non-knitted structure occurs in accordance with a programmed knit sequence for a multi-dimensional knitting machine. The method includes, providing a non-knitted structure to the multi-dimensional knitting machine at a point in time when a fabric structure has a first knit portion, wherein the first knit portion is formed based on a first type of knit pattern. The method also includes, after the providing (Continued)

of the non-knitted structure, following the programmed knit sequence to automatically adjust the multi-dimensional knitting machine to use a second type of knit pattern, distinct from a first type of knit pattern, to accommodate the non-knitted structure within a second knit portion that is adjacent to the first knit portion within the fabric structure.

18 Claims, 33 Drawing Sheets

Related U.S. Application Data filed on Feb. 17, 2023, provisional application No. 63/485,882, filed on Feb. 17, 2023, provisional application No. 63/485,880, filed on Feb. 17, 2023, provisional application No. 63/314,199, filed on Feb. 25, 2022.

(51) Int. Cl.
*D04B 1/28* (2006.01)
*D04B 37/02* (2006.01)
*G06F 3/01* (2006.01)

(56) References Cited

U.S. PATENT DOCUMENTS

| | | | | |
|---|---|---|---|---|
| 4,988,981 A * | 1/1991 | Zimmerman | ........ | A61B 5/1127 434/45 |
| 5,615,562 A * | 4/1997 | Roell | ........ | D04B 1/22 66/84 R |
| 6,151,922 A * | 11/2000 | Shimasaki | ........ | D04B 1/02 66/61 |
| 6,341,504 B1 * | 1/2002 | Istook | ........ | A61B 5/6805 66/172 E |
| 6,941,775 B2 * | 9/2005 | Sharma | ........ | D04B 1/123 66/171 |
| 7,377,133 B2 * | 5/2008 | Sandbach | ........ | H01H 3/141 66/170 |
| 7,779,656 B2 * | 8/2010 | Dias | ........ | D04B 1/246 66/171 |
| 7,878,030 B2 * | 2/2011 | Burr | ........ | G06F 1/163 66/175 |
| 8,034,001 B2 * | 10/2011 | Gal | ........ | A61B 5/091 600/536 |
| 8,443,634 B2 * | 5/2013 | Scheffler | ........ | A61B 5/6805 66/170 |
| 8,839,532 B2 * | 9/2014 | Huffa | ........ | A43B 1/04 36/25 R |
| 9,032,762 B2 * | 5/2015 | Begriche | ........ | D04B 1/22 66/171 |
| 9,211,085 B2 * | 12/2015 | Streeter | ........ | A61B 5/6831 |
| 9,226,540 B2 * | 1/2016 | Podhajny | ........ | D04B 1/22 |
| 9,375,046 B2 * | 6/2016 | Meir | ........ | D04B 1/123 |
| 9,416,470 B2 * | 8/2016 | Shoshani | ........ | D04B 1/18 |
| 9,644,291 B1 * | 5/2017 | Kuo | ........ | D04B 1/123 |
| 9,850,600 B2 * | 12/2017 | Gal | ........ | D04B 21/06 |
| 10,323,344 B2 * | 6/2019 | Hartmann | ........ | D04B 15/56 |
| 10,385,487 B2 * | 8/2019 | Jeon | ........ | D03D 15/00 |
| 10,753,018 B2 * | 8/2020 | Kuo | ........ | D04B 15/90 |
| 10,753,021 B2 * | 8/2020 | Nurkka | ........ | A61B 5/6805 |
| 10,791,791 B2 * | 10/2020 | Cox | ........ | A43B 23/0245 |
| 11,047,076 B2 * | 6/2021 | Aceves Tinajero | .... | D04B 1/123 |
| 11,198,961 B2 * | 12/2021 | Chathuranga Perera | ........ | D04B 21/14 |
| 11,414,796 B2 * | 8/2022 | Meir | ........ | D04B 15/56 |
| 11,725,312 B2 * | 8/2023 | Meir | ........ | D04B 7/14 66/190 |
| 11,891,733 B2 | 2/2024 | Chahine | ........ | A61B 5/01 |
| 11,913,147 B2 * | 2/2024 | Marchesi | ........ | D04B 1/12 |
| 2009/0018428 A1 | 1/2009 | Dias et al. | | |
| 2012/0293410 A1 * | 11/2012 | Bell | ........ | G06F 3/014 345/158 |
| 2015/0366504 A1 | 12/2015 | Connor | | |
| 2019/0352808 A1 * | 11/2019 | Yoon | ........ | D02G 3/441 |
| 2021/0251309 A1 | 8/2021 | Tang et al. | | |
| 2022/0413610 A1 * | 12/2022 | Namikawa | ........ | G06F 3/014 |
| 2023/0136447 A1 * | 5/2023 | Riaz | ........ | D04B 15/10 66/171 |
| 2023/0376112 A1 * | 11/2023 | Dealey | ........ | G06F 3/011 |

OTHER PUBLICATIONS

Non-Final Office Action mailed Nov. 27, 2023 for U.S. Appl. No. 18/174,592, filed Feb. 24, 2023, 11 pages.

Notice of Allowance mailed Mar. 27, 2024 for U.S. Appl. No. 18/174,592, filed Feb. 24, 2023, 9 pages.

* cited by examiner

KNITTED TEXTILE STRUCTURES FORMED BY ALTERING KNIT PATTERNS TO ACCOMMODATE EXTERNAL MEDIUMS, AND MANUFACTURING PROCESSES ASSOCIATED THEREWITH

RELATED APPLICATIONS

This application claims priority from U.S. Provisional Application Ser. No. 63/485,878, filed on Feb. 17, 2023, U.S. Provisional Application Ser. No. 63/485,875, filed on Feb. 17, 2023, U.S. Provisional Application Ser. No. 63/485,880, filed on DATE, and U.S. Provisional Application Ser. No. 63/485,882, filed on Feb. 17, 2023. Each of these applications is hereby incorporated by reference in its respective entirety.

This application also claims priority from U.S. Provisional Application Ser. No. 63/314,199, filed Feb. 25, 2022, which is hereby incorporated by reference in its entirety (the contents of this provisional application are also attached to this application in Appendix A).

TECHNICAL FIELD

This patent generally relates to fabrics used in wearable devices that include embedded electronics and corresponding manufacturing processes of these fabrics. The embedded electronics can be configured to provide inputs and other information about a wearer to an artificial-reality headset for interacting with an artificial-reality environment. These fabrics are made using specialized hardware for creating lightweight and seamless materials that are comfortable to wear for extended periods of time.

BACKGROUND

When interacting with an artificial reality viewed at an artificial-reality headset, input devices and sensors are needed to interact with those environments. While controllers and other devices can be used to interact with those environments, they tend to reduce immersion into the artificial-reality environment. Thus, there is a need to have devices that do not detract from immersive aspects of the artificial-reality environment. While glove-worn wearable devices seek to improve these interactions, traditional glove-worn wearable devices can be large and cumbersome and can also hinder movements, which also leads to a reduction in immersive experiences. For example, glove-worn wearable devices can include multiple layers for each different subset of components for the glove-worn wearable devices. Multiple layers can also prove to be uncomfortable for extended use periods, i.e., when interacting with an artificial-reality environment.

Furthermore, integrating electronic components with soft wearable devices can be a difficult challenge. Thus, some wearable devices make use of electronic components that are separately attached to soft components of the wearable devices and are not integrated with or embedded into the soft components. This can increase bulkiness of the wearable devices and also lead to latency issues and other performance drawbacks.

As such, there is a need to address one or more of the above-identified challenges. A brief summary of solutions to the issues noted above are described below.

SUMMARY

The devices, methods, systems, and manufacturing processes described herein solve one or more of the deficiencies or drawbacks described above by allowing for wearable devices that are configured to interact with artificial-reality environments to be as lightweight and as comfortable as possible. The techniques described herein also allow for integrating some of the electronic devices (e.g., integrated circuits for detecting and/or processing inputs provided by a user) directly into the fabrics (e.g., by making the electrical components structural parts of the fabric) provides much more comfortable and lighter wearable devices. Manufacturing these types of fabrics can also be difficult, especially when mass produced, which is one reason as to why the methods of manufacturing described herein using a multi-dimensional knitting machine are beneficial for encouraging wider adoption and acceptance of artificial-reality systems.

One example of a garment-integrated capacitive sensor that can be used to detect inputs (e.g., force-based or contact-based inputs detected based on changes in capacitance at the capacitive sensor that is garment-integrated) is described. The garment-integrated capacitive sensor comprises a first knitted conductive electrode layer that is constructed using an insulated conductive fabric (e.g., insulated conductive fabric can be made with a compressible/stretchable core (e.g., elastane, thermoplastic polyurethane (TPU)) that enables deformation at a yarn level, which enhances performance of the capacitive sensor. In some embodiments, high surface area insulated conductors (e.g., enamel coated copper foil, etc.) wrapped around the core can further improve sensor performance. In some embodiments, silver-copper alloy wires/foils provide balanced performance when electrical conductivity, cost, and fatigue resistance are considered compared to pure copper, tin copper alloy, and silver copper alloy). The first knitted conductive electrode layer has a first surface. The garment-integrated capacitive sensor also comprises a second knitted conductive electrode layer that is constructed using a non-insulated conductive fabric containing a second surface, the second surface configured to be directly in contact with the first surface to produce a garment-integrated capacitive sensor. In some embodiments, the garment-integrated capacitive sensor is configured to be in communication with a processor, and is configured to receive a sensed value from the garment-integrated capacitive sensor.

Having summarized the first aspect generally related to use of a garment-integrated capacitive sensor that can be used to detect inputs, the second aspect generally related to a method of manufacturing a knitted fabric that includes a non-knitted structure is now summarized.

One example method of manufacturing a knitted fabric that includes a non-knitted structure includes, while knitting a fabric structure in accordance with a programmed knit sequence for a V-bed knitting machine (e.g., or any other suitable multi-dimensional knitting machine): providing a non-knitted structure to the V-bed knitting machine at a point in time when the fabric structure has a first knit portion. The first knit portion is formed based on a first type of knit pattern, and, after the providing of the non-knitted structure, the method includes following the programmed knit sequence to automatically adjust the V-bed knitting machine to use a second type of knit pattern, distinct from the first type of knit pattern, to accommodate the non-knitted structure within a second knit portion that is adjacent to the first knit portion within the fabric structure.

Having summarized the second aspect generally related to use of a method of manufacturing a knitted fabric that includes a non-knitted structure above, a third aspect that generally relates to knitting a dual-density fabric that includes an over-molded structure is now summarized.

In an example method of knitting a dual density fabric, the method includes, while knitting a fabric structure in accordance with a programmed knit sequence for a V-bed knitting machine (or other multi-dimensional knitting machine): knitting a first portion of the fabric structure with a first fabric density to include a three-dimensional pocket, and automatically adjusting the V-bed knitting machine based on the programmed knit sequence to knit a second portion of the fabric structure with a second fabric density, distinct from the first fabric density, that is adjacent to the first portion within the fabric structure. In some embodiments, the second portion is knitted first. For example, knitting the second portion of the fabric structure with the second fabric density, and automatically adjusting the V-bed knitting machine based on the programmed knit sequence to knit the first portion of the fabric structure to include a three-dimensional pocket with the first fabric density, distinct from the second fabric density, that is adjacent to the first portion within the fabric structure. The method also includes over molding a polymer structure into the three-dimensional pocket, where the second portion of the fabric structure is temporarily secured to device configured to attach the overmolded structure into the three-dimension pocket. The method also includes, removing the second portion of the fabric structure.

Having summarized the third aspect generally related to use of knitting a dual density fabric that includes an overmolded structure, a fourth aspect generally related to wearable devices that include a conductive deformable fabric is now summarized.

An example wearable device comprises a conductive deformable fabric, and the conductive deformable fabric comprises a conductive trace that has a non-extendable fixed length along a first axis. The conductive trace is knitted into a fabric structure to produce a conductive deformable material. The fabric structure includes a stitch pattern that facilitates the conductive trace to unfold and fold in an oscillating fashion to allow the conductive trace to expand and contract, respectively, along the first axis without exceeding the fixed length (or substantially without exceeding the fixed length such that the conductive trace does not receive a stretching or twisting force) of the conductive trace, and the conductive deformable material is positioned within the wearable device such that when the wearable device is worn, the stitch pattern is over a joint of the user to allow the stitch pattern to expand or contract along with the movement of the joint.

Descriptions provided herein focus on glove-worn wearable devices that can be used to control artificial-reality environments, but it will be understood by one of skill in the art upon reading this disclosure that many examples of wearable devices will benefit from the techniques described herein, including other wearable devices such as articles of clothing (headbands, shirts, sweatshirts, athletic pants, socks, among others). One of skill in the art upon reading this disclosure will also appreciate that, while the primary example used in conjunction with the manufacturing or assembly processes is a V-bed knitting machine, the techniques described herein are applicable to any multi-dimensional knitting machine.

The features and advantages described in the specification are not necessarily all inclusive and, in particular, certain additional features and advantages will be apparent to one of ordinary skill in the art in view of the drawings, specification, and claims. Moreover, it should be noted that the language used in the specification has been principally selected for readability and instructional purposes.

Having summarized the above example aspects, a brief description of the drawings will now be presented.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

Figure 1A:
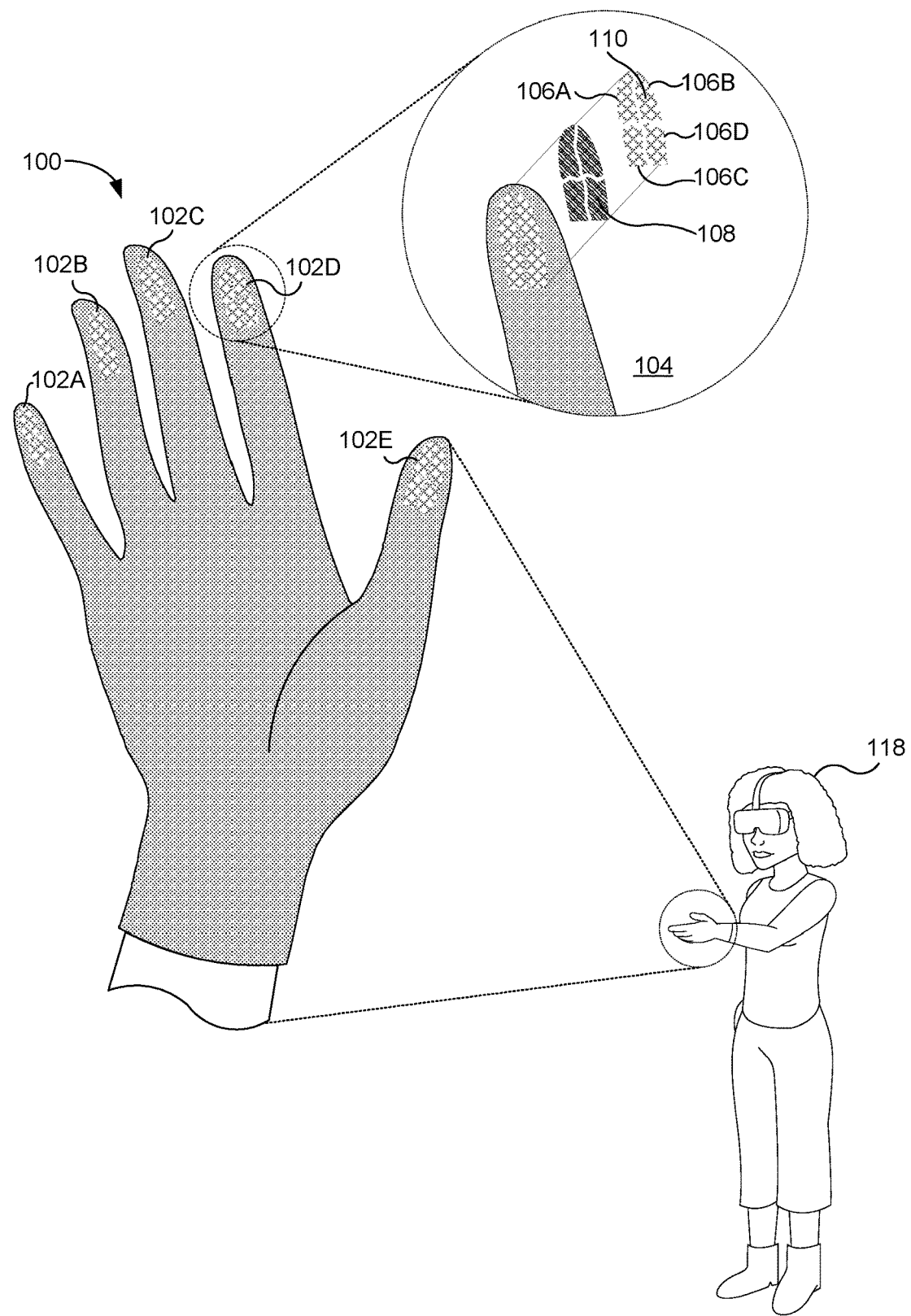
FIGS. 1A-1E illustrate knitted wearable-glove devices that include one or more garment-integrated capacitive sensors (e.g., which can be configured to detect force-based and contact-based inputs from fingers of a user, and can do so in various quadrants for a finer-grain detection of such inputs), in accordance with some embodiments.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

BRIEF DESCRIPTION OF THE APPENDIX

Attached to this specification is an Appendix A that includes figures and associated descriptive text for conductive yarns (and knit fabrics formed in part using the conductive yarns or other yarns), forming electrical connections to textile electrodes, and laser cutting certain fabrics (and other manufacturing processes). These aspects can be combined, substituted, or otherwise in conjunction with the other aspects described herein.

DETAILED DESCRIPTION

Numerous details are described herein to provide a thorough understanding of the example embodiments illustrated in the accompanying drawings. However, some embodiments may be practiced without many of the specific details. Furthermore, well-known processes, components, and materials have not necessarily been described in exhaustive detail so as to avoid obscuring pertinent aspects of the embodiments described herein.

Embodiments of this disclosure can include or be implemented in conjunction with various types or embodiments of artificial-reality systems. Artificial reality, as described herein, is any superimposed functionality and or sensory-detectable presentation provided by an artificial-reality system within a user's physical surroundings. Such artificial realities (AR) can include and/or represent virtual reality (VR), augmented reality, mixed artificial reality (MAR), or some combination and/or variation one of these. For example, a user can perform a swiping in-air hand gesture (which can be detected using aspects of the knitted structures described herein) to cause a song to be skipped by a song-providing API providing playback at, for example, a home speaker. In some embodiments of an AR system, ambient light (e.g., a live feed of the surrounding environment that a user would normally see) can be passed through a display element of a respective head-wearable device presenting aspects of the AR system. In some embodiments, ambient light can be passed through respective aspect of the AR system. For example, a visual user interface element (e.g., a notification user interface element) can be presented at the head-wearable device, and an amount of ambient light (e.g., 15-50% of the ambient light) can be passed through the user interface element, such that the user can distinguish at least a portion of the physical environment over which the user interface element is being displayed.

Artificial-reality content can include completely generated content or generated content combined with captured (e.g., real-world) content. The artificial-reality content can include video, audio, haptic events, or some combination thereof, any of which can be presented in a single channel or in multiple channels (such as stereo video that produces a three-dimensional effect to a viewer). Additionally, in some embodiments, artificial reality can also be associated with applications, products, accessories, services, or some combination thereof, which are used, for example, to create content in an artificial reality and/or are otherwise used in (e.g., to perform activities in) an artificial reality.

As described herein, multi-dimensional knitting machines can be leveraged to produce complex knitted structures that include integrating non-knitted structures, adjusting knit patterns and gauges without producing a seam, creating complex garments (e.g., gloves) without requiring the complex garments to be reoriented, etc. While numerous descriptions provided herein reference knitted-fabric structures produced using yarn, the same techniques that are applied to these knitted fabric structures can also be applied to woven-fabric structures.

FIGS. 1A-1E illustrate knitted wearable-glove devices that includes one or more garment-integrated capacitive sensors (e.g., which can be configured to detect force-based and contact-based inputs from fingers of a user 118, and can do so in various quadrants for a finer-grain detection of such inputs), in accordance with some embodiments. The knitted wearable-glove device 100 includes a one or more garment-integrated capacitive sensor assemblies 102A-102E in each respective fingertip (and thumb tip (hereinafter finger and fingertip are also used to refer to a thumb and thumb tip)) of the knitted wearable-glove device. Each of the one or more garment-integrated capacitive sensor assemblies 102A-102E includes multiple contact regions on each of the respective garment-integrated capacitive sensors (e.g., each respective capacitive sensor includes four distinct contact quadrants, but various other numbers of contact regions are also contemplated). For example, FIG. 1A shows an exploded view 104 that shows garment-integrated capacitive sensor assembly 102D having four distinct garment-integrated capacitive sensor contact regions 106A-106D, where each respective contact region of each respective garment-integrated capacitive sensor can be used to a value of capacitance. These garment-integrated capacitive sensors can be used to determine finely applied forces (e.g., finger rolling on a surface), which can be used for providing inputs to control an artificial-reality environment.

As will be explained in further detail in conjunction with describing subsequent figures, the one or more garment-integrated capacitive-sensor assemblies 102A-102E in each respective fingertip are seamlessly integrated with knitted wearable-glove device 100. This seamless nature is illustrated in exploded view 104, and the exploded view 104 shows that the one or more garment-integrated capacitive sensor assemblies are each constructed from two knitted layers. The first-knitted-conductive-electrode layer 108 is constructed using an insulated-conductive fabric and the second-knitted-conductive-electrode layer 110 is constructed using a non-insulated-conductive fabric containing. When combined, the first-knitted-conductive electrode layer 108 is configured to be directly in contact with the second-knitted-conductive-electrode layer 110 to produce a garment-integrated capacitive sensor. While the second-knitted-conductive-electrode layer 110 is shown as being the external layer (i.e., on the exterior of the glove 100) in the example embodiment of FIG. 1A, an opposite arrangement would also work (i.e., the insulated layer is non-external layer) in some other embodiments.

Figure 1B:
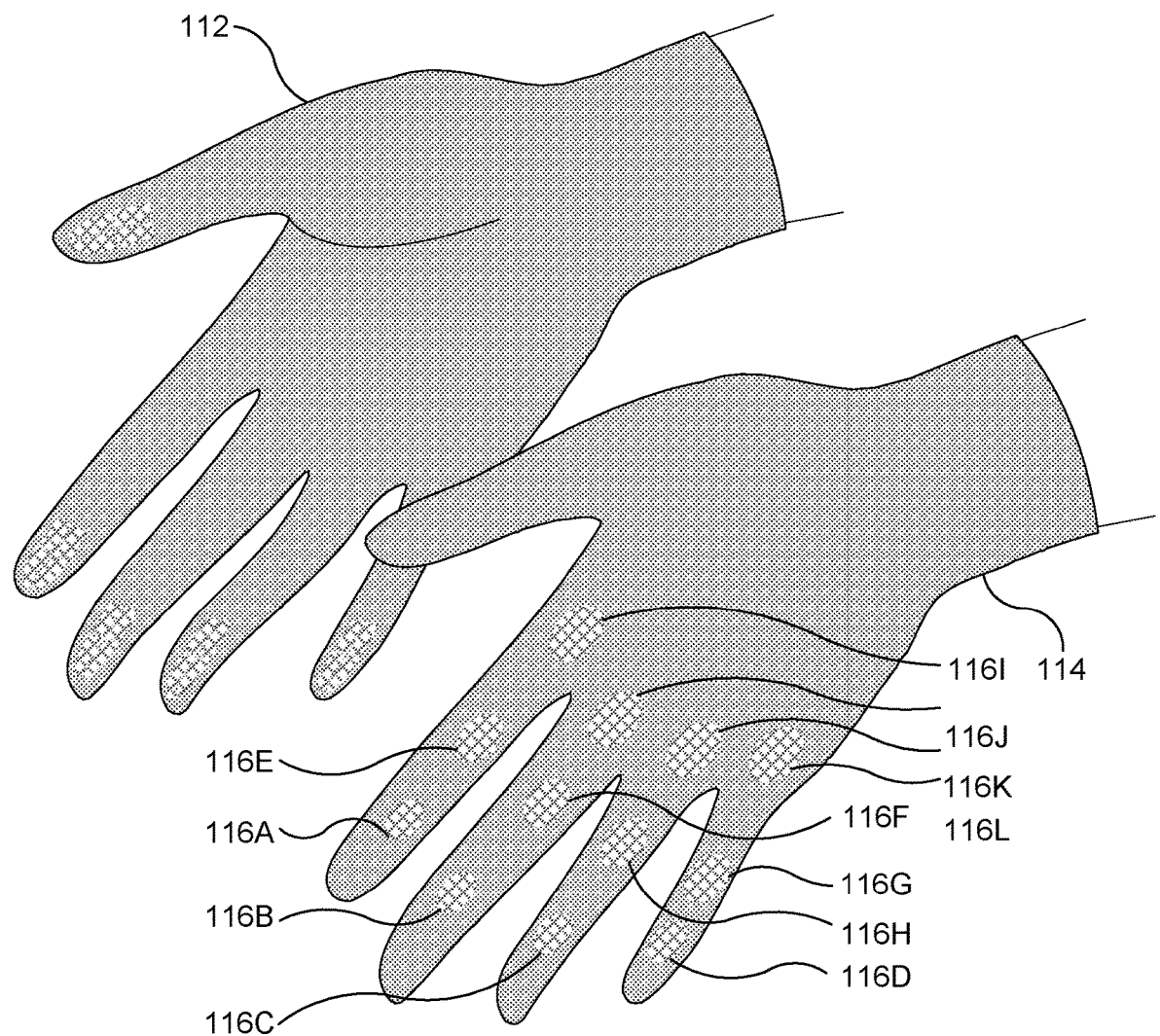

Turning now to FIG. 1B, shown there is a pair of knitted wearable-glove devices 100, where one glove is shown from a perspective view that depicts a palmar side of the knitted wearable-glove device 100 and the other glove is shown from a perspective view that depicts a dorsal side of the knitted wearable-glove device 100. The first glove 112 illustrating the palmar side shown was discussed above in reference to FIG. 1A. The second glove 114 illustrating the dorsal side is now described. The second glove 114 illustrating the dorsal side shows additional garment-integrated capacitive sensors 116A-116L being disposed on one of its surfaces. As shown in this example, the capacitive sensors can be located proximate to (e.g., within 0.2-5 mm of, or directly over) on the user's joints (e.g., knuckles), such that the capacitive sensors can be used to measure bending/stretching occurring at or near the joints. As will be discussed further below, the knitted wearable-glove device 100 (including the garment-integrated capacitive sensors) can be produced by a multi-dimensional knitting machine (e.g., v-bed or x-bed knitting machines), allowing for the knitted wearable-glove device 100 that includes one or more garment-integrated capacitive sensors to be produced in a single knitting process (e.g., the wearable glove does not need to be removed from the knitting machine to be reoriented or completed). In some embodiments, additional garment-integrated capacitive sensors are located on the thumb portion of the glove as well as on the palm and wrist to provide additional input areas or sensor-detection regions to allow for further flexibility in interacting with artificial-reality environments.

Figure 1C:
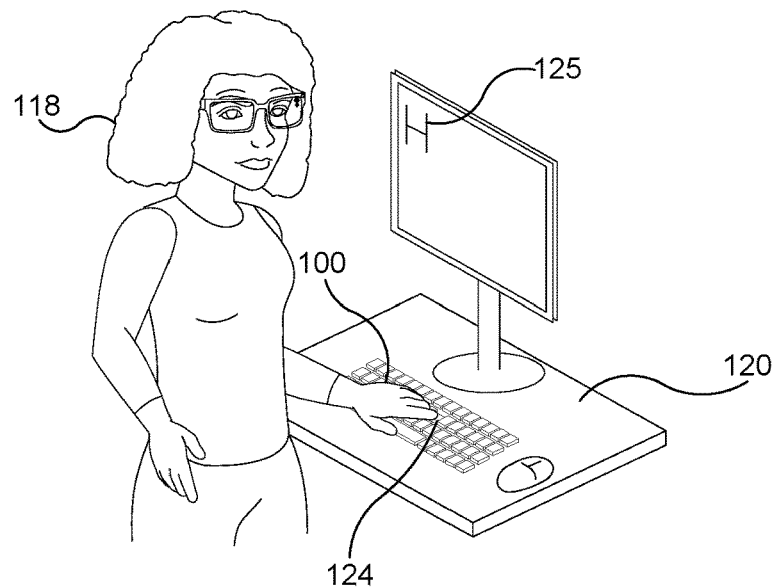
Figure 1C:
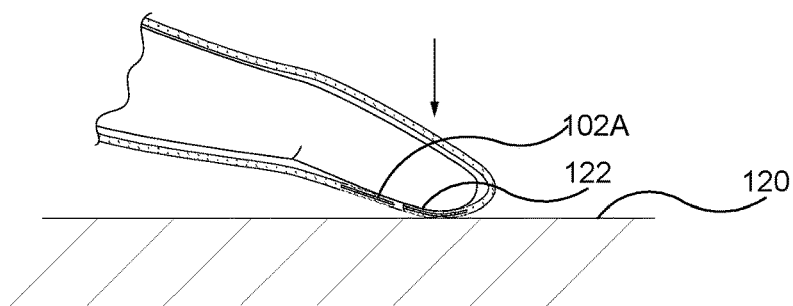
Figure 1C:
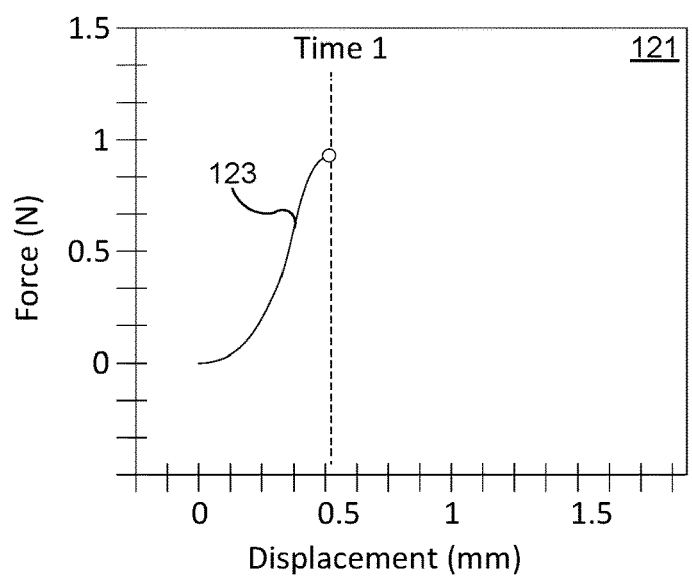
Figure 1D:
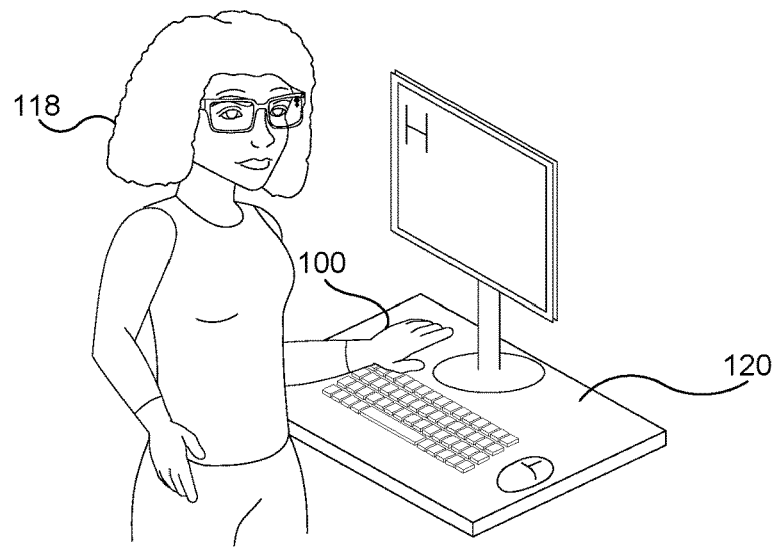
Figure 1D:
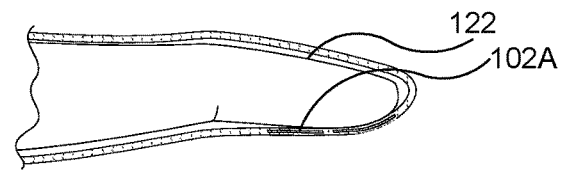
Figure 1D:
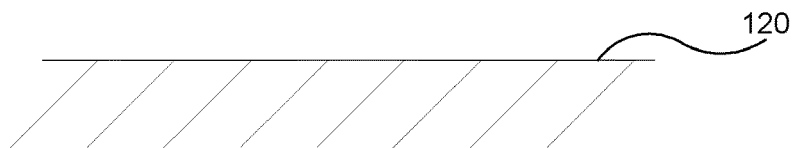
Figure 1D:
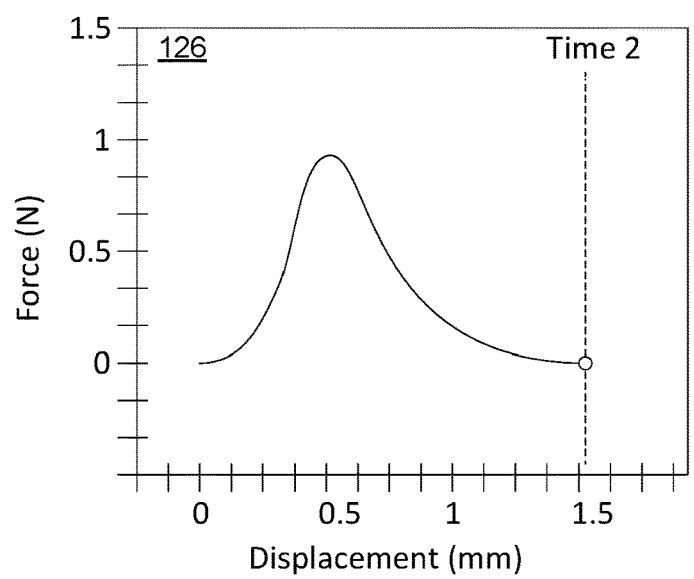

In one example, the soft capacitive sensors that are integrated with the gloves of FIGS. 1A and 1B can be used to assist with typing operations. This is shown in FIGS. 1C and 1D, which illustrate an example of using data provided by the one or more garment-integrated capacitive sensors to provide an input to a user interface presented in an artificial-reality environment. FIG. 1C shows a user 118 wearing the knitted wearable-glove device 100 pressing down on a surface 120 (e.g., a desk). The one or more garment-integrated capacitive sensor assemblies 102A-102E provide data (e.g., respective capacitance measurements resulting from the user pressing down on the surface 120, which measurements can be divided into the various contact regions of each of the capacitive sensors, as was noted above) indicating that a force is being applied to the fingertip 122 of the knitted wearable-glove device 100. The measurement data can then be used to calculate force values, as is shown by curve 123 in plot 121, which illustrates the detected force being received in response to a touch event. FIG. 1C also shows that in response to the force being applied to the fingertip 122 of the knitted wearable-glove device 100, an input on a virtual key of a virtual keyboard 124 is provided to the virtual display (e.g., indicated by the letter "H" 125 being displayed).

FIG. 1D shows a user 118 who is wearing the knitted wearable-glove device 100 no longer pressing down on surface 120 (e.g., a desk). In response to no longer pressing down on the surface 120, one or more garment-integrated capacitive sensor assemblies 102A-102E provide data (e.g., a respective capacitance measurement) indicating that a force is not being applied to the fingertip 122 of the knitted wearable-glove device 100. The measurement data can then be used to calculate force value, as is shown in plot 126, which illustrates the detected force being received in response to a touch event ending. The detected force is now, as a result, less than the calculated force shown in plot 121 in FIG. 1C.

Figure 1E:
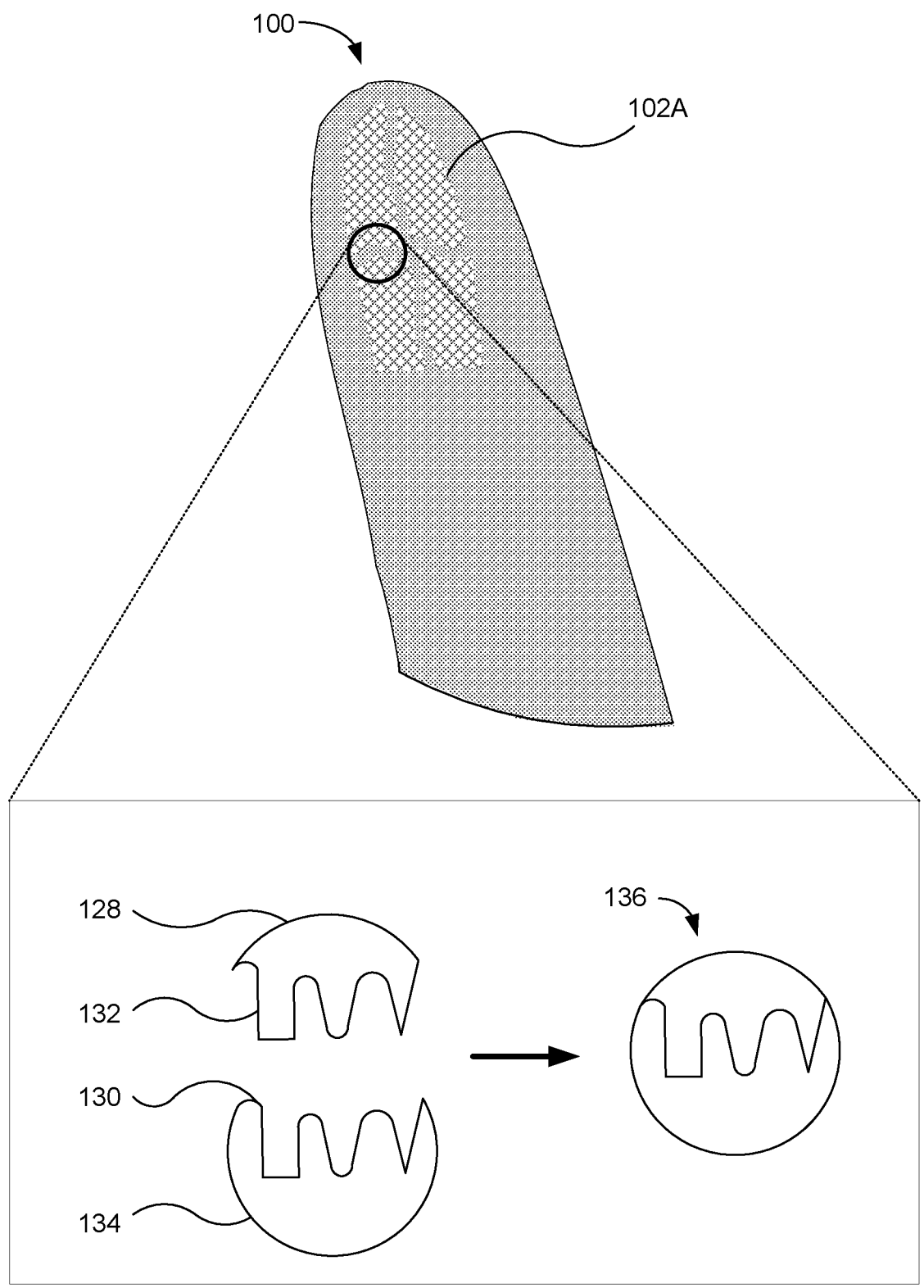

FIG. 1E illustrates a lock-and-key knitting technique, which can be utilized to increase contact surface area of one or more adjacent garment-integrated capacitive sensor assemblies (e.g., 102A-102E shown in FIG. 1A). FIG. 1E shows two different garment-integrated capacitive sensor assemblies (e.g., a first garment-integrated capacitive sensor 128 and a second garment-integrated capacitive sensor 130) where first garment-integrated capacitive sensor 128 terminates with a first pattern 132 (e.g., a key) and the second garment-integrated capacitive sensor 130 terminates with a second pattern 134 (e.g., a lock) that corresponds to the first pattern (e.g., an opposite pattern than the first pattern). While described in this example as used to knit two sensor assemblies together, it should be understood that the lock-and-key knitting technique can also be used to knit two contact regions within a single sensor assembly together.

FIG. 1E also shows the first garment-integrated capacitive sensor 128 and the second garment-integrated capacitive sensor 130 pieced together in combined garment-integrated capacitive sensor assembly 136. In some embodiments, this lock-and-key structure improves knit resolution by taking advantage of the three-dimensional nature of the knits. In some embodiments, this lock-and-key structure increases a surface area of contact between the first-knitted-conductive electrode layer 108 and the second-knitted-conductive-electrode layer 110 of the one or more garment-integrated capacitive sensor assemblies 102A-102E.

Figure 2:
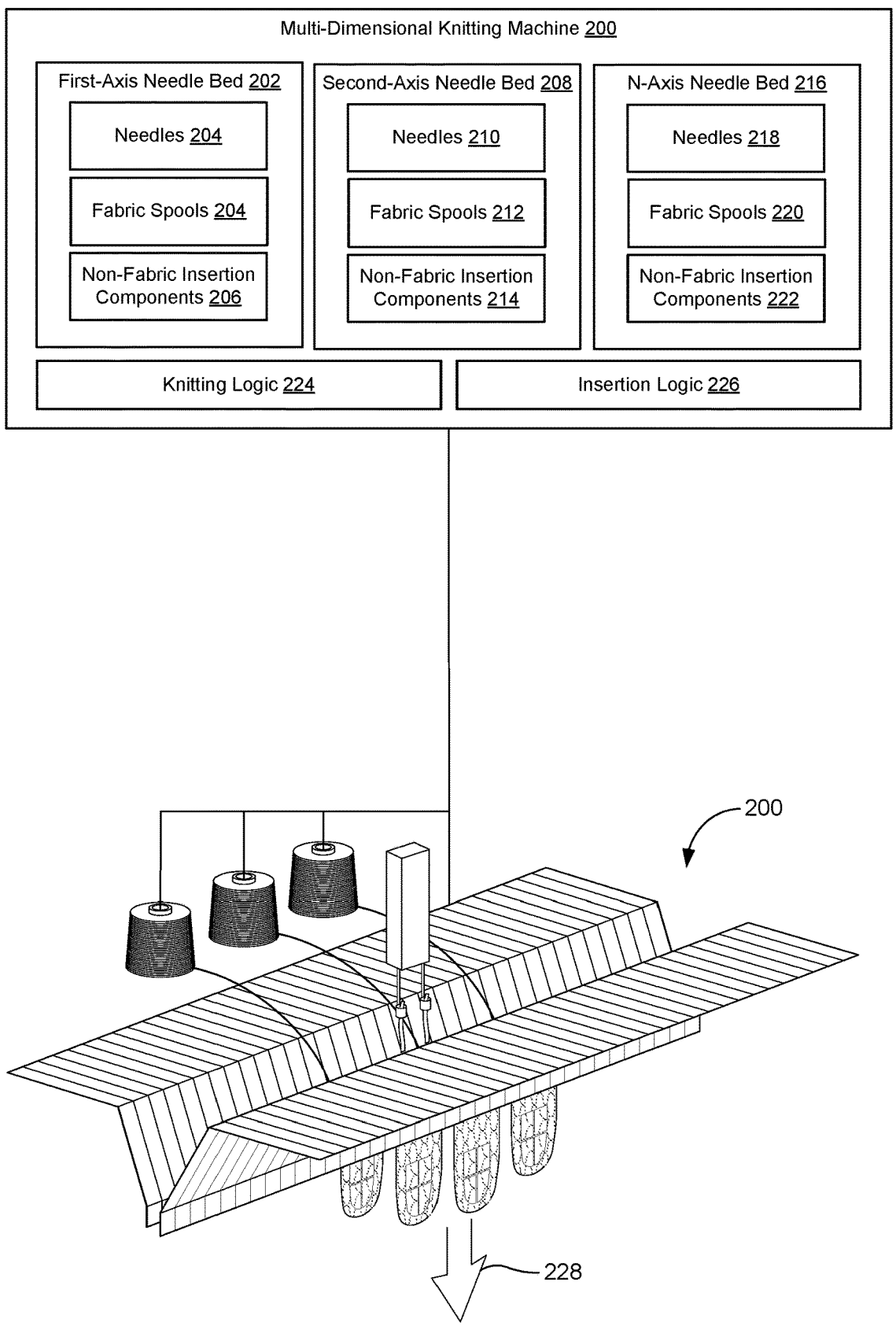
FIG. 2 illustrates a multi-dimensional knitting machine configured to produce multi-dimensional knitted garments in an automated fashion (e.g., with the needing for any hand knitting or other user intervention after initiating the knitting process, including allowing for having an electronic component automatically knitted as an integrated component of the multi-dimensional knitted garments), in accordance with some embodiments.

Attention is now directed to FIG. 2, which illustrates a multi-dimensional knitting machine configured to produce multi-dimensional knitted garments in an automated fashion (e.g., with the needing for any hand knitting or other user intervention after initiating the knitting process, including allowing for having an electronic component automatically knitted as an integrated component of the multi-dimensional knitted garments), in accordance with some embodiments. The multi-dimensional knitting machine 200 is a garment-producing device that is computer controlled and user programmable to allow for complex knitted structures to be produced (e.g., gloves, tubular fabrics, fabrics with embedded electronic devices, complex knit patterns, special stretch characteristics, unique pattern structures, multi-thread structures, etc.,). The multi-dimensional knitting machine 200 includes a first-axis needle bed 202, a second-axis needle bed 208, and N-axis needle bed (indicating more than three needle beds are possible). Each one of these needle beds (e.g., needles 204, needles 210, and needles 218) is configured to use multiple different types of knit patterns (e.g., jersey knits, rib knits, interlock knits, French-terry knits, fleece knits, etc.,) based on a programmed sequence providing to the multi-dimensional knitting machine 200, and variations of these knits can be employed to form a single continuous garment (e.g., a combination of jersey knits and French terry knit and/or a first variation of a jersey knit and a second variation of a jersey knit). In some embodiments, the variations of these knits in a single continuous garment can be done without producing seams (e.g., a seamless wearable device can be produced). In some embodiments, the knitting machine is further configured to layer fabrics to produce multilayered wearable structures (e.g., to house one or more electronic components). In some embodiments, each layer in a multilayered wearable structure can be made from a different fabric, which in one example is produced using a conductive yarn. For example, a two-layer knitted capacitive sensor can be produced using the multi-dimensional knitting machine 200, where the first layer and the second layer use different thread (e.g., a coated-conductive thread and an uncoated-conductive thread). A plurality of fabric spools (e.g., fabric spools 204, fabric spools 212, and fabric spools 220) can be included for each one of the needle beds. Multiple types of fabric spools can be used for each needle bed allowing for even more complex woven structures (also referred to as garments) to be produced. In some embodiments, the fabric spools can also include elastic thread allowing for stretchable fabrics and/or fabrics with shape memory to be produced.

Each of the needle beds discussed above can also include one or more non-fabric insertion components (e.g., non-fabric insertion components 206, non-fabric insertion components 214, and non-fabric insertion components 222) that are configured to be used to allow for insertion of non-fabric structures into the needle beds, such that the non-knitted structure can be knitted into the knitted structure, while the knitted structure (e.g., garment) is being produced. For example, non-fabric structures can include flexible printed circuit boards, rigid circuit boards, conductive wires, structural ribbing, sensors (e.g., neuromuscular signal sensors, light sensors, PPG sensors, etc.,), etc. In some embodiments, a stitch pattern can be adjusted by the multi-dimensional knitting machine (e.g., in accordance with a programmed sequence of knit instructions provided to the machine) to accommodate these structures, which, in some embodiments, means that these structures are knitted into the fabric, instead of being sewn on top of a knitted fabric. This allows for garments to be lighter, thinner, and more comfortable to wear (e.g., by having fewer protrusions applying uneven pressure to the wearer's skin). In some embodiments, these multi-dimensional knitting machines can also knit knitted structures along either or both of a vertical axis or a horizontal depending on desired characteristics of the knitted structure. Knitting along a horizontal axis means that the garment would be produced from a left side to a right side (e.g., a glove would be produced starting with the pinky finger, then moving to the ring finger, then middle finger, etc. (e.g., as shown in the example sequence of FIG. 3B)). Sewing on the vertical means that the garment is produced in a top-down fashion (e.g., a glove would be produced starting from the top of the tallest finger and move down to the wrist portion of the glove (e.g., as shown by 228 in FIG. 2)). With respect to the glove examples, a reverse manufacturing process is also contemplated (e.g., knitting a thumb first when knitting on the horizontal and knitting the wrist portions when knitting on the vertical). In some embodiments, the insertion component can feed the non-knitted structure to the knitting machine or, in some other embodiments, the insertion component is fed through the knitting machine with the non-knitted structure. In the latter, the insertion component is not integrated into the garment and is discarded. In some embodiments, the insertion component is not fed at all, but is an integrated component of the multi-dimensional knitting machine that is activated based on a programming knit sequence to then allow for insertion of a non-knitting component into a knitted structure.

The multi-dimensional knitting machine 200 also includes knitting logic module 224, which is a module that is user programmable to allow for a user (which can be a manufacturing entity producing wearable structures on mass scale) to define a knitting sequence to produce a garment using any of the above-described materials, stitch patterns, knitting techniques, etc. As stated above, the knitting logic module 224 allows for a seamless combination of any of the above-described techniques, thereby allowing unique complex knitted structures to be produced in a single knitting sequence (e.g., the user does not need to remove the knitted structure, then reinsert and reorient it to complete knitting the knitted structure). The multi-dimensional knitting machine 200 also includes insertion logic module 226, which works in tandem with the knitting logic module 224, to allow for insertion of non-fabric components to be seamlessly inserted into the knitted structure while the knitted structure is knitted together. The insertion logic is in communication with the knitting logic to allow for the knit to be adjusted in accordance with where the non-fabric structure is being inserted. In some embodiments, the user need only show where the non-fabric structure is to be inserted in their mock-up (e.g., at a user interface associated with the multi-dimensional knitting machine, which user interface allows for creating and editing a programmed knit sequence) and the knitting logic module 224 and insertion logic module 226 automatically work together to allow for the knitted structure to be produced.

Figure 3A:
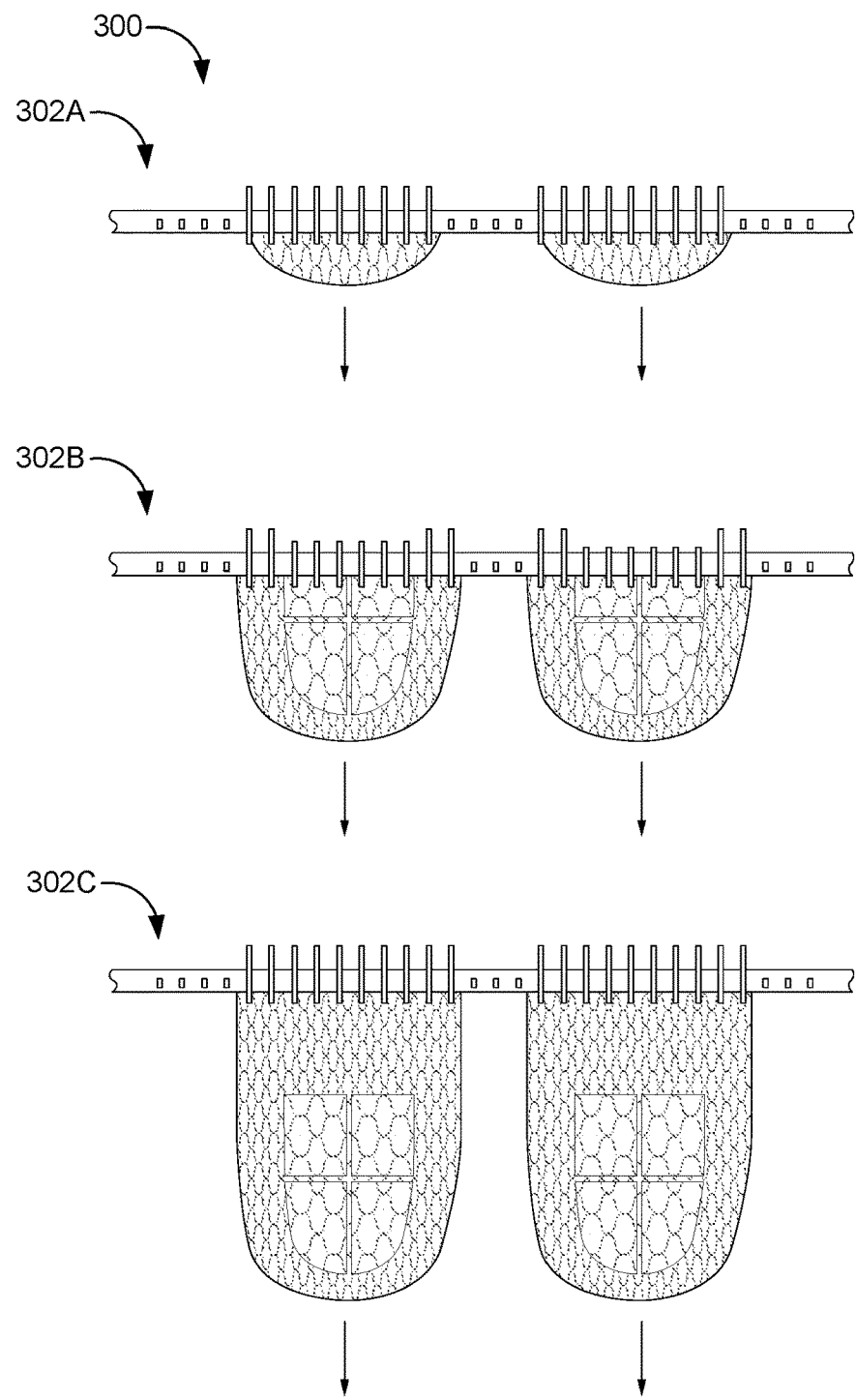
FIG. 3A illustrates a sequence in which a knitted wearable structure (e.g., a glove) is knitted along a vertical axis, in accordance with some embodiments.

FIG. 3A illustrates a sequence in which a knitted wearable structure (e.g., a glove) is knitted along a vertical axis, in accordance with some embodiments. Sewing on the vertical means that the garment is produced in a top-down fashion (e.g., a glove would be produced starting from the top of the tallest finger and move down to the wrist portion of the glove). For some knitted wearable structures, it is necessary to knit the knitted structure on the vertical. Sewing on specific axes can be necessary for certain three-dimensional knitted structures (e.g., pockets with certain openings). FIG. 3A shows a sequence 300 that shows three snapshots (302A-302C) over time of sewing along the vertical axis.

Figure 3B:
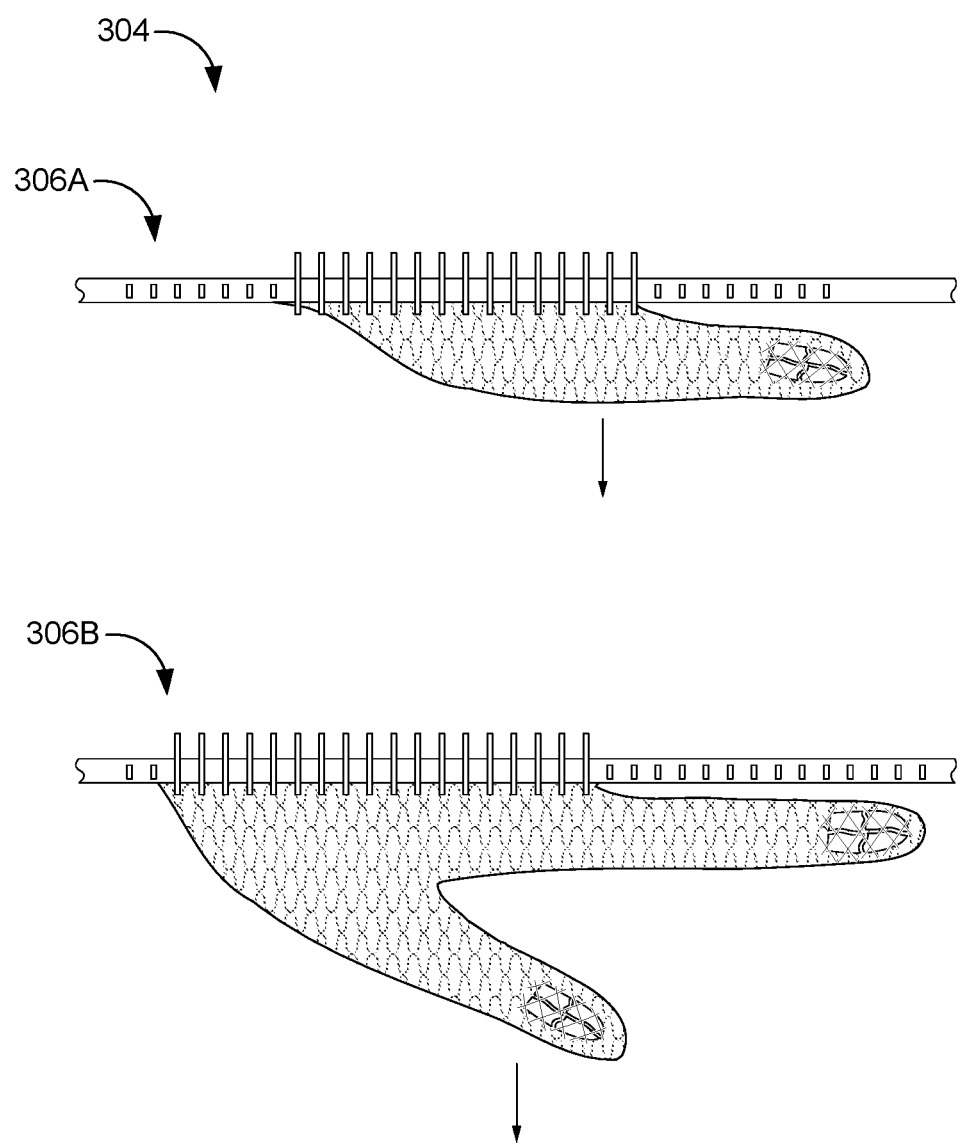
FIG. 3B illustrates a sequence in which a knitted wearable structure (e.g., another glove) is knitted along a horizontal axis, in accordance with some embodiments.

FIG. 3B illustrates a sequence in which a knitted wearable structure (e.g., another glove) is knitted along a horizontal axis, in accordance with some embodiments. Sewing on the horizontal means that the garment would be produced from a left side to a right side (e.g., a glove would be produced starting with the pinky finger, then moving to the ring finger, then middle finger). For some knitted wearable structures, it is necessary to sew the knitted structure on the horizontal instead of on the vertical. FIG. 3B shows a sequence 304 that shows two snapshots (306A-306B) over time of sewing on the horizontal. It should be understood that certain multi-dimensional knitting machines can be programmed to allow for combinations of knitting on both the horizontal and the vertical, even for a single wearable structure, such that certain aspects of the wearable glove (e.g., a three-dimensional volumetric pocket) can be knit on the horizontal and other aspects of the wearable glove (e.g., a non-knitted structure, such as a printed circuit board) can be knit on the vertical.

Figure 4:
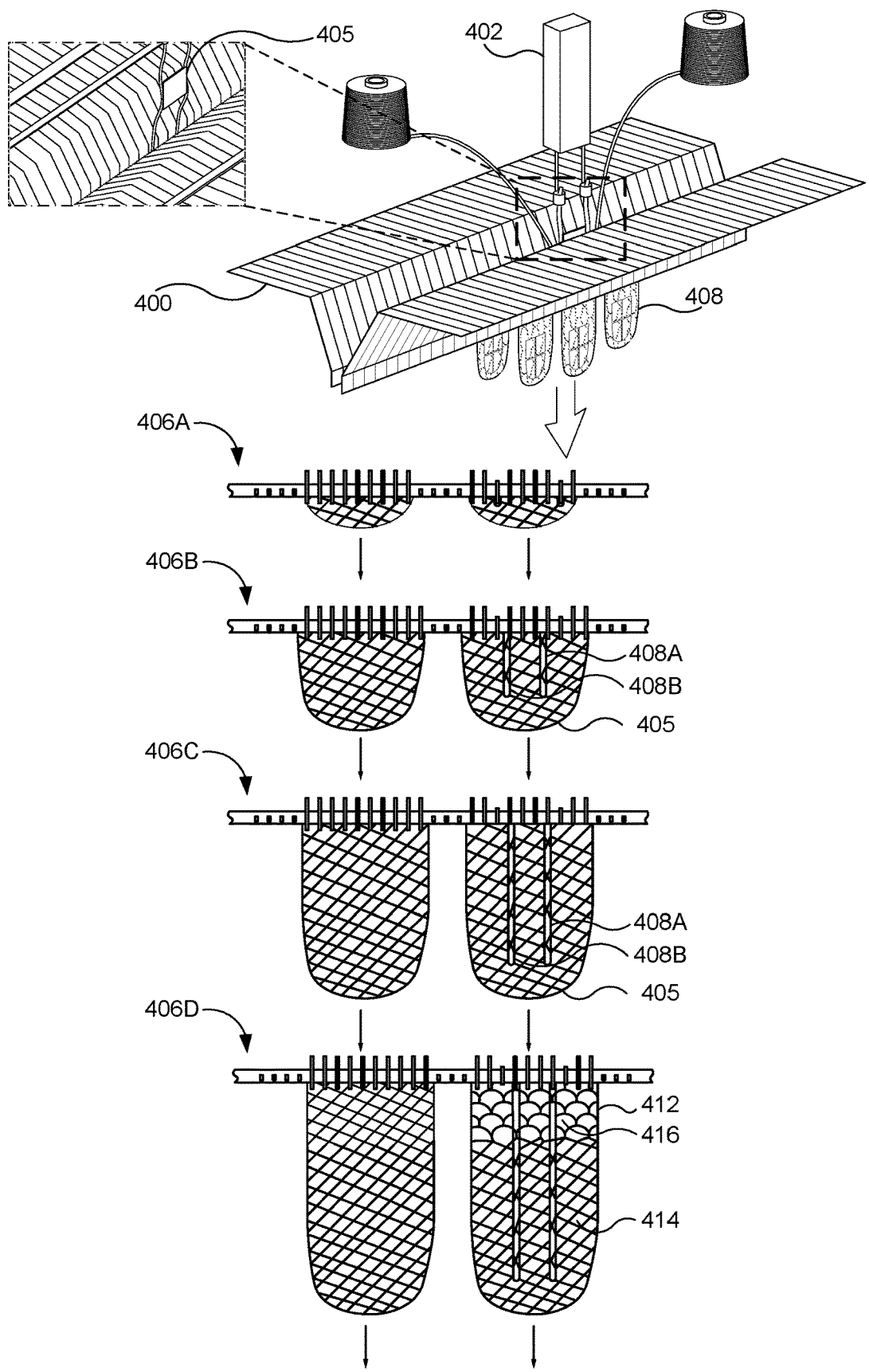
FIG. 4 illustrates a non-knitted structure being inserted into a multi-dimensional knitting machine while knitting a knitted structure (e.g., and also doing so in an automated fashion such that no user intervention is needed to allow for integrating the non-knitted structure after the knit sequence is initiated), in accordance with some embodiments.

FIG. 4 illustrates a non-knitted structure being inserted into a multi-dimensional knitting machine while knitting a knitted structure (e.g., and also doing so in an automated fashion such that no user intervention is needed to allow for integrating the non-knitted structure after the knit sequence is initiated), in accordance with some embodiments. FIG. 4 shows a schematic overview figure, similar to that of FIG. 2, which shows an insertion component 402 (same as insertion components 206, 214, and 222 described in reference to FIG. 2) configured to work with a multi-dimensional knitting machine 400 (same as multi-dimensional knitting machine 200 discussed in reference to FIG. 2).

FIG. 4 shows a sequence of how a non-knitted structure 405 can be inserted into the multi-dimensional knitting machine at the same time the knitted fabric (e.g., glove 408) is being knitted. In the first pane 406A, indicating a first point in time, the fingertips of the glove 408 are being produced, e.g., knitted on a vertical axis. The second pane 406B, indicating a second point in time, shows the knitted structure 405 being knitted and also show that the non-knitted structures 408A and 408B (which in this example can be individual conductive traces or printed circuit boards that can be used to route data from a sensor, such as one or more of the soft capacitive sensors described earlier as one example) are being knitted into (i.e., inserted into) the knitted structure 405. The second pane 406B also shows that in some embodiments the thread of the knitted structure 405 is alternatingly knitted over or knitted under the non-knitted structure 405 ensuring that the non-knitted structures 408A and 408B is integrated into the single layer of fabric. The third pane 406C, indicating a third point in time, further shows that the knitted structure 405 is continued to be knitted together and the non-knitted structures 408A and 408B are continued to be knitted into the knitted structure 405. Eventually, the multi-dimensional knitting machine 400 along with the insertion component 402 will produce a complete glove 408 (e.g., a three-dimensional glove) with an embedded non-knitted structures 408A and 408B. In some embodiments, the non-knitted structures 408A and 408B can include cutouts to allow for thread to pass through to further secure the non-knitted structures 408A and 408B to the knitted fabric 405.

FIG. 4 also illustrates how the multi-dimensional knitting machine 200 can adjust a knit pattern to a different knit pattern while still allowing for a non-knitted structure to be integrated into the knitted structure, in accordance with some embodiments. FIG. 4 illustrates in a fourth pane 406D, indicating a fourth point in time, that a second knit pattern 412 can be switched to mid-knitting without having a seam between the two knit patterns (e.g., knit patterns can be changed and seamless knit can still be produced). Changing the knit patterns mid-knitting can be beneficial for accommodating different flex requirements of the wearable structure (e.g., locations on a glove that correspond to a joint can require a different knit pattern to accommodate more movement than locations that correspond to a phalange). In some embodiments, the first knit pattern 414 is a tighter (e.g. denser) knit (e.g., a higher number of individual stitches per a certain area of space) than a second-knit pattern 416 to accommodate additional movement (e.g., flexing of the user's joints). In some embodiments, the non-knitted structure 405 (e.g., a printed circuit board, an electrical wire, a bundle of electrical wires, semi rigid support, etc.) is constructed from a material that is different from the fabric structure. For example, the non-knitted structure can be a printed circuit board, an electrical wire, a bundle of wires, a semi-rigid support, etc.

Figure 5A:
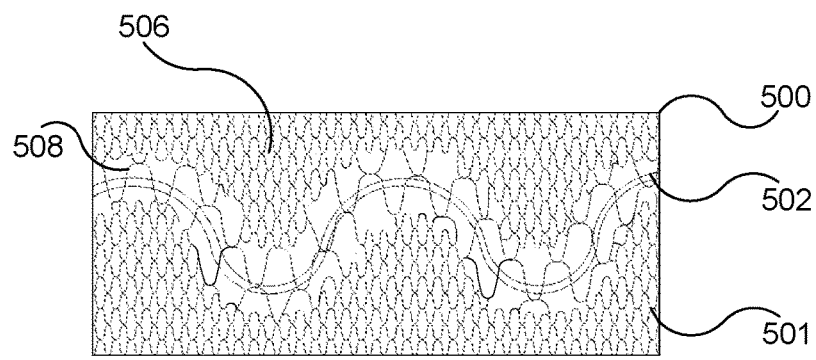
FIGS. 5A and 5B illustrate a knitted structure with a non-knitted structure where the non-knitted structure has a first knit portion surrounding it and a second knit portion surrounding the first knit portion, in accordance with some embodiments.
Figure 5B:
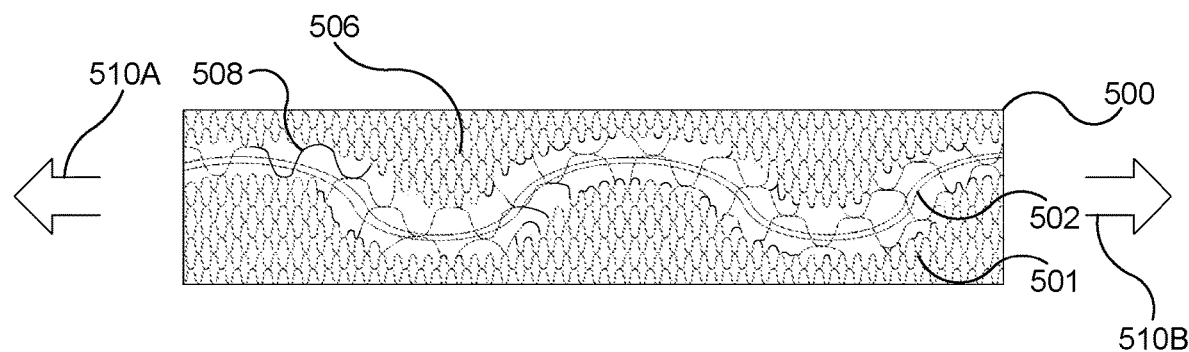

FIGS. 5A and 5B illustrate a knitted structure with a non-knitted structure where the non-knitted structure has a first knit portion surrounding it and a second knit portion surrounding the first knit portion, in accordance with some embodiments. FIG. 5A illustrates a structure 500 that includes a non-knitted structure 502 and knitted structure 501. The non-knitted structure 502, in the example depicted in FIGS. 5A-5B, does not stretch like the knitted structure 501, so it is necessary to devise a technique that allows the knitted structure to stretch while not damaging the non-knitted structure 502. FIG. 5A shows a knitted structure 501 that uncoils a non-knitted structure 502 while the knitted structure 501 is stretched, effectively allowing the non-knitted structure 502 to not interfere with (i.e., match) the stretch of the knitted structure 501. FIG. 5A shows a first knitted portion 506 that has a first knit pattern and the second knitted portion 508 that has a second knit pattern (different from the first knit pattern) that accommodates the non-knitted structure 502. The second knitted portion 508, when combined with the non-knitted structure 502, is configured to stretch in substantially the same manner as the first knitted portion 506. For example, a looser knit pattern may be used in the second knitted portion 508 to accommodate the reduced stretch capabilities resulting from the non-knitted structure 502. To allow the non-knitted structure 502 to not receive undue stress when stretched, the non-knitted structure 502 can be oversized for a given area and placed in a meandering pattern. The meandering pattern allows the non-knitted structure 502 to move when the fabric is being stretched, without putting excess stress/strain on the non-knitted structure (e.g., making the max stretch length equal to the non-knitted structures length when linear). Undue stress and/or strain on knitted structures can damage components or interfere with accurate measurements when the non-knitted structures are used for sensing purposes.

FIG. 5B illustrates the structure 500, described in reference to FIG. 5A, being in a stretched state (e.g., as indicated by opposing arrows 510A and 510B), which shows the knitted structure 501 being stretched and the non-knitted structure 502 in its extended state. FIG. 5A also shows that first knitted portion 506 and the second knitted portion 508 are stretched in the horizontal direction. While stretch is shown in one direction, in some embodiments, the fabric can also be configured to have two-way stretch.

Figure 6A:
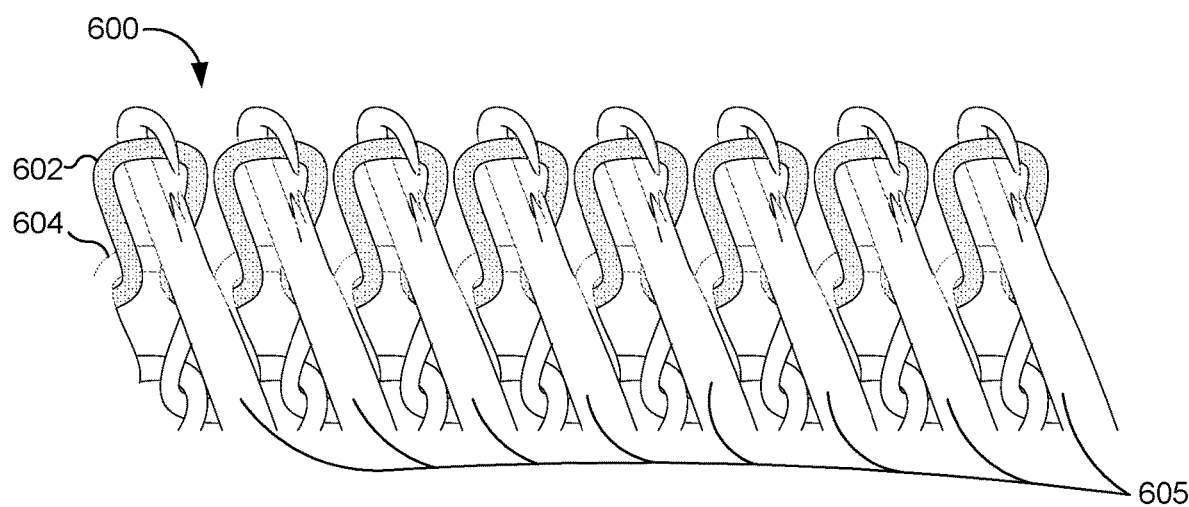
FIGS. 6A-6B illustrate a first kind of stitch pattern (e.g., a jersey stitch pattern) that is utilized to allow for accommodating a conductive trace, in accordance with some embodiments.
Figure 6B:
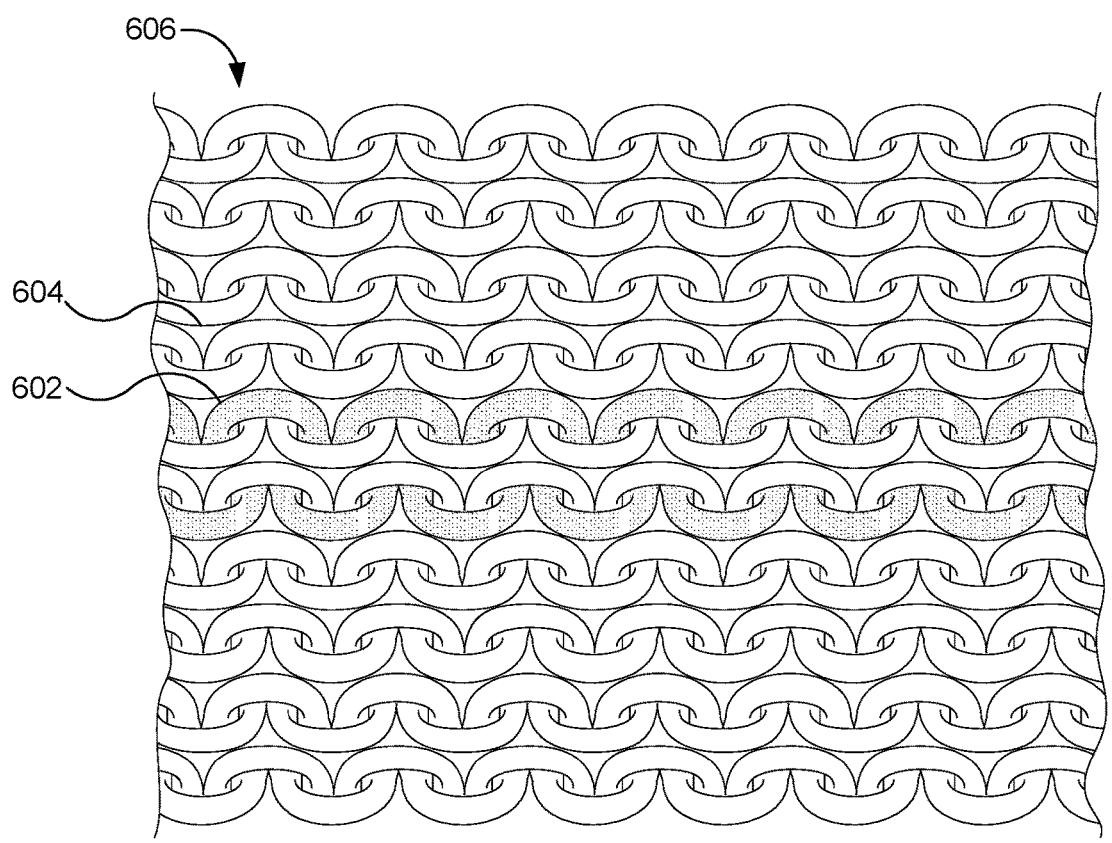

FIGS. 6A-6B illustrate a first kind of stitch pattern (e.g., a jersey stitch pattern) that is utilized to allow for accommodating a conductive trace, in accordance with some embodiments. In some embodiments, the conductive trace can be knitted into a yarn that mimics a yarn of the adjacent yarn in the fabric. In some embodiments, this yarn can be any of the conductive yarns described in Appendix A, including the yarns shown and described with reference to FIGS. 3-7 in Appendix A. This alternative method provides another way of providing a seamless fabric structure that includes one or more electrical components. FIG. 6A illustrates a sewing technique 600 that is used to produce the jersey stitched fabric. FIG. 6A also illustrates the conductive yarn 602 as having a different appearance than the surrounding yarns 604, i.e., to distinguish it from the surrounding yarns. However, the conductive yarn, in some embodiments, can have the same appearance. The knitting needles 605 shown in FIG. 6A (and also pictured in FIG. 6C) are the knitting needles that correspond with the needles 204, 210, and 218 described in reference to FIG. 2. FIG. 6B shows the resulting fabric 606 constructed using a single stitch jersey stitch that includes the conductive yarn 602 and the surrounding yarns 604.

Figure 6C:
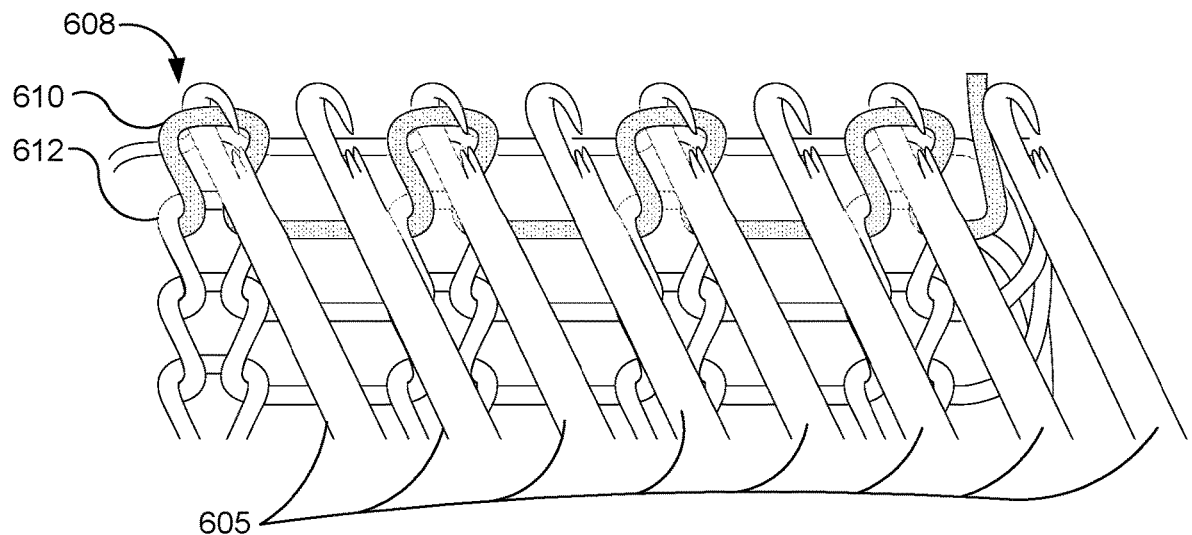
FIGS. 6C-6D illustrate a second kind of stitch pattern (e.g., a jersey stitch pattern different than that depicted and described with reference to FIGS. 6A-6B) that is utilized to allow for accommodating a conductive trace, in accordance with some embodiments.
Figure 6D:
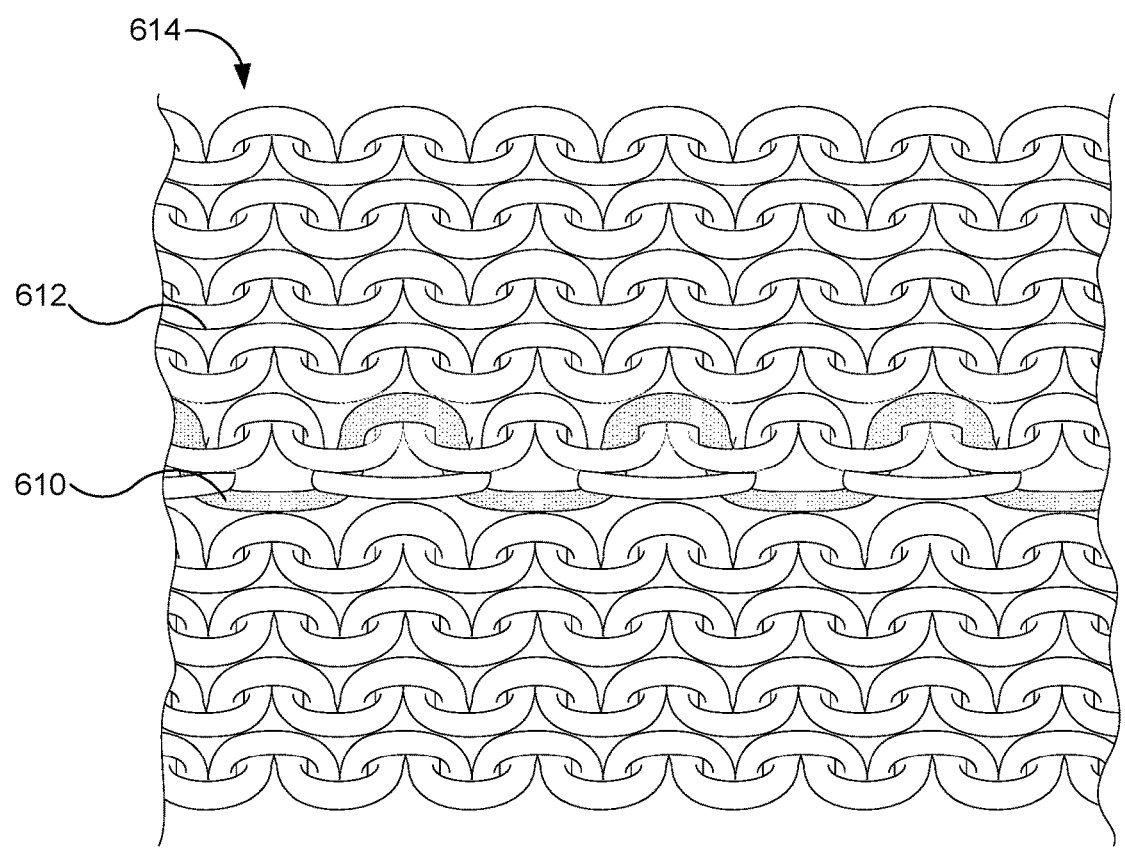

FIGS. 6C-6D illustrate a second kind of stitch pattern (e.g., a jersey stitch pattern different than that depicted and described with reference to FIGS. 6A-6B) that is utilized to allow for accommodating a conductive trace, in accordance with some embodiments. In some embodiments, the conductive trace can be knitted into a yarn that mimics a yarn of the adjacent yarn in the fabric. This alternative method provides another way of providing a seamless fabric structure that includes one or more electrical components. FIG. 6C illustrates a sewing technique 608 that is used to produce the jersey stitched fabric. FIG. 6C also illustrates the conductive yarn 610 as having a different appearance than the surrounding yarns 612, i.e., to distinguish it from the surrounding yarns. However, the conductive yarn, in some embodiments, can have the same appearance. FIG. 6C also shows that some of the needles 605 are knitting the conductive yarn 610 while others are knitting the surrounding yarns 612. FIG. 6D shows the resulting fabric 614 constructed using a modified jersey stitch that includes the conductive yarn 602 and the surrounding yarns 604. The modified jersey stitch can allow for additional stretch (i.e., having a different stitch around the conductive yarn can improve overall stretchability of the fabric 614).

Figure 6E:
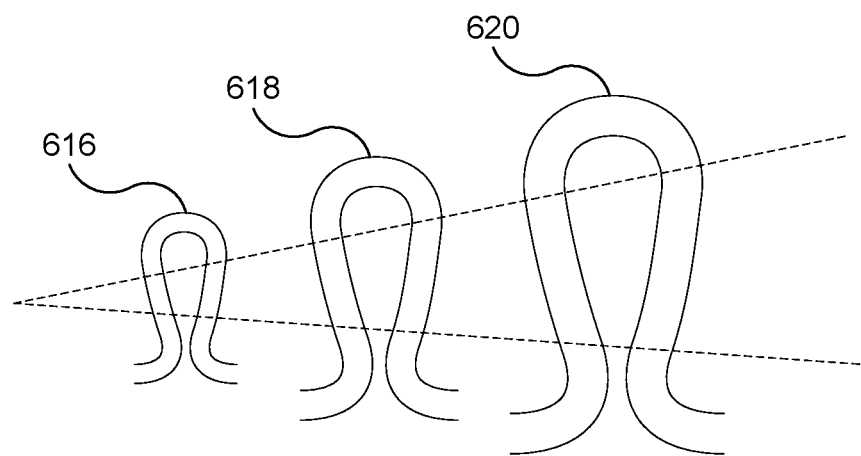
FIG. 6E illustrates another example of a stitch pattern that adjusts gauge of the stitch to adjust a stretching characteristic of the resulting fabric, in accordance with some embodiments.

FIG. 6E illustrate another example of a stitch pattern that adjusts gauge of the stitch to adjust a stretching characteristic of the resulting fabric, in accordance with some embodiments. FIG. 6E illustrates three different stitch sizes (e.g., small stitch gauge 616, medium stitch gauge 618, large stitch gauge 620, etc.,). For example, gauges up to 18 gauge or higher. In some embodiments, different stitch gauges may be used in the same garment depending on the requirements of the area being stitched (e.g., high movement areas (e.g., joints) may require a large gauge to allow for more stretch than low mobility areas).

Figure 6F:
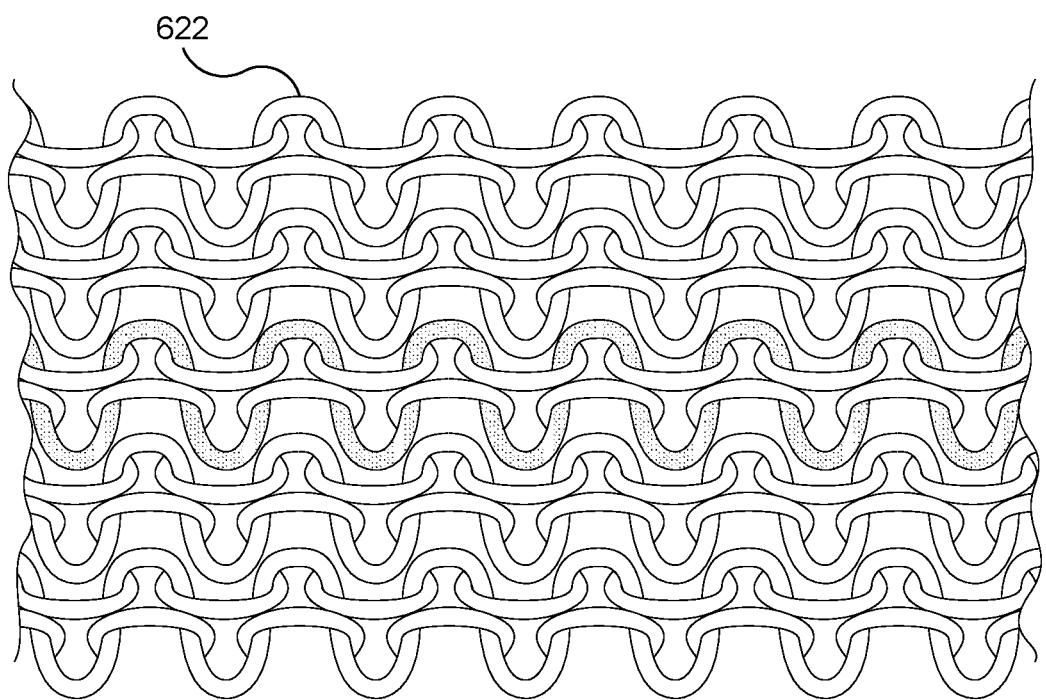
FIG. 6F shows an example of a fabric that includes a larger gauge knit stitch 622 (e.g., a larger-gauge knit jersey stitch) that allows for accommodating additional stretching characteristics, in accordance with some embodiments.

FIG. 6F shows an example of a fabric that includes a larger gauge knit stitch 622 (e.g., a larger-gauge knit jersey stitch) that allows for accommodating additional stretching characteristics, in accordance with some embodiments. This larger knit jersey stitch is apparent when compared to the jersey stich shown in FIG. 6B. While a couple stitch gauges have been illustrated, any gauge can be used based on the stretch requirements of the garment. While primarily jersey stitches have been shown, other stiches, mentioned above with respect to FIG. 2 can be used. In some embodiments, the knit fabrics of Appendix A can be formed using this larger gauge knit jersey stitch, such as those fabrics described in reference to FIGS. 3-7 of Appendix A.

Figure 6G:
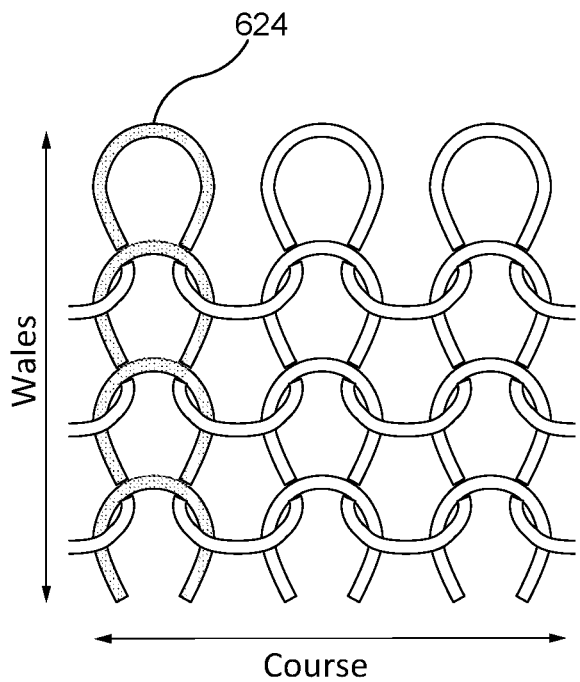
FIG. 6G illustrates that a conductive yarn can be stitched in a vertical direction, as opposed to a horizontal direction used for stitching of the conductive yarn described in reference to the examples of FIGS. 6A-6F, in accordance with some embodiments.
Figure 6H:
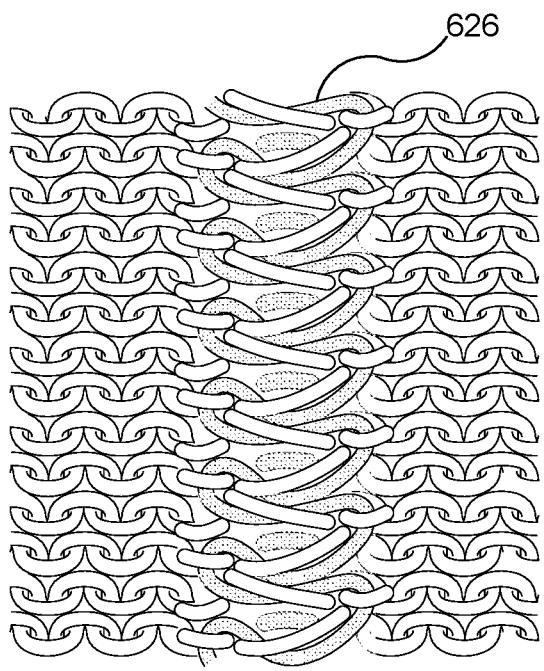
FIG. 6H illustrates that the conductive yarn 626 (shaded) can be knitted in yet another manner that is not jersey stitch, in accordance with some embodiments.

FIG. 6G illustrates that a conductive yarn 624 can be stitched in a vertical direction (e.g., along a wales direction, as opposed to a course direction), as opposed to a horizontal direction used for stitching of the conductive yarn described in reference to the examples of FIGS. 6A-6F. In some embodiments, there may be both vertical and horizontal stiches depending on the requirements of the garment. In some embodiments, the conductive yarn is coated, such that conductive yarns may be in contact with each other without interfering with their respective signals. FIG. 6H illustrates that the conductive yarn 626 (shaded) can be knitted yet another manner that is not jersey stitch, in accordance with some embodiments.

Figure 7A:
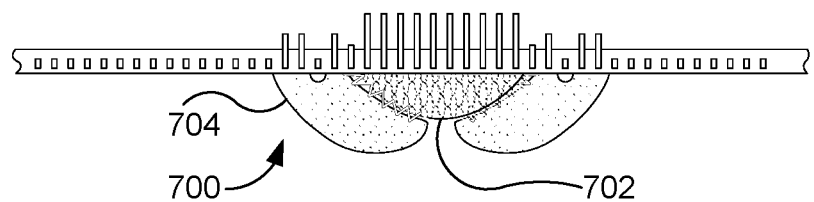
FIGS. 7A-7G illustrate a sequence for producing a portion of an actuator that is configured to be placed at a fingertip, in accordance with some embodiments.
Figure 7B:
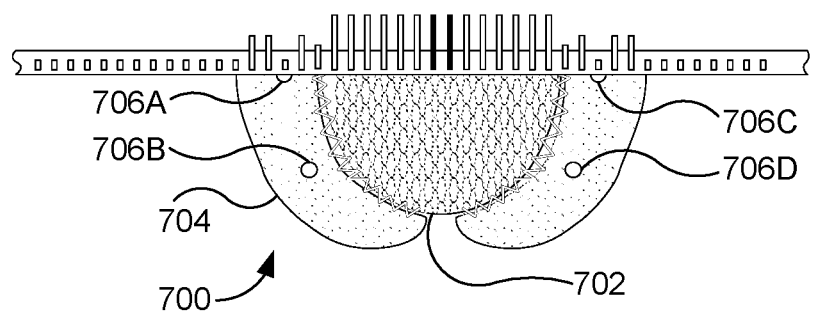
Figure 7C:
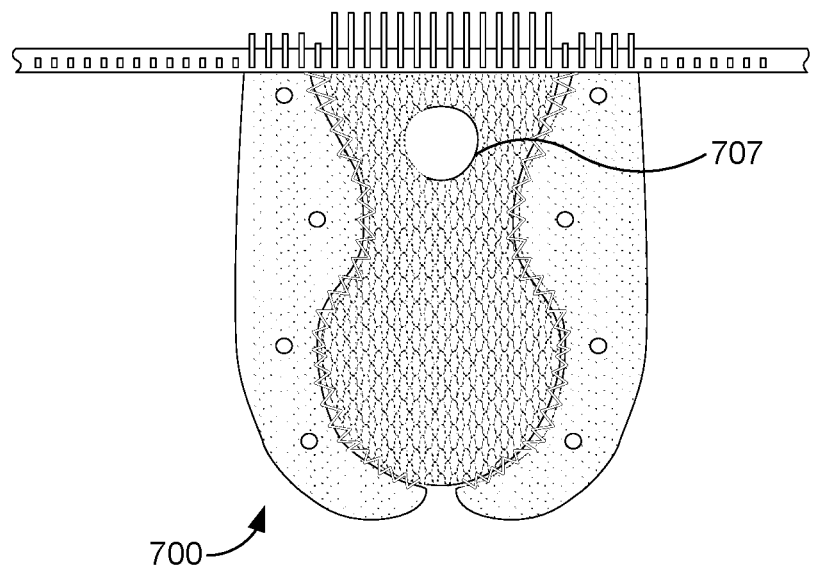

FIGS. 7A-7G illustrate a sequence for producing a portion of an actuator that is configured to be placed at a fingertip, in accordance with some embodiments. FIGS. 7A-7C illustrate the progression of a knitted structure being produced over time. The knitted structure 700 being produced consists of two different fabric components. The first fabric component 702 has a first knit pattern and is the desired finished fabric product in the depicted example. In some embodiments, the first fabric component 702 is also stitched in a manner such that a volumetric pocket is produced, i.e., to better form around a fingertip of a user when completed. The second fabric component 704 can be a temporary piece that is configured to be removed at a later point in production. The second fabric component 704 can be primarily used as a guide during an over molding step, which will be described in further detail later.

FIG. 7B better illustrates that the second fabric component 704 has its stitch pattern altered at certain locations to add in guide holes 706A-706D, which are used for aligning the knitted structure in an over molding machine to consistently place the over-molded structure in the correct position. FIG. 7C further illustrates the knitting process continuing with more guide holes being added as the knitted structure 700 continues to be produced. FIG. 7C also illustrates that one or more stress relief holes 707 can also be produced by the multi-dimensional knitting machine. In some embodiments, these one or more stress relief holes 707 can be used to route cable (e.g., electronic, fluid, or pneumatic cables), or be used to allow for the fabric to be bent (e.g., bent around a tip of a finger).

Figure 7D:
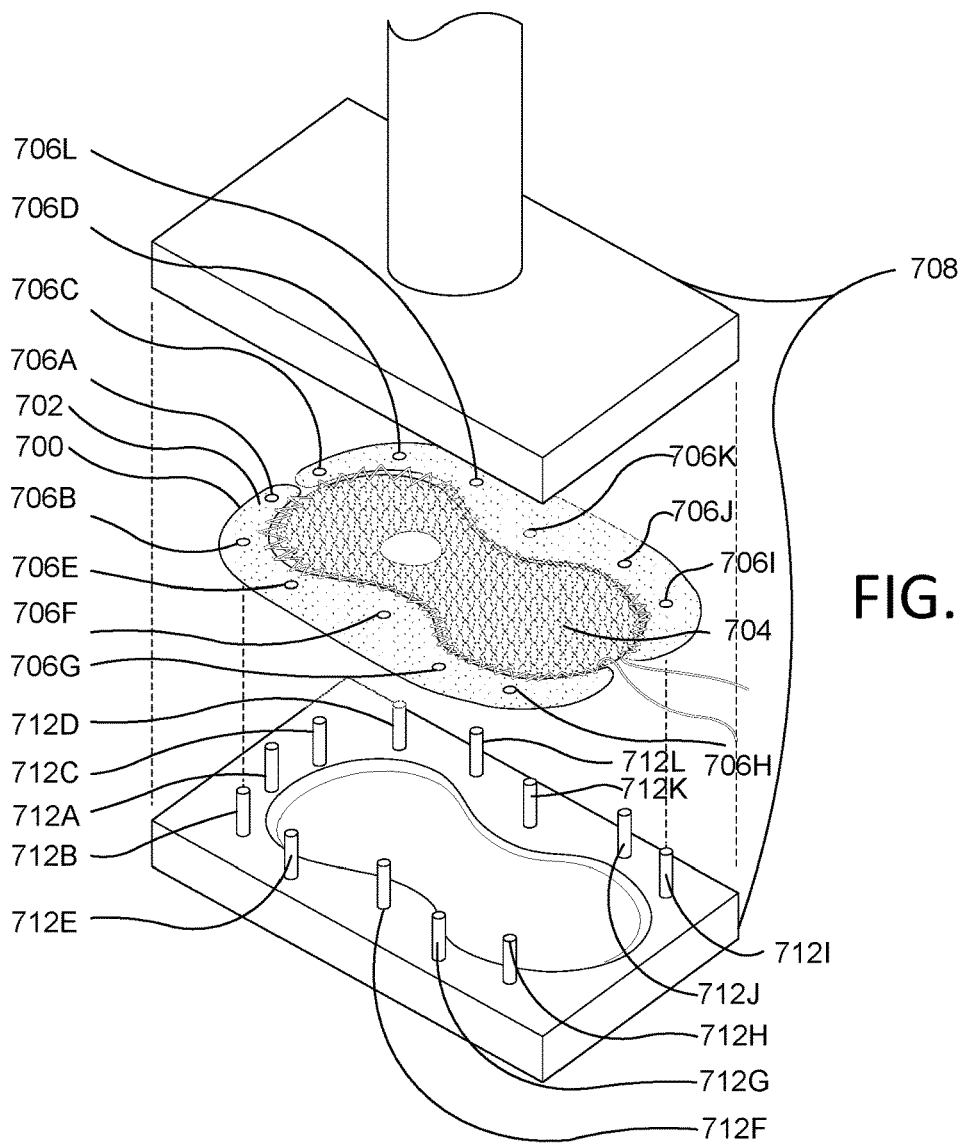

FIG. 7D illustrates the knitted structure 700 being inserted into an over molding machine 708 to have one or more haptic feedback generator components 710 integrated into the first fabric component 702. As discussed, the second fabric component 704 includes guide holes 706A-706L that correspond to dowels 712A-712L. The dowels 712A-712L are inserted into the guide holes 706A-706L of the second fabric component 704 to ensure that the over molding machine 708 correctly places the over-molded structure onto the first fabric component 702.

Figure 7E:
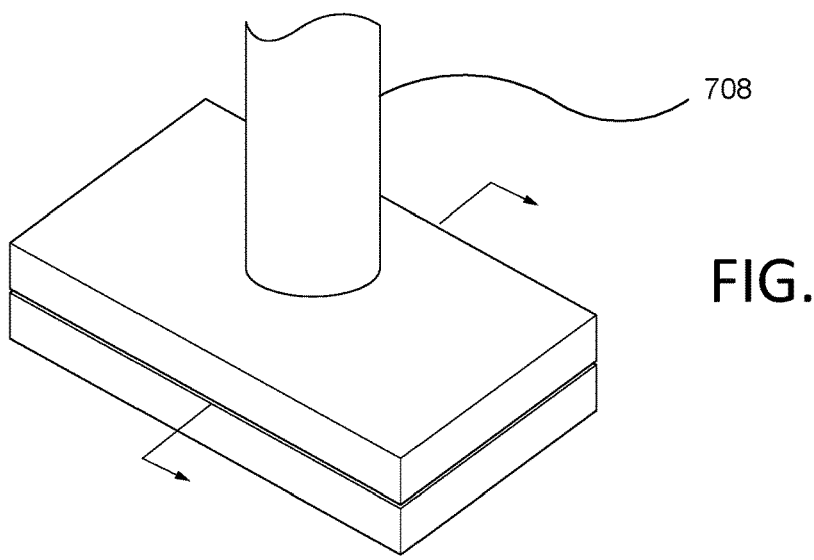

FIG. 7E shows the over molding machine 708 compressing down on the knitted structure 700 (not visible in FIG. 7E as it has been compressed by the machine 708) to inject the over-molded structure (not visible in FIG. 7E as it has been compressed by the machine 708). While compressing down on the knitted structure 700, an injectable material with bending properties (e.g., silicone, rubber, etc.,) can be flowed onto/into the fabric in the shape of the mold provided by the over molding machine 708 to produce the over-molded structure (obscured). In some embodiments, an additional component is added to the over molding machine and the over molding machine then secures the additional component to the knitted structure 700 via the molded structure.

Figure 7F:
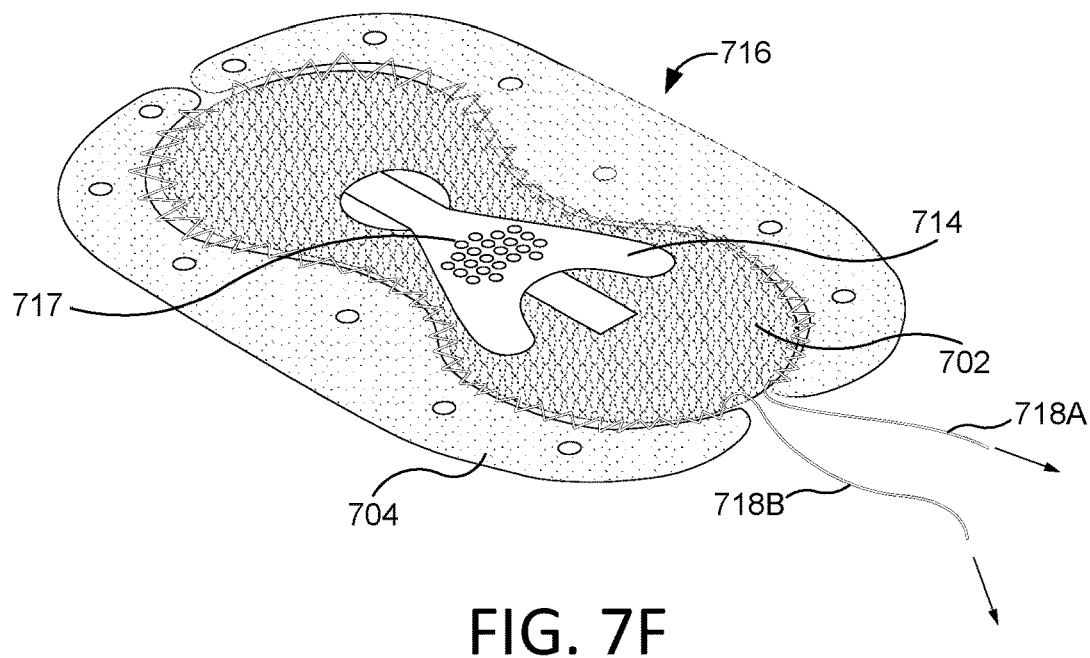

FIG. 7F illustrates the post-over-molded structure that now includes over-molded structure 714 embedded into the first fabric component 702 of the knitted structure 704 to produce a completed haptic fingertip structure 716. This over-molded structure 714 can be configured to include a matrix of haptic-feedback generators (e.g., as illustrated by the bubble array 717, where individual bubbles can each be used to provide haptic feedback and/or to sense inputs), where each haptic feedback generator can be individually controlled (e.g., by inflating or deflating) to provide a haptic sensation to a user wearing the completed haptic fingertip structure 716. In some embodiments, the over-molded structure 714 includes one or more sensors (e.g., a neuromuscular signal sensor that is secured during the over molding process). In some embodiments, the one or more sensors are configured to detect both neuromuscular signals and non-neuromuscular signals. FIG. 7F also shows two strings 718A and 718B, which are configured to be the only strings, in this example embodiment, attaching the first fabric component 702 with the second fabric component 704. In some embodiments, there is only a single string attaching the first fabric portion component 702 with the second fabric component 704.

Figure 7G:
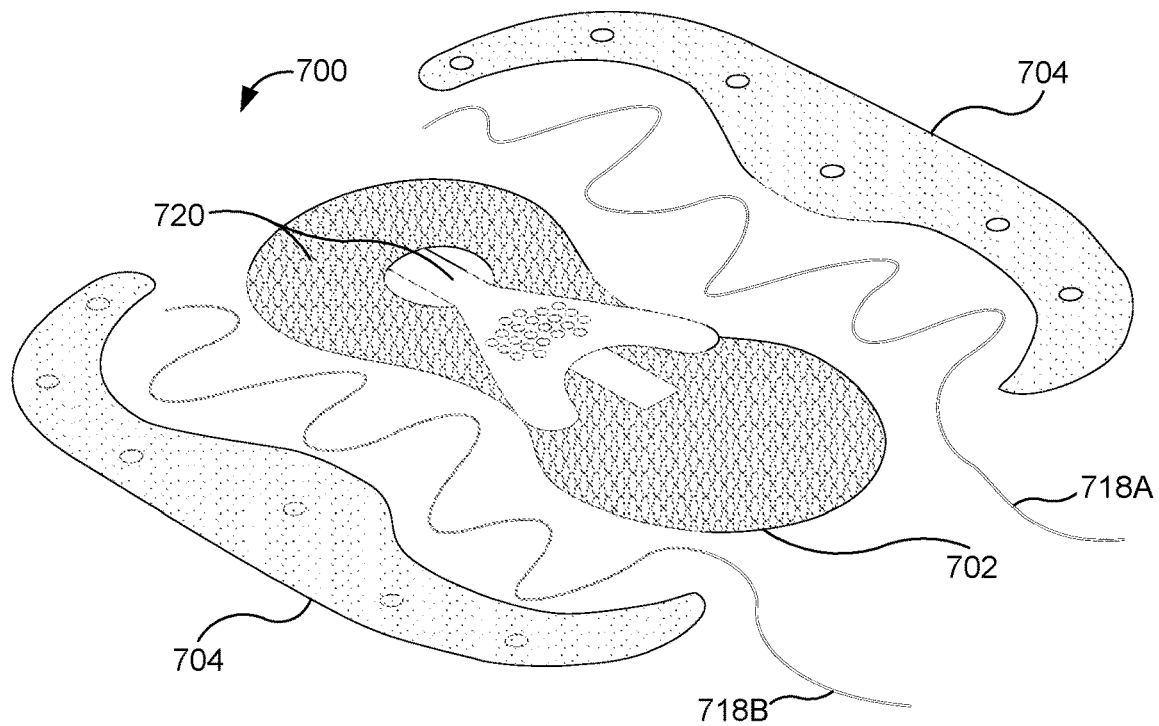

FIG. 7G shows that the two strings 718A and 718B being pulled from the knitted structure 700 and as a result the first fabric component 702 and the second fabric component 704 become detached from one another. In some embodiments, a single string can be configured to detach the first fabric component 702 from the second fabric component 704. In some embodiments, the second fabric component is one continuous piece instead of two separate pieces. As stated earlier, the second fabric component 704 is a temporary piece that is configured to be removed at a later point in production and is used only during the manufacturing process. FIG. 7G also shows the completed process of producing a fabric with an integrated over-molded structure 720. In some embodiments, strings 718A and 718B are loose strings from the 704 second fabric component, which allow for unraveling (e.g., by hand or machine) of the second fabric component 704 in order to detach the second fabric component 704 from the first fabric component 702.

Figure 8A:
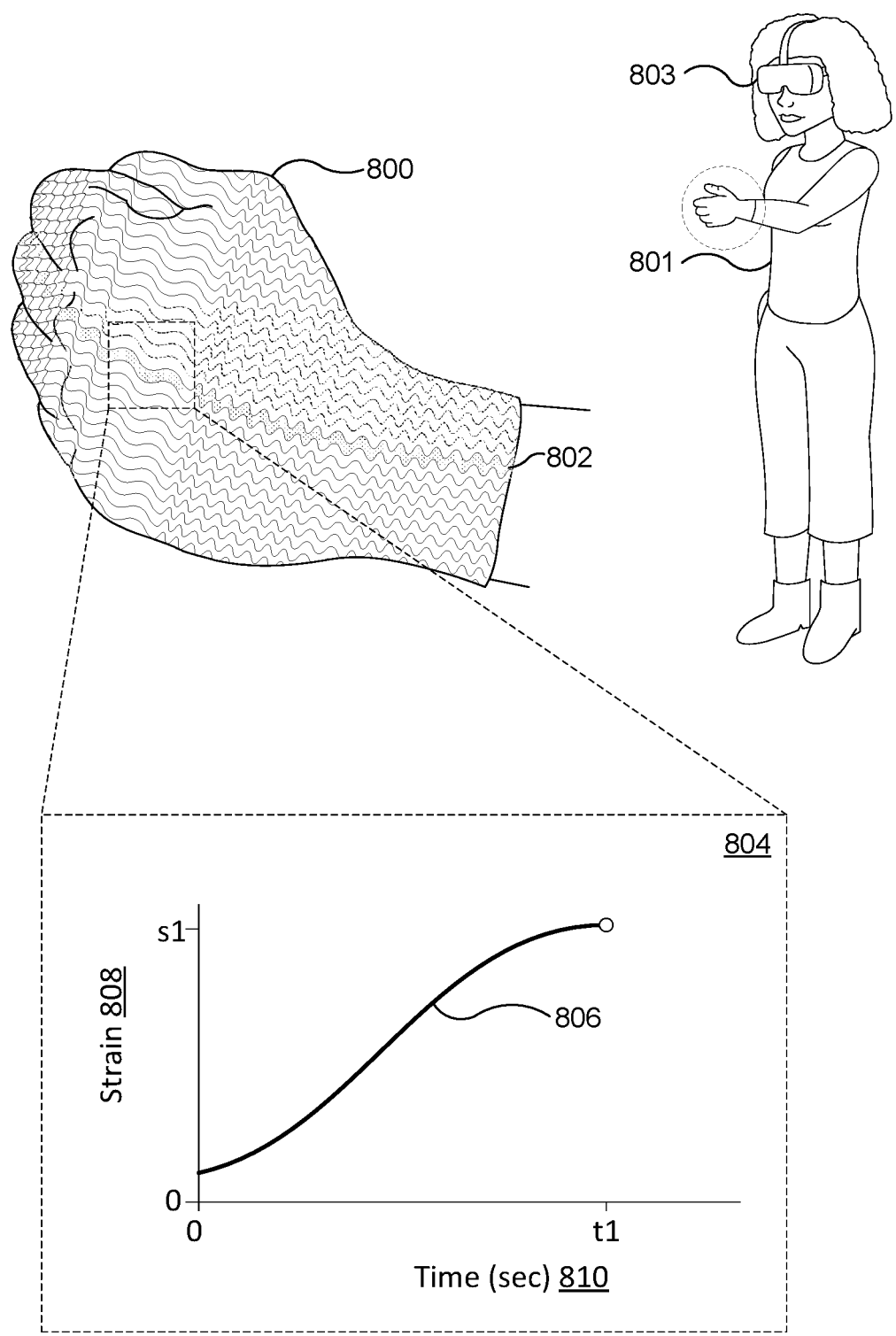
FIGS. 8A-8B illustrate a fabric structure that includes one or more portions that are made from a conductive deformable fabric and favorable strain characteristics accommodated by this fabric structure, in accordance with some embodiments.
Figure 8B:
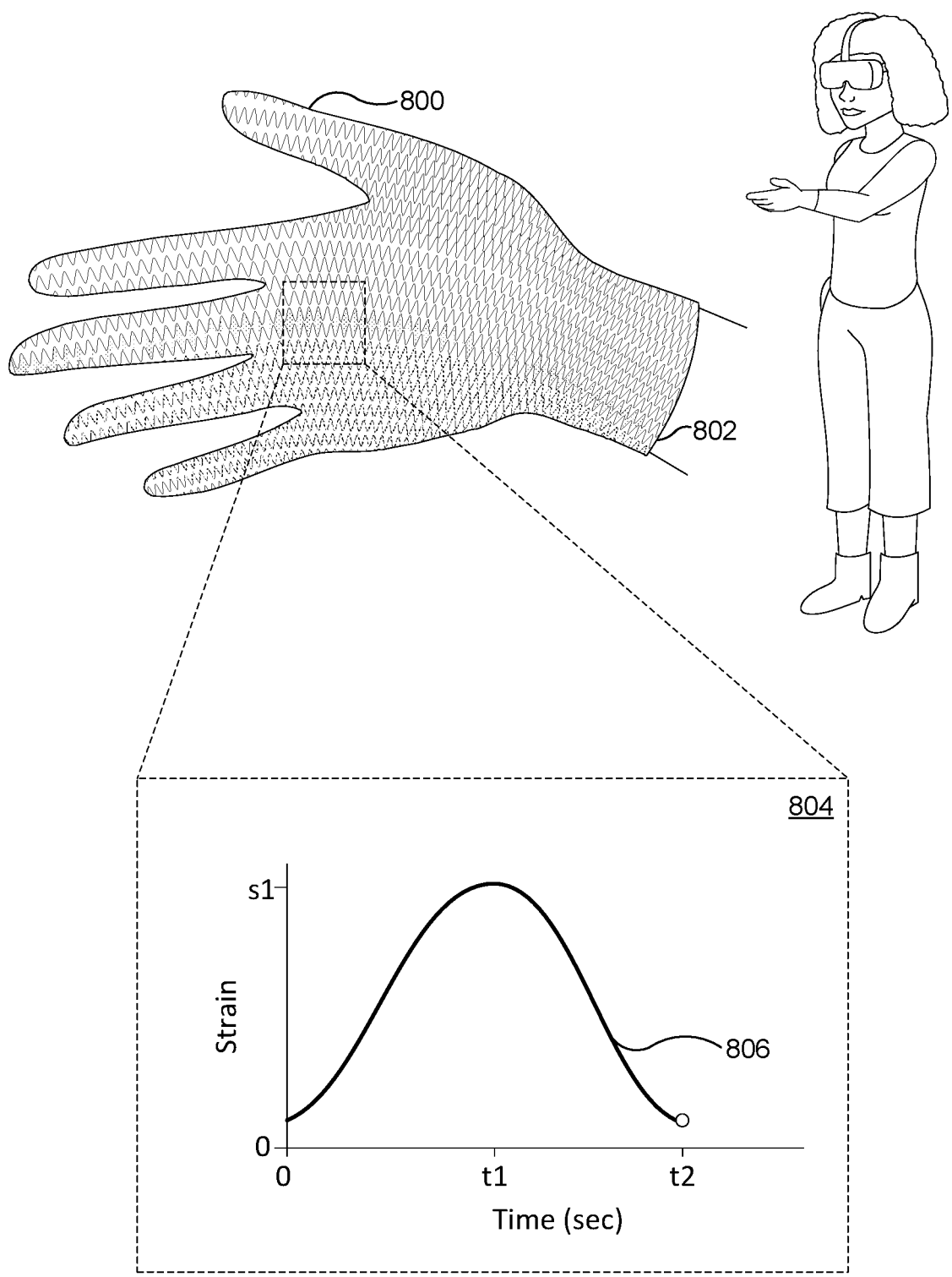

FIGS. 8A-8B illustrate a fabric structure (e.g., a glove 800) that includes one or more portions that are made from a conductive deformable fabric (e.g., conductive deformable fabric portion 802) and favorable strain characteristics accommodated by this fabric structure, in accordance with some embodiments. In some embodiments, the conductive deformable fabric has a different amount of stretch along certain axes (e.g., more restrictive) compared to the surrounding material, but a stretch is still desired. In order to integrate the conductive deformable fabric, certain folding techniques can be used to achieve this goal, such as origami derived folding techniques (e.g., the fabric has alternating folds along at least one axis to reduce its footprint (e.g., a first footprint) when in an unstretched state and when in a stretched state the alternating folds substantially unfold to increase its footprint (e.g., to a second footprint, larger along at least one axis than the first footprint) of the fabric). In some embodiments, the fabric structure includes elastic, allowing the fabric to be in a default unstretched state.

In some embodiments, the conductive deformable fabric portion 802 can be configured to be a strain sensor (i.e., based on the unfolding of the fabric the resistance of the fabric changes, which can be used to determine the strain occurring). In some embodiments, the strain information can be used to determine pose of a hand (e.g., the strain can be used to determine whether the fingers are in a curled/first state (e.g., higher strain, fingers more tightly curled)). In some embodiments, the conductive deformable fabric can also be configured to couple with a neuromuscular signal sensor, and the conductive deformable fabric can be configured to power the neuromuscular signal sensor and/or transmit signal data from the neuromuscular signal sensor.

FIG. 8A also shows a user 801 curling their hand into a first and as a result portions of the glove 800 are extended into a stretched state. The plot 804 shows a prophetic illustration of a curve 806 indicating the measured/calculated strain (shown on y-axis 808) occurring at the conductive deformable fabric portion 802 over time (shown on x-axis 810). The curve 806 shows that the strain increases as the hand tightens further (i.e., the conductive deformable fabric portion 802 is put further into its stretched state). In some embodiments, multiple discrete strain sensors can be placed in different areas as opposed to a continuous strip, as pictured (e.g., an individual strain sensor placed on each joint, or other flexible part of the hand) to take multiple strain measurements and provide an even better picture of the hands pose. In some embodiments, multiple strain sensors may be placed at a single location (e.g., a joint) to provide an even further detailed (e.g., higher resolution) measurement. In some embodiments, the information provided by the one or more strain sensors can be used to provide an input into an artificial reality environment displayed at an artificial-reality headset 803.

FIG. 8B shows a user now uncurling their hand and as a result the glove 800 is returned to its unstretched state. The plot 804 shows the prophetic curve 806 now indicating the measured/calculated strain occurring at the conductive deformable fabric portion 802 over time. The curve shows that the strain decreases as the hand uncurls further (i.e., the conductive deformable fabric portion 802 is put further into its unstretched state).

Figure 9A:
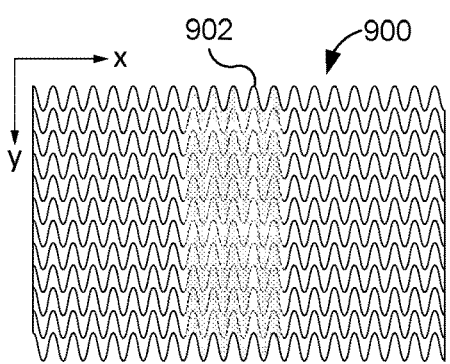
FIGS. 9A-9C illustrate a fabric structure that includes one or more portions that are made from a conductive deformable fabric and the fabric structure is configured to have two-way stretch with favorable strain characteristics shown by the plots in each of FIGS. 9A-9C, in accordance with some embodiments.
Figure 9A:
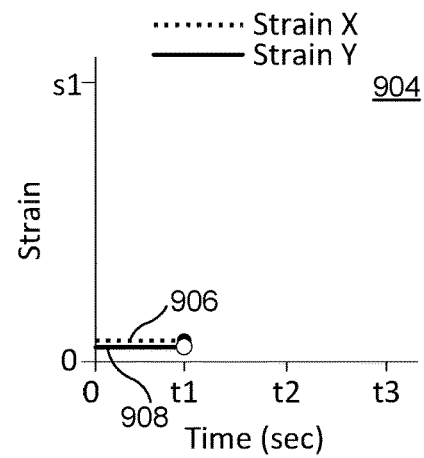
Figure 9B:
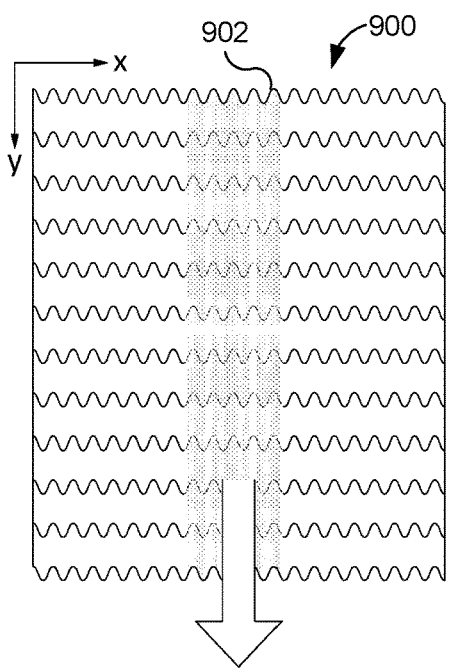
Figure 9B:
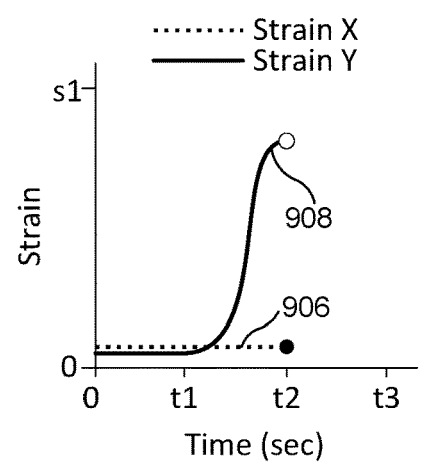
Figure 9C:
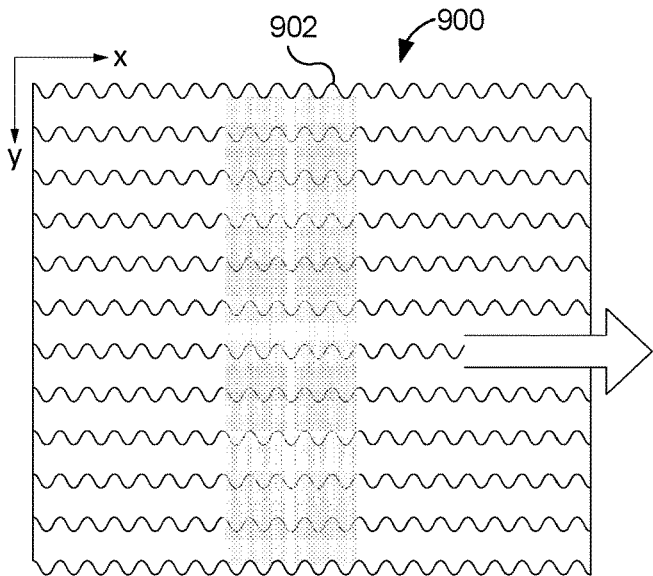
Figure 9C:
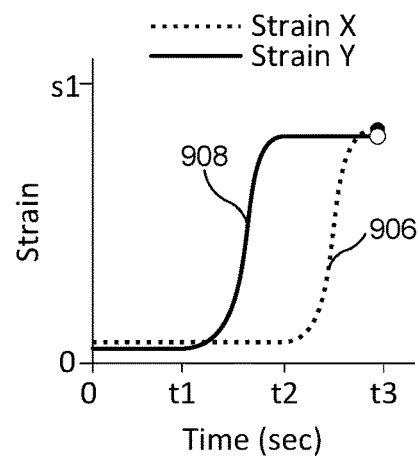

FIGS. 9A-9C illustrate a fabric structure 900 that includes one or more portions that are made from a conductive deformable fabric 902 and the fabric structure 900 is configured to have two-way stretch with favorable strain characteristics shown by the plots in each of FIGS. 9A-9C, in accordance with some embodiments. As discussed in reference to FIG. 8A-8B, the fabric structure 900 is made stretchable by using a series of folds and the unstretched state is a substantially folded state and the stretched state is a substantially unfolded state. As will be discussed, the fabric structure 900 can have a folding pattern that allows it to be unfolded in both the x-direction and y-direction allowing for two-way stretch.

FIG. 9A shows the fabric structure 900 in a default unstretched state. The plot 904 shown in FIG. 9A indicates by dashed x-axis curve 906 and solid y-axis curve 908 that at time t1 there is no measured/calculated strain occurring in both the x and y axes of the fabric structure, respectively.

FIG. 9B shows the fabric structure 900 in an extended state along the y-axis, and the plot 904 shown in FIG. 9B indicates by solid y-axis curve 908 that at time t2 there is a measured/calculated strain along the y-axis. FIG. 9B also shows that dashed x-axis curve 906 at time t2 indicates that there is no measured/calculated strain occurring along the x-axis.

FIG. 9C shows that the fabric structure 900 is in an extended state along both the x-axis and y-axis, and the plot 904 shown in FIG. 9C indicates by dashed x-axis curve 906 and solid y-axis curve 908 that at time t3 there is both a measured/calculated strain occurring in both the x and y axes of the fabric structure, respectively.

Figure 10A:
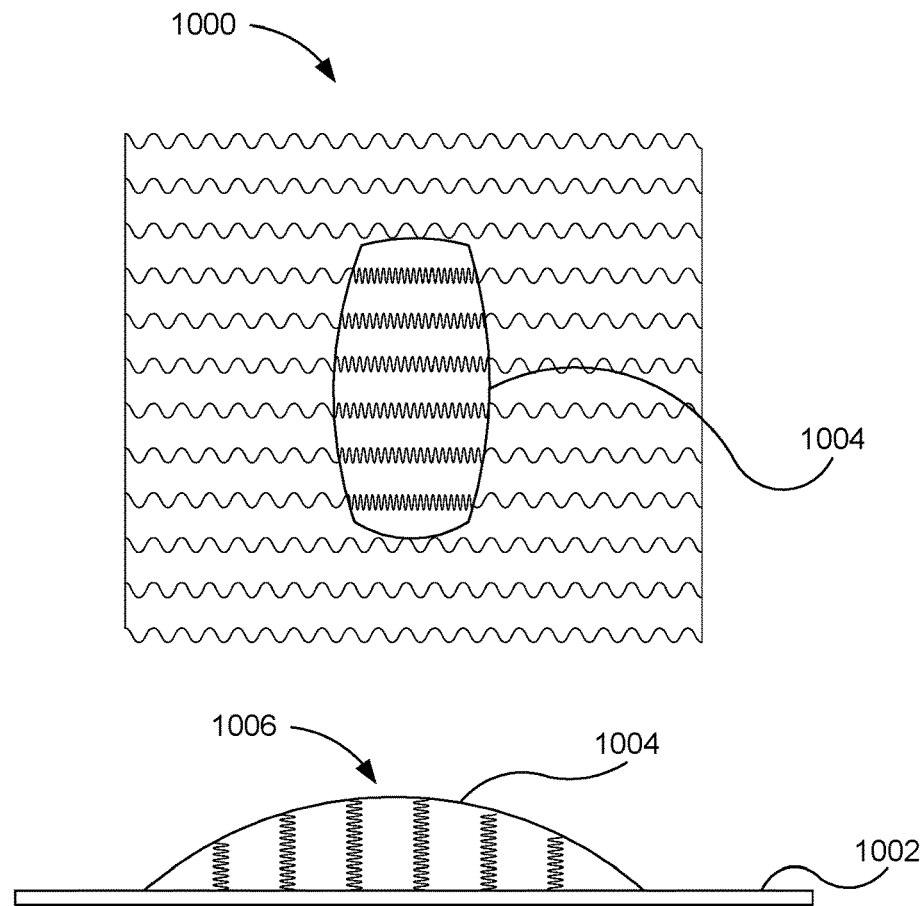
FIG. 10A illustrates two views of a knitted fabric that includes a volumetric knit that can be configured to house one or more non-knitted structures, in accordance with some embodiments.

FIG. 10A illustrates two views of a knitted fabric that includes a volumetric knit that can be configured to house one or more non-knitted structures, in accordance with some embodiments. First view 1000 shows a top-down view of a knitted structure 1002 that includes a volumetric portion 1004. The volumetric portion 1004 acts as a pocket allowing for a non-knitted structure (not pictured) to be placed within the cavity of the volumetric portion. In some embodiments, the non-knitted structure is inserted via an insertion component. In some embodiments, the non-knitted structure is a neuromuscular signal sensor (e.g., an electromyography sensor).

FIG. 10A also pictures a second view 1006 that shows a side view of the knitted structure 1002 that includes the volumetric portion 1004. In some embodiments, the knitted structure 1002 is produced on a multi-dimensional knitting machine that is configured to adjust its knit pattern while producing the knitted structure to produce the volumetric portion 1004. In some embodiments, the volumetric portion has no seam or boundary with the adjacent portion, as it produced by only changing the knit pattern (e.g., a denser knit pattern surrounded by portions that have a looser knit pattern can produce a volumetric pocket).

Figure 10B:
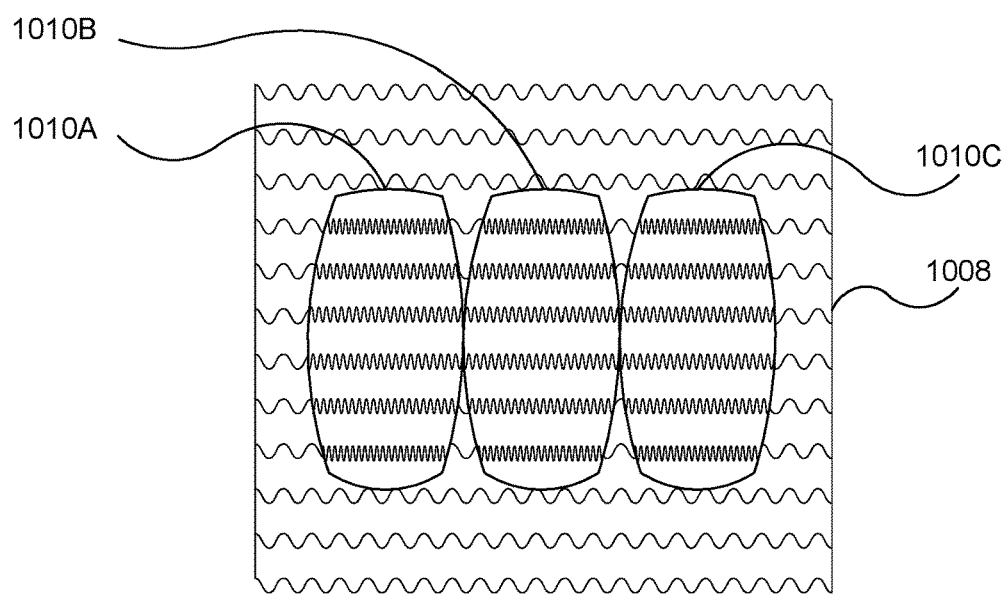
FIG. 10B shows an embodiment where multiple volumetric portions are placed on a single knitted structure, in accordance with some embodiments.

FIG. 10B shows an embodiment where multiple volumetric portions are placed on a single knitted structure 1008, in accordance with some embodiments. Multiple volumetric portions 1010A-1010C can allow for multiple non-knitted structures to be placed in close proximity to each other. In some embodiments, the volumetric portions are placed in a grid array spanning both x and y directions. In some embodiments, the volumetric portions are offset from each other along one or more axes.

The above descriptions complement the numerous manufacturing procedures and yarn types described in Appendix A, such that the various yarns (e.g., the different yarn materials that can be used described in reference to FIGS. 3-7 of Appendix A) and manufacturing procedures (e.g., laser cutting, die cutting, and forming electrical connections discussed generally in reference to FIGS. 8-55 in Appendix A) can be used in conjunction with the textile structures and manufacturing processes discussed elsewhere herein, and Appendix A is appended to this specification.

Figure 11:
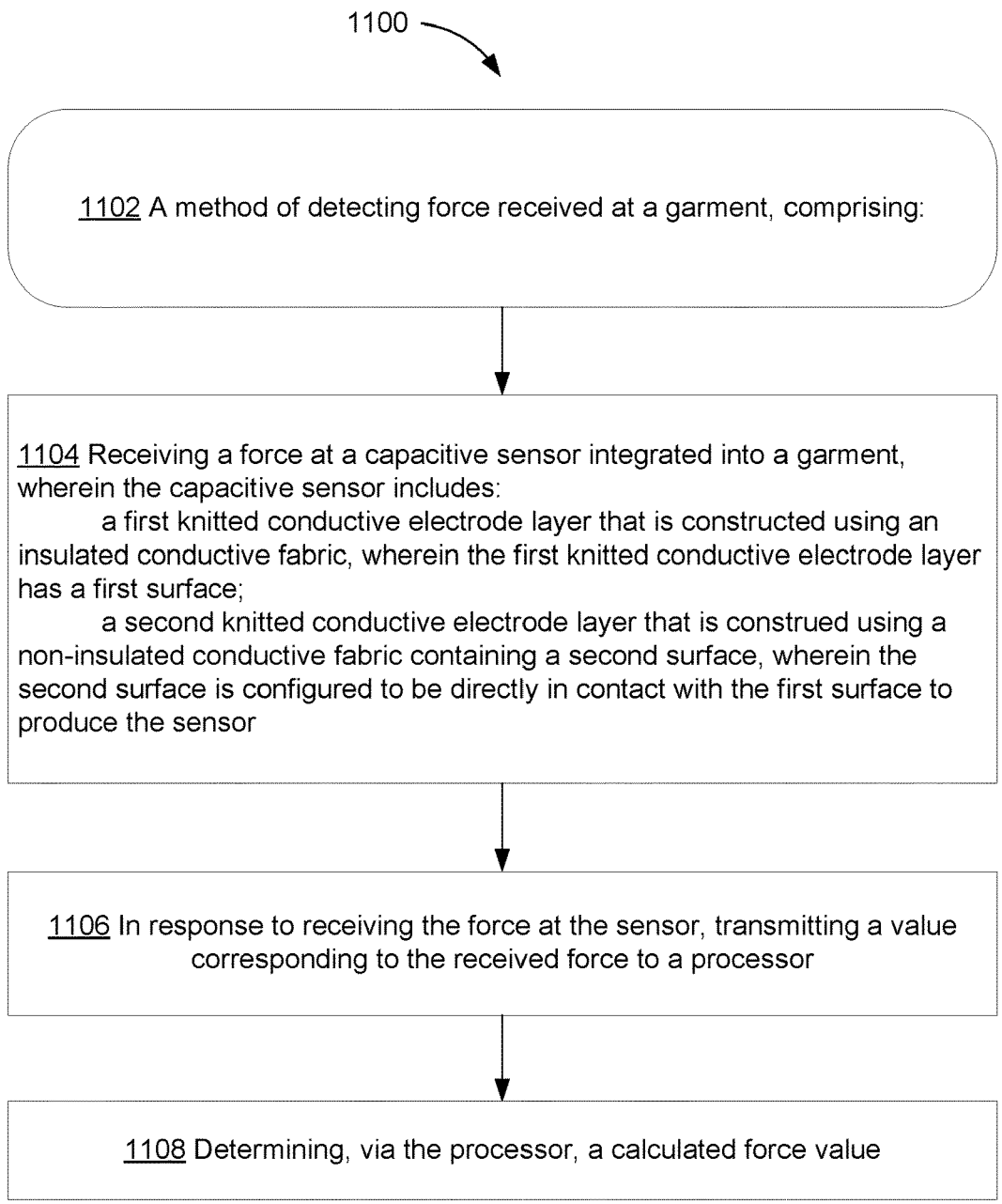
FIG. 11 illustrates a method flow chart for detecting force received at a garment, in accordance with some embodiments.

FIG. 11 illustrates method flow chart 1100 for detecting force received at a garment, in accordance with some embodiments.

(A1) In accordance with some embodiments, a method of detecting force received at a garment (1102), comprises, receiving (1104) a force at a sensor integrated into a garment, wherein the capacitive sensor includes: a first knitted conductive electrode layer that is constructed using an insulated conductive fabric, where the first knitted conductive electrode layer has a first surface, and a second knitted conductive electrode layer that is construed using a non-insulated conductive fabric containing a second surface, where the second surface is configured to be directly in contact with the first surface (e.g., knitted onto the same layer as the first layer, where the first layer is a structural component of a wearable device (e.g., glove)) to produce the sensor. The method also includes that in response to receiving the force at the sensor, transmitting (1106) a value corresponding to the received force to a processor. The method then includes determining (1108), via the processor, a calculated force value. More detail on the capacitive sensor of A1 is provided below in reference to B1 through B17. Appendix A provides for further details on example materials used for producing textile-based electrodes, such that any of the example materials shown and described in Appendix A could be used in conjunction with the other textile structures described herein and/or in conjunction with the manufacturing processes and techniques described herein as additions to or alternatives to the manufacturing processes and techniques described herein. For example, the conductive yarns (e.g., silvertech+150-22 Tex or Statex Shieldex Yarn 235/36 1-Ply) described in reference to FIGS. 3-7 of Appendix A.

(B1) In accordance with some embodiments, a garment-integrated capacitive sensor, comprises a first knitted conductive electrode layer that is constructed using an insulated conductive fabric (e.g., insulated conductive fabric can be made with a compressible/stretchable core (e.g., elastane, thermoplastic polyurethane (TPU)) that enables deformation at the yarn level, which enhances the capacitive sensors performance. In some embodiments, high surface area insulated conductors (e.g., enamel coated copper foil, etc.) wrapped around the core further improves sensor performance. In some embodiments, silver-copper alloy wires/foils provide balanced performance when electrical conductivity, cost, and fatigue resistance are considered compared to pure copper, tin copper alloy, and silver copper alloy). The first knitted conductive electrode layer has a first surface. The garment-integrated capacitive sensor also comprises a second knitted conductive electrode layer that is constructed using a non-insulated conductive fabric containing a second surface, the second surface is configured to be directly in contact with the first surface to produce a garment-integrated capacitive sensor. In some embodiments, the garment-integrated capacitive sensor is configured to be in communication with a processor, and is configured to receive a sensed value from the garment-integrated capacitive sensor.

For example, FIGS. 1A-1D illustrate examples of garment-integrated capacitive sensors integrated into a wearable device and their uses, in accordance with some embodiments.

In some embodiments, the second knitted conductive electrode layer is constructed using material such as: silver, platinum, gold, etc. In some embodiments, a coating/plating is applied at each fiber level (e.g., each fiber of the knitted conductive electrode is coated/plated). In some embodiments, solderable yarns enable easier electrical interconnections. In some embodiments, the second knitted conductive electrode layer is constructed using conductive yarns made from silver-plated nylon. In some embodiments, first knitted conductive electrode layer and second knitted conductive electrode layer are made from yarns/wires with a TPU core, and the TPU core allows for tunable compressibility. In some embodiments, electrical interconnects are made using ultrasonic bonding. In some embodiments, conductive or insulated conductive wire/foil is wrapped around it using a yarn cover/twist machine.

A garment-integrated capacitive sensor without separate dielectric has the capability to conform around the human body easier (e.g., curved portions such as a fingertip). In some embodiments, the textile sensors with custom shapes are knitted seamlessly as part of the substrate (e.g., glove fingertips, wristband), which is built in a single manufacturing step (e.g., a single knitting sequence). Some drawbacks of using dielectric film, such as 3-layer sensor geometry, in the sensor construction means that every time the sensor needs to be knitted, the machine has to be stopped and the dielectric film needs to be inserted manually in between electrodes. Another drawback of the three-layer design is that since the space for the dielectric film to be inserted is only a couple of millimeters, the dielectric film may not be inserted properly. When the dielectric film is not be inserted properly, the sensor can short. In addition, it is difficult to diagnose improper construction of the three-layer design until the whole glove/sensor swatch is knitted. Moreover, this step requires preparation of custom sized dielectric films to accommodate different shape/size sensors. In addition, the three-layer sensor configuration is more time consuming to produce and is more difficult to automate manufacturing.

(B2) In some embodiments of B1, the sensed value when processed by the processor can infer a force received at the garment-integrated capacitive sensor. For example, FIGS. 1C and 1D show in plot 121 and plot 126, respectively, show a determined force being received at the glove 100.

(B3) In some embodiments of any of B1-B2, the sensed value when processed by the processor can determine if the garment-integrated capacitive sensor is in contact with a surface. For example, FIG. 1C shows that in response to the glove 100 being in contact with a surface 120 at a location that corresponds to a virtual key of a virtual keyboard 124, a "H" letter 125 is displayed on a display (e.g., a real display or a display shown in an artificial reality).

(B4) In some embodiments of any of B1-B3, the processor is in further communication with an artificial-reality headset displaying an artificial reality, and the sensed value from the garment-integrated capacitive sensor is used to alter a visual aspect of the artificial reality. FIG. 1C shows an example of the glove providing an input (e.g., "H" letter 125 is displayed on a display) to a display via a virtual keyboard.

(B5) In some embodiments of B1-B4, the garment-integrated capacitive sensor is seamlessly knitted into a fabric that is not a capacitive sensor. For example, FIGS. 1A and 1B show that a knitted wearable-glove device 100 that includes one or more garment-integrated capacitive sensors, where the garment-integrated capacitive sensors are seamlessly integrated (e.g., at least on surface of the glove does not have a raised bead/stitch for tying the thread of the glove with the one or more garment-integrated capacitive sensors).

(B6) In some embodiments of B1-B5, the garment-integrated capacitive sensor is integrated into a wearable device (e.g., glove 100 shown in FIGS. 1A-1D), wherein the wearable includes a plurality of garment-integrated capacitive sensors. In some embodiments, the plurality of garment-integrated capacitive sensors can be split into quadrants, wherein the quadrants are configured to wrap around a fingertip a three-dimensional manner. In some embodiments, the plurality of garment-integrated capacitive sensors are knitted together continuously.

(B7) In some embodiments of B1-B6, each of the plurality of garment-integrated capacitive sensors can detect a pressure covering an area between 0.5-15 cm$^2$.

(B8) In some embodiments of B1-B7, the second surface is configured to be directly in contact with the first surface without a separate dielectric sheet. For example, FIG. 1A shows a two-layer capacitive sensor that has first-knitted-conductive-electrode layer 108 that is constructed using an insulated-conductive fabric and the second-knitted-conductive-electrode layer 110 that is constructed using a non-insulated-conductive fabric containing.

(B9) In some embodiments of B1-B8, the garment-integrated capacitive sensor is integrated into a wearable glove (e.g., glove 100 in FIGS. 1A-1D).

(B10) In some embodiments of B9, an additional garment integrated capacitive senor is integrated into the wearable glove (e.g., FIGS. 1A and 1B show a plurality of garment-integrated capacitive-sensor assemblies (e.g., 102A-102E in FIG. 1A and garment-integrated capacitive sensors 116A-116L in FIG. 1B).

(B11) In some embodiments of B10, the garment-integrated capacitive sensor and the additional garment integrated capacitive senor are located in separate fingertips of the wearable glove (e.g., garment-integrated capacitive-sensor assemblies 102A-102E). In some embodiments, sensors are located at each fingertip of the glove. In some embodiments, the sensors are located on the palmar side of the hand or on the dorsal side of the hand.

(B12) In some embodiments of B1-B9, the garment-integrated capacitive sensor is knitted together with a non-sensor portion of a garment using a v-bed knitting machine (e.g., FIG. 2 shows that a glove is being produced using a multi-dimensional knitting machine).

(B13) In some embodiments of B12, multiple garment-integrated capacitive sensors are knitted together with a non-sensor portion of a garment using a v-bed knitting machine (e.g., FIG. 2 shows that a glove is being produced using a multi-dimensional knitting machine).

(B14) In some embodiments of B13, the multiple garment-integrated capacitive sensors are knitted together using a lock and key knit pattern (e.g., a lock and key knit pattern increases the active surface area of the multiple garment-integrated capacitive sensors, thereby improving performance). In some embodiments, the lock and key knit pattern can be applied to improve energy storage of parallel electrodes, knitted components used for energy harvesting, etc., FIG. 1E illustrates a lock and key structure for connecting multiple integrated capacitive sensors.

(B15) In some embodiments of B1-B9, the insulated conductive fabric is constructed of a conductor that is coated with an insulating material. For example, a first-knitted-conductive-electrode layer 108 that is constructed using an insulated-conductive fabric is discussed in reference to FIG. 1A.

(B16) In some embodiments of B15, the insulating material does not alter the pliability of the conductive fabric.

(B17) In some embodiments of B1-B9, the insulated conductive fabric is constructed of a conductor with an insulated shroud surrounding the conductive fabric.

Figure 12:
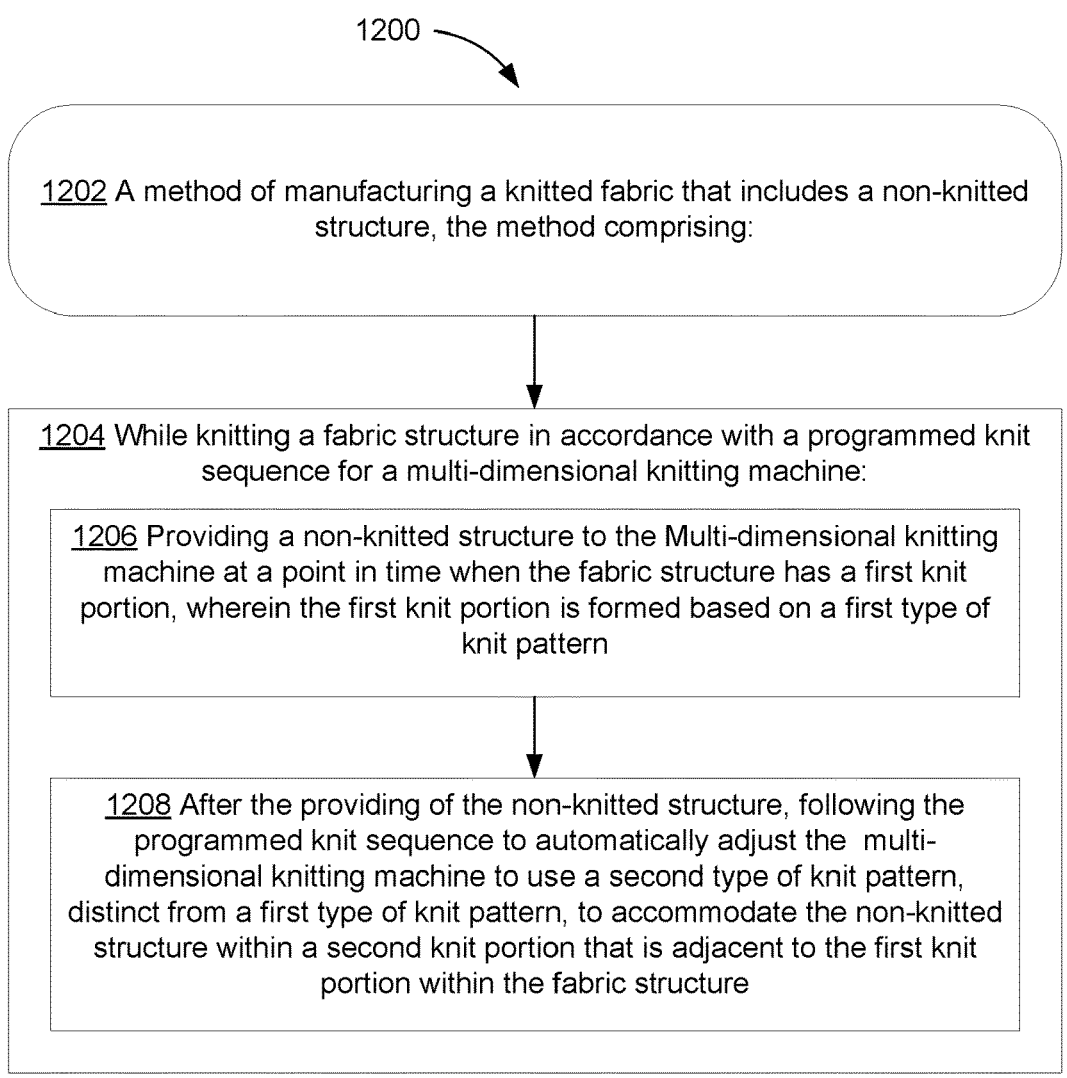
FIG. 12 illustrates a method flow chart for manufacturing a knitted fabric that includes a non-knitted structure, in accordance with some embodiments.

FIG. 12 illustrates method flow chart 1200 for manufacturing a knitted fabric that includes a non-knitted structure, in accordance with some embodiments.

(C1) In accordance with some embodiments, a method (1200) of manufacturing a knitted fabric that includes a non-knitted structure comprises, while knitting a fabric structure in accordance with a programmed knit sequence for a V-bed knitting machine (e.g., or any other suitable multi-dimensional knitting machine) (1200): providing (1204) a non-knitted structure to the V-bed knitting machine at a point in time when the fabric structure has a first knit portion, wherein the first knit portion is formed based on a first type of knit pattern, and after the providing of the non-knitted structure, following (1208) the programmed knit sequence to automatically adjust the V-bed knitting machine to use a second type of knit pattern, distinct from a first type of knit pattern, to accommodate the non-knitted structure within a second knit portion that is adjacent to the first knit portion within the fabric structure. For example, FIG. 2 illustrates a multi-dimensional knitting machine 200 that includes multiple non-fabric insertion components for inserting non-fabric components into a knitted fabric. FIG. 4 also illustrates an example of how a non-knitted structures 408A and 408B can be knitted into (i.e., inserted into) a knitted structure 405 (e.g., a glove).

(C2) In some embodiments of C1, the non-knitted structure is provided to the V-bed knitting machine via an insertion device that is distinct from the V-bed knitting machine (e.g., FIG. 4 illustrates an insertion component 402 that corresponds to a multi-dimensional knitting machine 400).

(C3) In some embodiments of any of C1-C2, the insertion device is passed through the V-bed knitting machine.

(C4) In some embodiments of any of C1-C3, the insertion device is attached to the V-bed knitting machine and feeds the non-knitted structure into the v-bed knitting machine in accordance with the programmed knit sequence (e.g., FIG. 4 illustrates that an insertion component 402 cam be mounted above one of the knitting beds of the multi-dimensional knitting machine 402).

(C5) In some embodiments of any of C1-C4, the first type of knit pattern has a higher knit density than the second type of knit pattern.

(C6) In some embodiments of any of C1-C5, the first type of knit pattern uses a type of knit pattern than stretches more (or less) than the second type of knit pattern (e.g., FIG. 4 shows in fourth pane 406D that a first-knit pattern 414 has a tighter (e.g. denser) knit than second-knit pattern 416 to accommodate additional movement).

(C7) In some embodiments of any of C1-C6, the non-knitted structure is a flexible circuit board (e.g., FIG. 4 shows that a non-knitted structure 405 (e.g., a printed circuit board) is being inserted into the knitted structure).

(C8) In some embodiments of any of C1-C7, the non-knitted structure is an electrical wire or bundle of electrical wires (e.g., FIG. 4 shows that a non-knitted structure 405 (e.g., an electrical wire or a bundle of electrical wires) is being inserted into the knitted structure).

(C9) In some embodiments of any of C1-C8, the non-knitted structure is a semi-rigid support for providing rigidity to the fabric structure (e.g., FIG. 4 shows that a non-knitted structure 405 (e.g., a semi-rigid support) is being inserted into the knitted structure).

(C10) In some embodiments of any of C1-C9, the first knit portion and the non-knitted structure within a second knit portion have substantially the same stretchability (e.g., one-way or two-way stretch). For example, FIGS. 5A-5B illustrate that a first knitted portion that does not include a non-knitted structure can stretch at the same rate as a second knitted portion that does include a non-knitted structure.

(C11) In some embodiments of any of C1-C10, including, after providing a non-knitted structure to the V-bed knitting machine at a point in time when the fabric structure has a first knit portion, formed based on a first type of knit pattern, and before following the programmed knit sequence to automatically adjust the V-bed knitting machine to use a second type of knit pattern. In some embodiments, the method also including, following the programed knit sequence to automatically create a transition area where the fabric has a second type of knit pattern, wherein the second type of knit pattern allows for more movement of the non-knitted structure. For example, FIG. 4 shows that the knit pattern changes to accommodate the the non-knitted structures 408A and 408B.

(C12) In some embodiments of any of C1-C11, the non-knitted structure is inserted such that it follows a meandering pattern along an axis, wherein the meandering pattern allows the non-knitted structure to stretch along the axis with knitted portions of the fabric structure. For example, FIG. 5A-5B illustrate a meandering pattern that allows a non-knitted structure 502 to move when the fabric is being stretched, without putting excess stress/strain on the non-knitted structure.

(C13) In some embodiments of any of C1-C12, the second type of knit pattern can be a volumetric knit to allow for a non-knitted structure to be placed in a volume of the volumetric knit. FIGS. 10A-10B illustrate that a volumetric portion 1004 and 1010A-1010C can be produced to house one or more non-knitted structures.

(C14) In some embodiments of any of C1-C13, the programmed knit sequence for a V-bed knitting machine is configured to accommodate multiple non-knitted structures while knitting the fabric structure (e.g., FIG. 4 shows non-knitted structures 408A and 408B being knitted into (i.e., inserted into) the knitted structure 405).

(C15) In some embodiments of C14, one of the multiple non-knitted structures is a different material than the non-knitted structure (e.g., as discussed in reference to FIG. 4, the non-knitted structure 405 can be a printed circuit board, an electrical wire, a bundle of electrical wires, semi rigid support, etc., which are different materials).

(C16) In some embodiments of C14, one of the multiple non-knitted structures is a different shape than the non-knitted structure (e.g., FIG. 4 shows that the non-knitted (e.g., conductive wires, flexible printed circuit board, etc.,) structures are a different shape than the knitted structure (e.g., a glove made with thread).

(C17) In accordance with some embodiments, a knitted fabric device that includes a non-knitted structure is configured in accordance with any of C1-C16.

(D1) In accordance with some embodiments, a method of manufacturing a knitting machine, comprises, providing a V-bed knitting machine and attaching an insertion mechanism to the V-bed knitting machine. The method also includes, interconnecting the V-bed knitting machine and the insertion mechanism to a processor, wherein the processor is configured to cause a performance of a method. The method includes, while knitting a fabric structure in accordance with a programmed knit sequence for the V-bed knitting machine: providing, a non-knitted structure, via the insertion mechanism, to the V-bed knitting machine at a point in time when the fabric structure has a first knit portion, formed based on a first type of knit pattern, and after the providing of the non-knitted structure, following the programmed knit sequence to automatically adjust the V-bed knitting machine to use a second type of knit pattern, distinct from a first type of knit pattern, to accommodate the non-knitted structure within a second knit portion that is adjacent to the first knit portion within the fabric structure.

Figure 13:
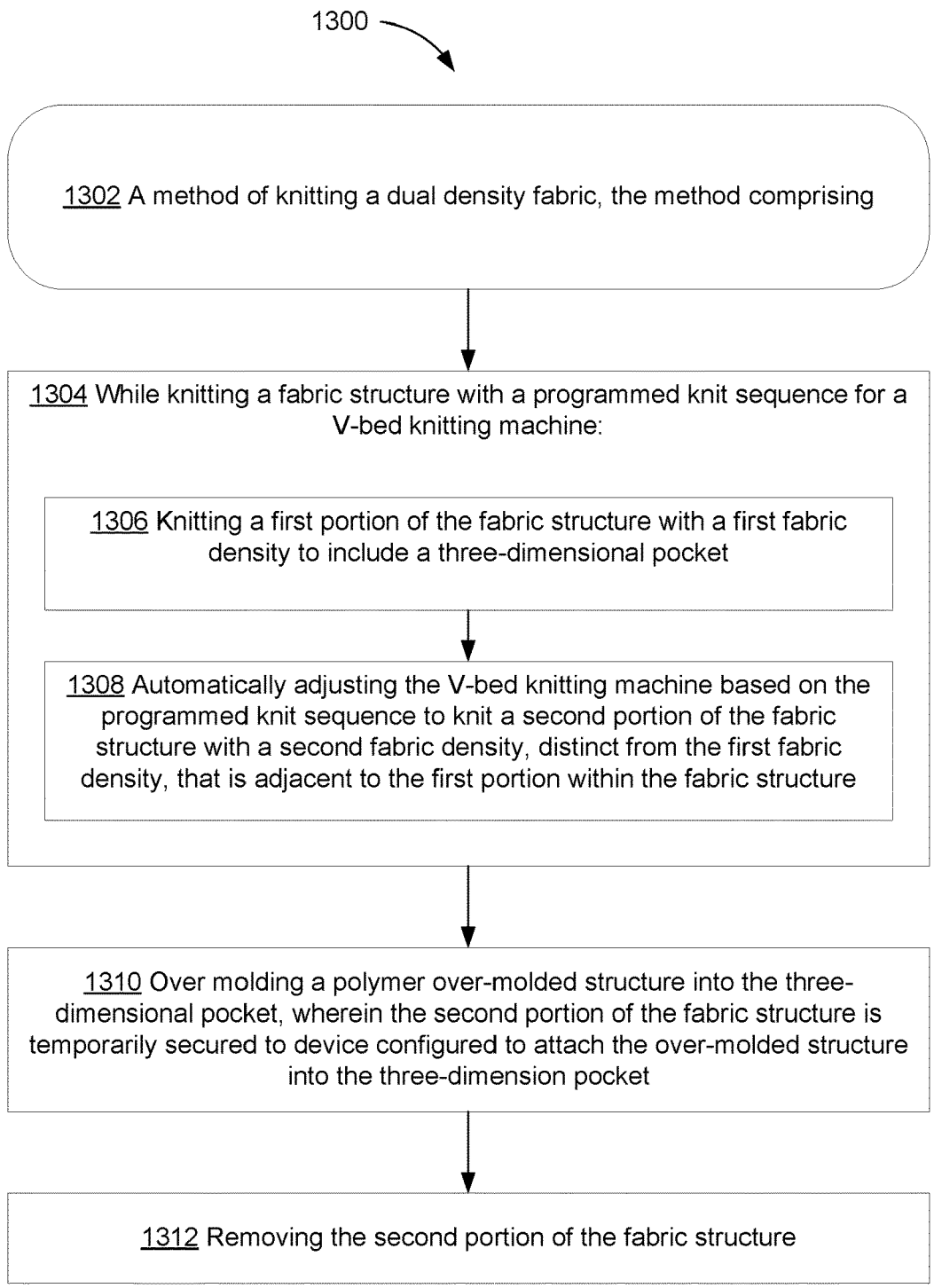
FIG. 13 shows a method flow chart for knitting a dual-density fabric that includes an over-molded structure, in accordance with some embodiments.

FIG. 13 shows a method 1300 for chart for knitting a dual density fabric that includes an over-molded structure, in accordance with some embodiments.

(E1) In accordance with some embodiments, a method (1300) of knitting a dual density fabric (1302), the method comprises, while knitting a fabric structure with a programmed knit sequence for a V-bed knitting machine (1304): knitting (1306) a first portion of the fabric structure with a first fabric density to include a three-dimensional pocket (e.g., the discussion in reference to FIGS. 7A-7G describes that the first fabric component 702 is stitched in a manner such that a volumetric pocket is produced), and automatically (1308) adjusting the V-bed knitting machine based on the programmed knit sequence to knit a second portion of the fabric structure with a second fabric density, distinct from the first fabric density, that is adjacent to the first portion within the fabric structure (e.g., FIGS. 7A-7G shows a second fabric component 704, which is a temporary piece). In some embodiments, the second portion is knitted first. For example, knitting the second portion of the fabric structure with the second fabric density, and automatically adjusting the V-bed knitting machine based on the programmed knit sequence to knit the first portion of the fabric structure to include a three-dimensional pocket with the first fabric density, distinct from the second fabric density, that is adjacent to the first portion within the fabric structure. The method also includes over molding (1310) a polymer overmolded structure into the three-dimensional pocket (e.g., FIG. 7F-7G shows an over-molded structure 714 that can be configured to include a matrix of haptic feedback generators (e.g., as illustrated by the bubble array 717)), where the second portion of the fabric structure is temporarily secured to device configured to attach the over-molded structure into the three-dimension pocket. The method also includes, removing (1312) the second portion of the fabric structure (e.g., FIG. 7G shows that two strings 718A and 718B being pulled from the knitted structure 700 and as a result the first fabric portion component 702 and the second fabric component 704 become detached from one another).

(E2) In some embodiments of E1, the three-dimensional pocket is configured to house one or more sensors. For example, the FIG. 7F includes an over-molded structure 714 that can include one or more sensors (e.g., embedded sensors).

(E3) In some embodiments of E2, the one or more sensors are neuromuscular sensors, and the neuromuscular sensors are configured to detect one or more neuromuscular signals of a user. For example, the FIG. 7F includes an over-molded structure 714 that can include one or more sensors where the sensors are neuromuscular signal sensors.

(E4) In some embodiments of E2, the one or more sensors are non-neuromuscular sensors, and the non-neuromuscular sensors are configured to detect one or more non-neuromuscular signals associated with a user. For example, the FIG. 7F includes an over-molded structure 714 that can include one or more sensors where the sensors are not neuromuscular signal sensors (e.g., temperature sensors, inertial measurement sensors, etc.,).

(E5) In some embodiments of any of E1-E2, the polymer over-molded structure is a component of a haptic feedback generation system. For example, the FIG. 7F includes an over-molded structure 714 that can include one or more haptic feedback generators (e.g., as illustrated by the bubble array 717)).

(E6) In some embodiments of E5, the haptic feedback generation system is a pressure activated system (e.g., a pneumatic or hydraulic system).

(E7) In some embodiments of E5, the haptic feedback generation system is an electrically activated system (e.g., a Dielectric Elastomer Actuator (DEA)).

(E8) In some embodiments of E5, haptic feedback generation system includes a matrix of haptic feedback generators (e.g., expandable bubbles for applying pressure to skin of a user). For example, FIG. 7F shows a bubble array 717.

(E9) In some embodiments of any of E1-E2, the fabric density is determined by a combination of material weight and stitch. For example, FIGS. 6A-6H illustrate multiple types of stitches with different gauges.

(E10) In some embodiments of any of E1-E2, including, before over molding the polymer over-molded structure into the three-dimensional pocket, placing (e.g., automatically) the fabric structure in an injection molding machine (e.g., FIG. 7D illustrates the knitted structure 700 being inserted into an over molding machine 708).

(E11) In some embodiments of E10, the placing of the fabric structure in the injection molding machine is done based on knitted position guides (e.g. holes in the fabric) integrated into the second portion of the fabric structure. For example, FIG. 7D shows a second fabric component 704 that includes guide holes 706A-706L that correspond to dowels 712A-712L.

(E12) In some embodiments of E11, the guides are holes (or markers (e.g., a different colored thread) or a fabric bump) for securing the fabric structure in a specific location within the injection molding machine. In some embodiments, the holes are automatically knitted into the second fabric structure. For example FIG. 7D shows dowels 712A-712L being inserted into the guide holes 706A-706L of the second fabric component 704 to ensure that the over molding machine 708 correctly places the over-molded structure onto the first fabric component 702.

(E13) In some embodiments of any of E1-E2, removing the second portion of the fabric structure does not compromise the first portion of the fabric structure.

(E14) In some embodiments of E13, removing the second portion of the fabric structure is done by removing a removable attachment threading (e.g., FIG. 7F also shows two strings 718A and 718B, which are configured to be the only strings attaching the first fabric component 702 with the second fabric component 704). In some embodiments of E13, removing the second portion of the fabric structure is done by unraveling the second portion of the fabric structure when pulling the string.

(E15) In some embodiments of E14, the removable attachment threading is a single thread. For example, in reference to the discussion of FIG. 7G, an alternate embodiment can include a single string that can be configured to detach the first fabric component 702 from the second fabric component.

(E16) In some embodiments of any of E1-E2, the first portion of the fabric structure includes a third density different than the first density. For example, the portion of the first fabric component that has a pocket (e.g., a volumetric pocket) can be done by changing the density of the fabric, similar to the volumetric pockets described in reference to FIGS. 10A-10B.

(E17) In some embodiments of any of E1-E2, the first portion of the fabric structure includes one or more stress relief holes (or cuts) for wrapping the second fabric structure around a finger of a user (e.g., one or more stress relief holes 707 are described in reference to FIG. 7C).

(E18) In some embodiments of any of E1-E2, the first portion of the fabric is configured to wick moisture away from the polymer over-molded structure. In some embodiments, reducing moisture improves performance of the haptic feedback generator.

(E19) In accordance with some embodiments, a knitted dual density fabric structure that includes an over-molded structure is configured in accordance with any of E1-E18.

Another embodiment concerning conductive deformable fabric will now be discussed below.

(F1) In accordance with some embodiments, a wearable device, comprises a conductive deformable fabric (e.g., FIGS. 8A-8B illustrate a fabric structure (e.g., a glove 800) that includes one or more portions that are made from a conductive deformable fabric (e.g., conductive deformable fabric portion 802), and the conductive deformable fabric comprises a conductive trace that has a non-extendable fixed length along a first axis. The conductive trace is knitted into a fabric structure to produce a conductive deformable material. The fabric structure includes a stitch pattern that facilitates the conductive trace to unfold and fold in a oscillating fashion to allow the conductive trace to expand and contract, respectively, along the first axis without exceeding the fixed length of the conductive trace, and the conductive deformable material is positioned within the wearable device such that when the wearable device is worn, the stitch pattern is over a joint of the user to allow the stitch pattern to expand or contract along with the movement of the joint. While a joint is used as a primary example of a portion of a body that can bend and cause stretching of the stitch pattern, a skilled artisan would understand that the same principles can be applied to any portion of the body that bends, expands, contracts, twists, etc., For example, FIGS. 9A-9C illustrate a fabric structure 900 that includes one or more portions that are made from a conductive deformable fabric 902 and the fabric structure 900 is configured to have two-way stretch.

(F2) In some embodiments of F1, the stitch pattern further facilitates the conductive trace to expand and contract along a second axis that is perpendicular to the first axis without exceeding the fixed length of the conductive trace. For example, FIG. 9C shows that the fabric structure 900 is in an extended state along both the x-axis and y-axis.

(F3) In some embodiments of any of F1-F2, the stitch pattern of the fabric structure allows the fabric structure to collapse via an alternating fold, wherein the conductive trace collapses along with the fabric structure. For example, FIGS. 9A-9C illustrate how the conductive deformable fabric 902 collapses along with fabric structure.

(F4) In some embodiments of any of F1-F3, the fabric structure includes elastic that allows the conductive deformable fabric to return to a default state.

(F5) In some embodiments of any of F1-F4, the conductive trace is linear along the non-extendable fixed length along the first axis (e.g., FIGS. 9A-9C show that the conductive deformable fabric 902 is linear along a first axis).

(F6) In some embodiments of any of F1-F5, the stitch pattern of the fabric structure is a jersey stitch pattern (e.g., a jersey pattern stitch, such as the stiches described in reference to FIGS. 6A-6H).

(F7) In some embodiments of any of F1-F6, the conductive trace is embroidered onto fabric structure (e.g., FIG. 8A-8B show a fabric structure (e.g., a glove 800) that includes one or more portions that are made from a conductive deformable fabric).

(F8) In some embodiments of any of F1-F7, a portion of the conductive trace is configured to be attached to a neuromuscular signal sensor (e.g., an electrode (e.g., a soft electrode made of a FKM)).

(F9) In some embodiments of any of F1-F8, the conductive trace is an insulated copper magnet wire.

(F10) In some embodiments of any of F1-F9, the wearable device is machine washable.

(F11) In some embodiments of any of F1-F10, the conductive deformable fabric is configured to contract to a size that is 300 percent less than the fixed length of the conductive trace (e.g., FIGS. 9A-9C illustrate that the fabric structure (e.g., a glove 800) that includes one or more portions that are made from a conductive deformable fabric that is configured to contract to a size 300 percent less than the length of the conductive deformable fabric when fully extended).

(F12) In some embodiments of any of F1-F11, a first portion of the conductive trace is configured to be in contact with a second portion of the conductive trace and does not electrically short.

(F13) In some embodiments of any of F1-F12, the conductive deformable fabric is configured to unfold and fold in a oscillating fashion for 8,000-20,000 number of cycles without performance degradation.

(F14) In some embodiments of any of F1-F13, electrical resistivity of conductive trace is increased (or decreased) in accordance with the width of the conductive trace along the fixed length of the conductive trace (e.g., thereby allowing for pose determinations to be made based on resulting values based on the changes in resistivity). For example, FIGS. 8A-9C all show how a strain value is calculated based on the changes in resistivity in accordance with the conductive deformable fabrics changes in length (e.g., unfolding).

(F15) In some embodiments of any of F1-F14, the unfolding and folding in a oscillating fashion follows an origami based folding technique.

(F16) In some embodiments of any of F1-F15, the conductive trace provides a signal that can be used to determine an amount of strain at the fabric structure (e.g., and consequently at the wearable device). For example, FIGS. 8A-9C all show how a strain value is calculated based on the changes in resistivity in accordance with the conductive deformable fabrics changes in length (e.g., unfolding).

(F17) In some embodiments of F16, the amount of strain on the fabric structure is used to determine movement of joint for interacting with an artificial reality environment. FIGS. 8A-8B show a user 801 wearing an artificial-reality headset 103 and the changes in resistivity of the glove in accordance with it unfolding can produce an input into the artificial reality environment.

Features described above in reference to A1 to F17 can be interchanged. For example any technique concerning a multi-dimensional knitting machine can be used to produce any of the knitted fabrics/garments described in reference to A1 to F17.

One of ordinary skill in the art would appreciate that the methods of use, methods of manufacturing, and devices described above can be incorporate into a single wearable device and manufacturing process of that device. For example, a knitting machine produced from the method of manufacturing a knitting machine described in reference to D1 can be used to produce a wearable device (e.g., a glove) that includes two or more of: a force sensing device described in reference to A1-B17, a knitted fabric that includes a non-knitted structure that is produced from the method of manufacturing described in reference to C1-C16, a dual density fabric described in the method described in reference to E1-E18, and/or the wearable device that comprises a conductive deformable fabric described in reference to F1-F17.

In other example embodiments, which are described in Appendix A, a wristband can be provide. The wristband can include a textile main body; a textile electrode located at a surface of the textile main body; a flexible printed circuit; and textile conductive traces electrically connecting the textile electrode with the flexible printed circuit. These textile conductive traces can be integrated with knit structures using the techniques described above, and additional details regarding this wristband are also provided in Appendix A. The textile electrode can be located along an inner surface of the textile main body. The textile electrode can include a conductive yarn (examples of which are described in Appendix A). The textile main body and the textile electrode can be formed using a method selected from the group consisting of knitting, weaving, and embroidery. The flexible printed circuit can be integrated into the textile main body.

In another aspect also described in Appendix A, a fabric electrode can be provided that includes a knit, woven, or embroidered textile.

The knitted structures described above can be implemented in various forms and can be used in conjunction with artificial-reality systems (e.g., to provide a soft wearable glove for use as an input and sensing device for use with artificial-reality systems). Thus, described below are examples of wrist-wearable devices, headset devices, systems, and haptic feedback devices to provide further context for the systems in which the techniques described herein can be utilized. Specific operations described above may occur as a result of specific hardware, such hardware is described in further detail below. The devices described below are not limiting and features on these devices can be removed or additional features can be added to these devices.

Example Wrist-Wearable Devices

Figure 14A:
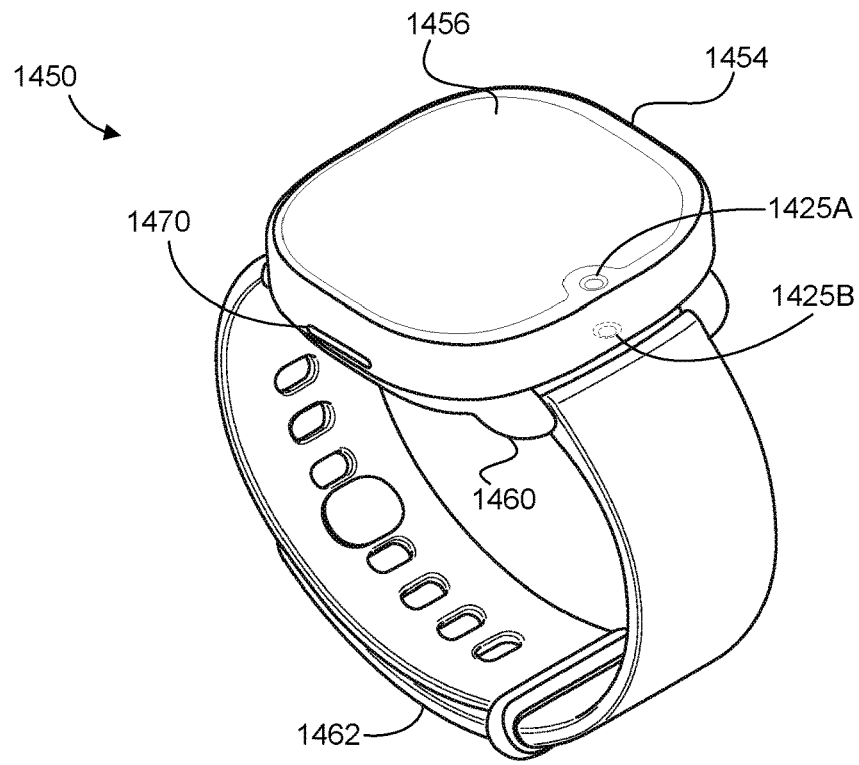
FIGS. 14A-14E illustrate an example wrist-wearable device, in accordance with some embodiments.
Figure 14A:
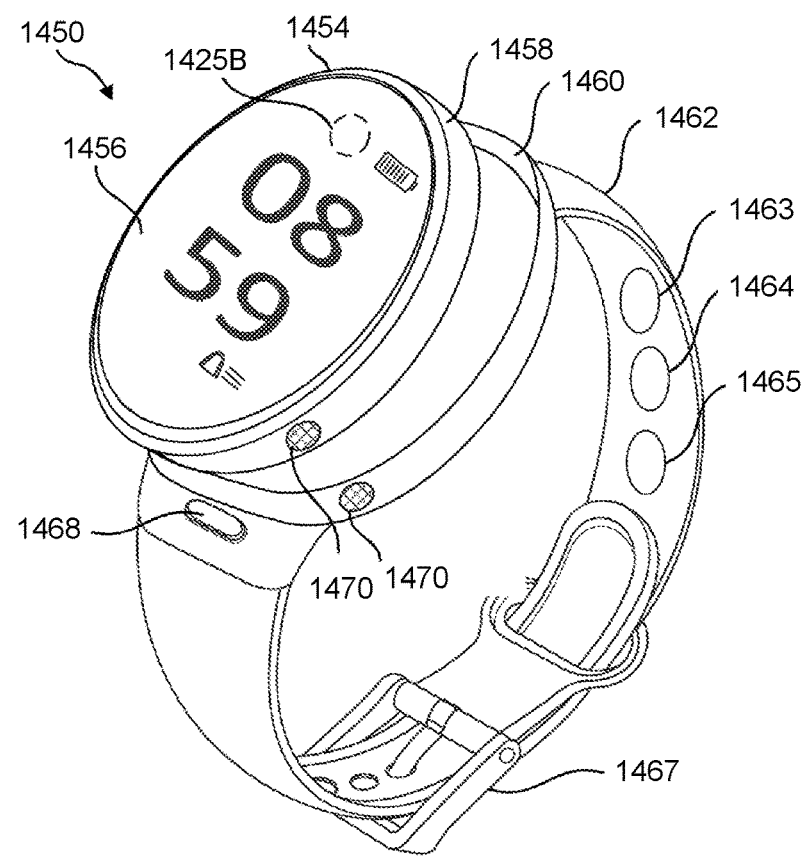
Figure 14B:
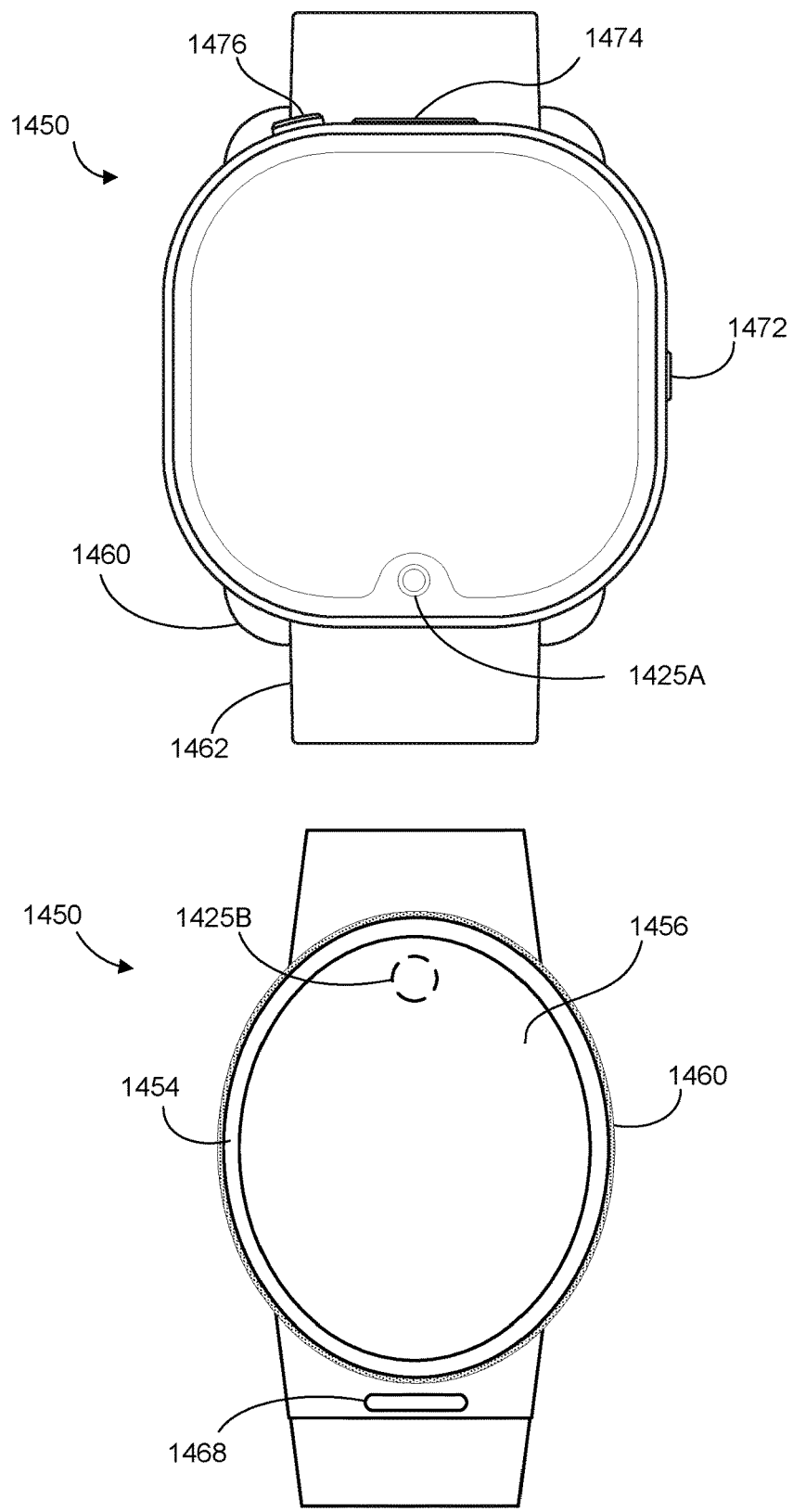

FIGS. 14A and 14B illustrate an example wrist-wearable device 1450, in accordance with some embodiments. The wrist-wearable device 1450 is an instance of the wearable device described herein, such that the wearable device should be understood to have the features of the wrist-wearable device 1450 and vice versa. FIG. 14A illustrates a perspective view of the wrist-wearable device 1450 that includes a watch body 1454 coupled with a watch band 1462. The watch body 1454 and the watch band 1462 can have a substantially rectangular or circular shape and can be configured to allow a user to wear the wrist-wearable device 1450 on a body part (e.g., a wrist). The wrist-wearable device 1450 can include a retaining mechanism 1467 (e.g., a buckle, a hook and loop fastener, etc.) for securing the watch band 1462 to the user's wrist. The wrist-wearable device 1450 can also include a coupling mechanism 1460 (e.g., a cradle) for detachably coupling the capsule or watch body 1454 (via a coupling surface of the watch body 1454) to the watch band 1462.

The wrist-wearable device 1450 can perform various functions associated with navigating through user interfaces and selectively opening applications. As will be described in more detail below, operations executed by the wrist-wearable device 1450 can include, without limitation, display of visual content to the user (e.g., visual content displayed on display 1456); sensing user input (e.g., sensing a touch on peripheral button 1468, sensing biometric data on sensor 1464, sensing neuromuscular signals on neuromuscular sensor 1465, etc.); messaging (e.g., text, speech, video, etc.); image capture; wireless communications (e.g., cellular, near field, Wi-Fi, personal area network, etc.); location determination; financial transactions; providing haptic feedback; alarms; notifications; biometric authentication; health monitoring; sleep monitoring; etc. These functions can be executed independently in the watch body 1454, independently in the watch band 1462, and/or in communication between the watch body 1454 and the watch band 1462. In some embodiments, functions can be executed on the wrist-wearable device 1450 in conjunction with an artificial-reality environment that includes, but is not limited to, virtual-reality (VR) environments (including non-immersive, semi-immersive, and fully immersive VR environments); augmented-reality environments (including marker-based augmented-reality environments, markerless augmented-reality environments, location-based augmented-reality environments, and projection-based augmented-reality environments); hybrid reality; and other types of mixed-reality environments. As the skilled artisan will appreciate upon reading the descriptions provided herein, the novel wearable devices described herein can be used with any of these types of artificial-reality environments.

The watch band 1462 can be configured to be worn by a user such that an inner surface of the watch band 1462 is in contact with the user's skin. When worn by a user, sensor 1464 is in contact with the user's skin. The sensor 1464 can be a biosensor that senses a user's heart rate, saturated oxygen level, temperature, sweat level, muscle intentions, or a combination thereof. The watch band 1462 can include multiple sensors 1464 that can be distributed on an inside and/or an outside surface of the watch band 1462. Additionally, or alternatively, the watch body 1454 can include sensors that are the same or different than those of the watch band 1462 (or the watch band 1462 can include no sensors at all in some embodiments). For example, multiple sensors can be distributed on an inside and/or an outside surface of the watch body 1454. As described below with reference to FIGS. 14B and/or 14C, the watch body 1454 can include, without limitation, a front-facing image sensor 1425A and/or a rear-facing image sensor 1425B, a biometric sensor, an IMU, a heart rate sensor, a saturated oxygen sensor, a neuromuscular sensor(s), an altimeter sensor, a temperature sensor, a bioimpedance sensor, a pedometer sensor, an optical sensor (e.g., imaging sensor 14104), a touch sensor, a sweat sensor, etc. The sensor 1464 can also include a sensor that provides data about a user's environment including a user's motion (e.g., an IMU), altitude, location, orientation, gait, or a combination thereof. The sensor 1464 can also include a light sensor (e.g., an infrared light sensor, a visible light sensor) that is configured to track a position and/or motion of the watch body 1454 and/or the watch band 1462. The watch band 1462 can transmit the data acquired by sensor 1464 to the watch body 1454 using a wired communication method (e.g., a Universal Asynchronous Receiver/Transmitter (UART), a USB transceiver, etc.) and/or a wireless communication method (e.g., near field communication, Bluetooth, etc.). The watch band 1462 can be configured to operate (e.g., to collect data using sensor 1464) independent of whether the watch body 1454 is coupled to or decoupled from watch band 1462.

In some examples, the watch band 1462 can include a neuromuscular sensor 1465 (e.g., an EMG sensor, a mechanomyogram (MMG) sensor, a sonomyography (SMG) sensor, etc.). Neuromuscular sensor 1465 can sense a user's intention to perform certain motor actions. The sensed muscle intention can be used to control certain user interfaces displayed on the display 1456 of the wrist-wearable device 1450 and/or can be transmitted to a device responsible for rendering an artificial-reality environment (e.g., a head-mounted display) to perform an action in an associated artificial-reality environment, such as to control the motion of a virtual device displayed to the user.

Signals from neuromuscular sensor 1465 can be used to provide a user with an enhanced interaction with a physical object and/or a virtual object in an artificial-reality application generated by an artificial-reality system (e.g., user interface objects presented on the display 1456, or another computing device (e.g., a smartphone)). Signals from neuromuscular sensor 1465 can be obtained (e.g., sensed and recorded) by one or more neuromuscular sensors 1465 of the watch band 1462. Although FIG. 14A shows one neuromuscular sensor 1465, the watch band 1462 can include a plurality of neuromuscular sensors 1465 arranged circumferentially on an inside surface of the watch band 1462 such that the plurality of neuromuscular sensors 1465 contact the skin of the user. The watch band 1462 can include a plurality of neuromuscular sensors 1465 arranged circumferentially on an inside surface of the watch band 1462. Neuromuscular sensor 1465 can sense and record neuromuscular signals from the user as the user performs muscular activations (e.g., movements, gestures, etc.). The muscular activations performed by the user can include static gestures, such as placing the user's hand palm down on a table; dynamic gestures, such as grasping a physical or virtual object; and covert gestures that are imperceptible to another person, such as slightly tensing a joint by co-contracting opposing muscles or using sub-muscular activations. The muscular activations performed by the user can include symbolic gestures (e.g., gestures mapped to other gestures, interactions, or commands, for example, based on a gesture vocabulary that specifies the mapping of gestures to commands).

The watch band 1462 and/or watch body 1454 can include a haptic device 1463 (e.g., a vibratory haptic actuator) that is configured to provide haptic feedback (e.g., a cutaneous and/or kinesthetic sensation, etc.) to the user's skin. The sensors 1464 and 1465, and/or the haptic device 1463 can be configured to operate in conjunction with multiple applications including, without limitation, health monitoring, social media, game playing, and artificial reality (e.g., the applications associated with artificial reality).

The wrist-wearable device 1450 can include a coupling mechanism (also referred to as a cradle) for detachably coupling the watch body 1454 to the watch band 1462. A user can detach the watch body 1454 from the watch band 1462 in order to reduce the encumbrance of the wrist-wearable device 1450 to the user. The wrist-wearable device 1450 can include a coupling surface on the watch body 1454 and/or coupling mechanism(s) 1460 (e.g., a cradle, a tracker band, a support base, a clasp). A user can perform any type of motion to couple the watch body 1454 to the watch band 1462 and to decouple the watch body 1454 from the watch band 1462. For example, a user can twist, slide, turn, push, pull, or rotate the watch body 1454 relative to the watch band 1462, or a combination thereof, to attach the watch body 1454 to the watch band 1462 and to detach the watch body 1454 from the watch band 1462.

As shown in the example of FIG. 14A, the watch band coupling mechanism 1460 can include a type of frame or shell that allows the watch body 1454 coupling surface to be retained within the watch band coupling mechanism 1460. The watch body 1454 can be detachably coupled to the watch band 1462 through a friction fit, magnetic coupling, a rotation-based connector, a shear-pin coupler, a retention spring, one or more magnets, a clip, a pin shaft, a hook and loop fastener, or a combination thereof. In some examples, the watch body 1454 can be decoupled from the watch band 1462 by actuation of the release mechanism 1470. The release mechanism 1470 can include, without limitation, a button, a knob, a plunger, a handle, a lever, a fastener, a clasp, a dial, a latch, or a combination thereof.

As shown in FIGS. 14A-14B, the coupling mechanism 1460 can be configured to receive a coupling surface proximate to the bottom side of the watch body 1454 (e.g., a side opposite to a front side of the watch body 1454 where the display 1456 is located), such that a user can push the watch body 1454 downward into the coupling mechanism 1460 to attach the watch body 1454 to the coupling mechanism 1460. In some embodiments, the coupling mechanism 1460 can be configured to receive a top side of the watch body 1454 (e.g., a side proximate to the front side of the watch body 1454 where the display 1456 is located) that is pushed upward into the cradle, as opposed to being pushed downward into the coupling mechanism 1460. In some embodiments, the coupling mechanism 1460 is an integrated component of the watch band 1462 such that the watch band 1462 and the coupling mechanism 1460 are a single unitary structure.

The wrist-wearable device 1450 can include a single release mechanism 1470 or multiple release mechanisms 1470 (e.g., two release mechanisms 1470 positioned on opposing sides of the wrist-wearable device 1450 such as spring-loaded buttons). As shown in FIG. 14A, the release mechanism 1470 can be positioned on the watch body 1454 and/or the watch band coupling mechanism 1460. Although FIG. 14A shows release mechanism 1470 positioned at a corner of watch body 1454 and at a corner of watch band coupling mechanism 1460, the release mechanism 1470 can be positioned anywhere on watch body 1454 and/or watch band coupling mechanism 1460 that is convenient for a user of wrist-wearable device 1450 to actuate. A user of the wrist-wearable device 1450 can actuate the release mechanism 1470 by pushing, turning, lifting, depressing, shifting, or performing other actions on the release mechanism 1470. Actuation of the release mechanism 1470 can release (e.g., decouple) the watch body 1454 from the watch band coupling mechanism 1460 and the watch band 1462 allowing the user to use the watch body 1454 independently from watch band 1462. For example, decoupling the watch body 1454 from the watch band 1462 can allow the user to capture images using rear-facing image sensor 1425B.

FIG. 14B includes top views of examples of the wrist-wearable device 1450. The examples of the wrist-wearable device 1450 shown in FIGS. 14A-14B can include a coupling mechanism 1460 (as shown in FIG. 14B, the shape of the coupling mechanism can correspond to the shape of the watch body 1454 of the wrist-wearable device 1450). The watch body 1454 can be detachably coupled to the coupling mechanism 1460 through a friction fit, magnetic coupling, a rotation-based connector, a shear-pin coupler, a retention spring, one or more magnets, a clip, a pin shaft, a hook and loop fastener, or any combination thereof.

In some examples, the watch body 1454 can be decoupled from the coupling mechanism 1460 by actuation of a release mechanism 1470. The release mechanism 1470 can include, without limitation, a button, a knob, a plunger, a handle, a lever, a fastener, a clasp, a dial, a latch, or a combination thereof. In some examples, the wristband system functions can be executed independently in the watch body 1454, independently in the coupling mechanism 1460, and/or in communication between the watch body 1454 and the coupling mechanism 1460. The coupling mechanism 1460 can be configured to operate independently (e.g., execute functions independently) from watch body 1454. Additionally, or alternatively, the watch body 1454 can be configured to operate independently (e.g., execute functions independently) from the coupling mechanism 1460. As described below with reference to the block diagram of FIG. 14A, the coupling mechanism 1460 and/or the watch body 1454 can each include the independent resources required to independently execute functions. For example, the coupling mechanism 1460 and/or the watch body 1454 can each include a power source (e.g., a battery), a memory, data storage, a processor (e.g., a central processing unit (CPU)), communications, a light source, and/or input/output devices.

The wrist-wearable device 1450 can have various peripheral buttons 1472, 1474, and 1476, for performing various operations at the wrist-wearable device 1450. Also, various sensors, including one or both of the sensors 1464 and 1465, can be located on the bottom of the watch body 1454, and can optionally be used even when the watch body 1454 is detached from the watch band 1462.

Figure 14C:
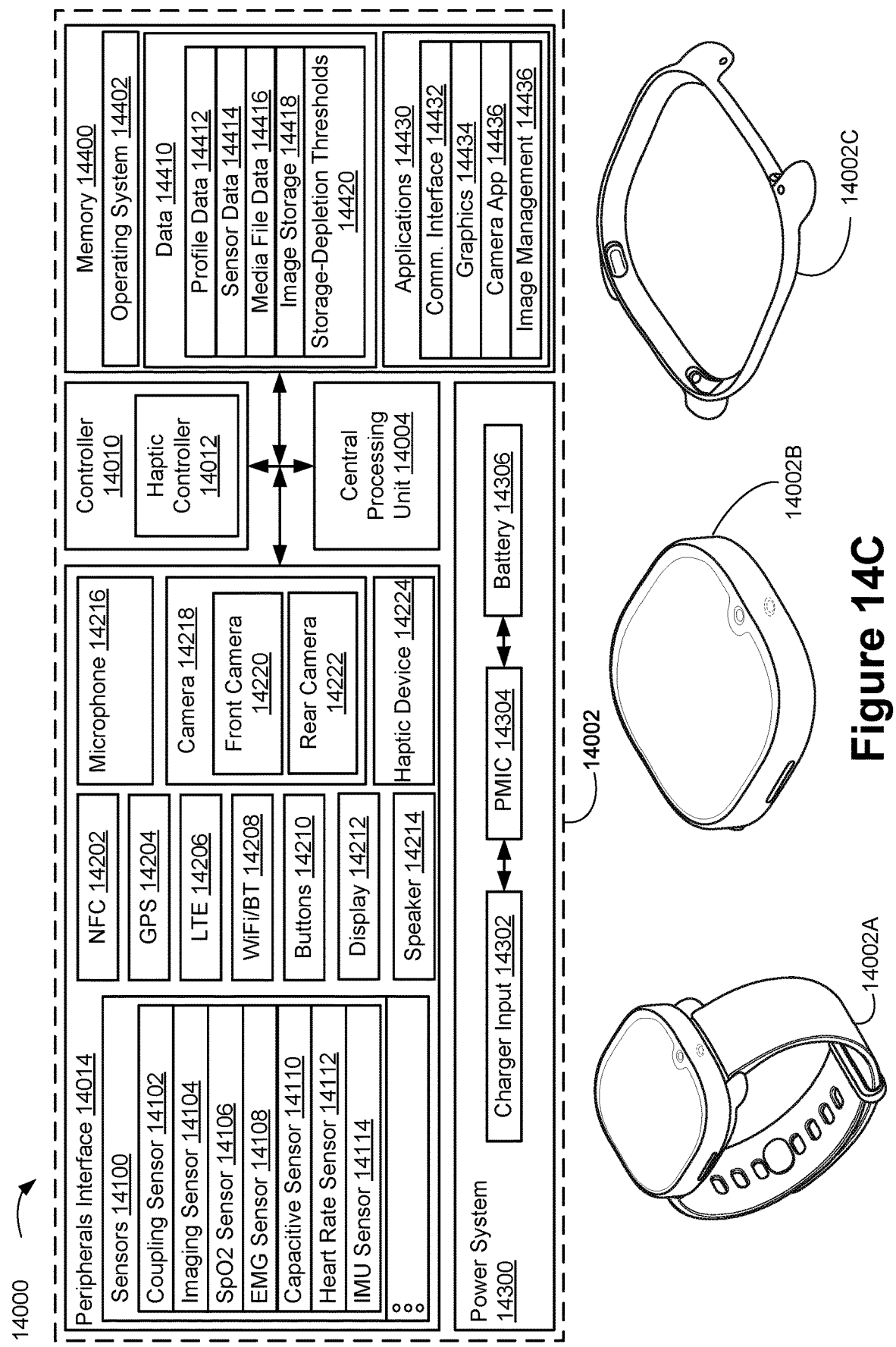

FIG. 14C is a block diagram of a computing system 14000, according to at least one embodiment of the present disclosure. The computing system 14000 includes an electronic device 14002, which can be, for example, a wrist-wearable device. The wrist-wearable device 1450 described in detail above with respect to FIGS. 14A-14B is an example of the electronic device 14002, so the electronic device 14002 will be understood to include the components shown and described below for the computing system 14000. In some embodiments, all, or a substantial portion of the components of the computing system 14000 are included in a single integrated circuit. In some embodiments, the computing system 14000 can have a split architecture (e.g., a split mechanical architecture, a split electrical architecture) between a watch body (e.g., a watch body 1454 in FIGS. 14A-14B) and a watch band (e.g., a watch band 1462 in FIGS. 14A-14B). The electronic device 14002 can include a processor (e.g., a central processing unit 14004), a controller 14010, a peripherals interface 14014 that includes one or more sensors 14100 and various peripheral devices, a power source (e.g., a power system 14300), and memory (e.g., a memory 14400) that includes an operating system (e.g., an operating system 14402), data (e.g., data 14410), and one or more applications (e.g., applications 14430).

In some embodiments, the computing system 14000 includes the power system 14300 which includes a charger input 14302, a power-management integrated circuit (PMIC) 14304, and a battery 14306.

In some embodiments, a watch body and a watch band can each be electronic devices 14002 that each have respective batteries (e.g., battery 14306), and can share power with each other. The watch body and the watch band can receive a charge using a variety of techniques. In some embodiments, the watch body and the watch band can use a wired charging assembly (e.g., power cords) to receive the charge. Alternatively, or in addition, the watch body and/or the watch band can be configured for wireless charging. For example, a portable charging device can be designed to mate with a portion of watch body and/or watch band and wirelessly deliver usable power to a battery of watch body and/or watch band.

The watch body and the watch band can have independent power systems 14300 to enable each to operate independently. The watch body and watch band can also share power (e.g., one can charge the other) via respective PMICs 14304 that can share power over power and ground conductors and/or over wireless charging antennas.

In some embodiments, the peripherals interface 14014 can include one or more sensors 14100. The sensors 14100 can include a coupling sensor 14102 for detecting when the electronic device 14002 is coupled with another electronic device 14002 (e.g., a watch body can detect when it is coupled to a watch band, and vice versa). The sensors 14100 can include imaging sensors 14104 for collecting imaging data, which can optionally be the same device as one or more of the cameras 14218. In some embodiments, the imaging sensors 14104 can be separate from the cameras 14218. In some embodiments the sensors include an SpO2 sensor 14106. In some embodiments, the sensors 14100 include an EMG sensor 14108 for detecting, for example muscular movements by a user of the electronic device 14002. In some embodiments, the sensors 14100 include a capacitive sensor 14110 for detecting changes in potential of a portion of a user's body. In some embodiments, the sensors 14100 include a heart rate sensor 14112. In some embodiments, the sensors 5100 include an inertial measurement unit (IMU) sensor 14114 for detecting, for example, changes in acceleration of the user's hand.

In some embodiments, the peripherals interface 14014 includes a near-field communication (NFC) component 14202, a global-position system (GPS) component 14204, a long-term evolution (LTE) component 14206, and or a Wi-Fi or Bluetooth communication component 14208.

In some embodiments, the peripherals interface includes one or more buttons (e.g., the peripheral buttons 1457, 1458, and 1459 in FIG. 14B), which, when selected by a user, cause operation to be performed at the electronic device 14002.

The electronic device 14002 can include at least one display 14212, for displaying visual affordances to the user, including user-interface elements and/or three-dimensional virtual objects. The display can also include a touch screen for inputting user inputs, such as touch gestures, swipe gestures, and the like.

The electronic device 14002 can include at least one speaker 14214 and at least one microphone 14216 for providing audio signals to the user and receiving audio input from the user. The user can provide user inputs through the microphone 14216 and can also receive audio output from the speaker 14214 as part of a haptic event provided by the haptic controller 14012.

The electronic device 14002 can include at least one camera 14218, including a front camera 14220 and a rear camera 14222. In some embodiments, the electronic device 14002 can be a head-wearable device, and one of the cameras 14218 can be integrated with a lens assembly of the head-wearable device.

One or more of the electronic devices 14002 can include one or more haptic controllers 14012 and associated componentry for providing haptic events at one or more of the electronic devices 14002 (e.g., a vibrating sensation or audio output in response to an event at the electronic device 14002). The haptic controllers 14012 can communicate with one or more electroacoustic devices, including a speaker of the one or more speakers 14214 and/or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). The haptic controller 14012 can provide haptic events to that are capable of being sensed by a user of the electronic devices 14002. In some embodiments, the one or more haptic controllers 14012 can receive input signals from an application of the applications 14430.

Memory 14400 optionally includes high-speed random-access memory and optionally also includes non-volatile memory, such as one or more magnetic disk storage devices, flash memory devices, or other non-volatile solid-state memory devices. Access to the memory 14400 by other components of the electronic device 14002, such as the one or more processors of the central processing unit 14004, and the peripherals interface 14014 is optionally controlled by a memory controller of the controllers 14010.

In some embodiments, software components stored in the memory 14400 can include one or more operating systems 14402 (e.g., a Linux-based operating system, an Android operating system, etc.). The memory 14400 can also include data 14410, including structured data (e.g., SQL databases, MongoDB databases, GraphQL data, JSON data, etc.). The data 14410 can include profile data 14412, sensor data 14414, media file data 14414.

In some embodiments, software components stored in the memory 14400 include one or more applications 14430 configured to be perform operations at the electronic devices 14002. In some embodiments, the one or more applications 14430 include one or more communication interface modules 14432, one or more graphics modules 14434, one or more camera application modules 14436. In some embodiments, a plurality of applications 14430 can work in conjunction with one another to perform various tasks at one or more of the electronic devices 14002.

It should be appreciated that the electronic devices 14002 are only some examples of the electronic devices 14002 within the computing system 14000, and that other electronic devices 14002 that are part of the computing system 14000 can have more or fewer components than shown optionally combines two or more components, or optionally have a different configuration or arrangement of the components. The various components shown in FIG. 14C are implemented in hardware, software, firmware, or a combination thereof, including one or more signal processing and/or application-specific integrated circuits.

As illustrated by the lower portion of FIG. 14C, various individual components of a wrist-wearable device can be examples of the electronic device 14002. For example, some or all of the components shown in the electronic device 14002 can be housed or otherwise disposed in a combined watch device 14002A, or within individual components of the capsule device watch body 14002B, the cradle portion 14002C, and/or a watch band.

Figure 14D:
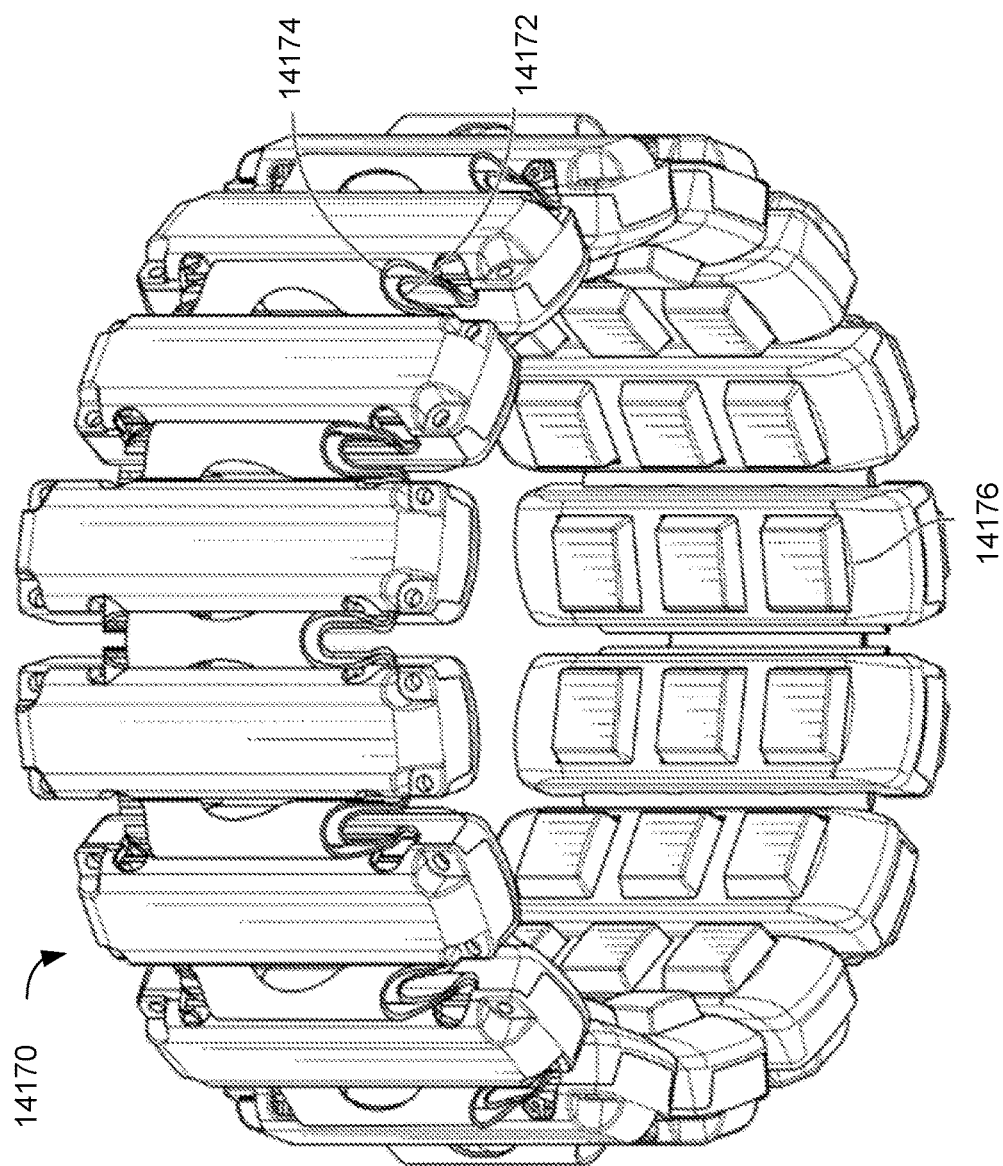

FIG. 14D illustrates a wearable device 14170, in accordance with some embodiments. In some embodiments, the wearable device 14170 is used to generate control information (e.g., sensed data about neuromuscular signals or instructions to perform certain commands after the data is sensed) for causing a computing device to perform one or more input commands. In some embodiments, the wearable device 14170 includes a plurality of neuromuscular sensors 14176. In some embodiments, the plurality of neuromuscular sensors 14176 includes a predetermined number of (e.g., 16) neuromuscular sensors (e.g., EMG sensors) arranged circumferentially around an elastic band 14174. The plurality of neuromuscular sensors 14176 may include any suitable number of neuromuscular sensors. In some embodiments, the number and arrangement of neuromuscular sensors 14176 depends on the particular application for which the wearable device 14170 is used. For instance, a wearable device 14170 configured as an armband, wristband, or chest-band may include a plurality of neuromuscular sensors 14176 with different number of neuromuscular sensors and different arrangement for each use case, such as medical use cases as compared to gaming or general day-to-day use cases. For example, at least 16 neuromuscular sensors 14176 may be arranged circumferentially around elastic band 14174.

In some embodiments, the elastic band 14174 is configured to be worn around a user's lower arm or wrist. The elastic band 14174 may include a flexible electronic connector 14172. In some embodiments, the flexible electronic connector 14172 interconnects separate sensors and electronic circuitry that are enclosed in one or more sensor housings. Alternatively, in some embodiments, the flexible electronic connector 14172 interconnects separate sensors and electronic circuitry that are outside of the one or more sensor housings. Each neuromuscular sensor of the plurality of neuromuscular sensors 14176 can include a skin-contacting surface that includes one or more electrodes. One or more sensors of the plurality of neuromuscular sensors 14176 can be coupled together using flexible electronics incorporated into the wearable device 14170. In some embodiments, one or more sensors of the plurality of neuromuscular sensors 14176 can be integrated into a knitted fabric, wherein the fabric one or more sensors of the plurality of neuromuscular sensors 14176 are knitted into the fabric and mimic the pliability of fabric (e.g., the one or more sensors of the plurality of neuromuscular sensors 14176 can be constructed from a series knitted strands of yarn). In some embodiments, the sensors are flush with the surface of the textile and are indistinguishable from the textile when worn by the user.

Figure 14E:
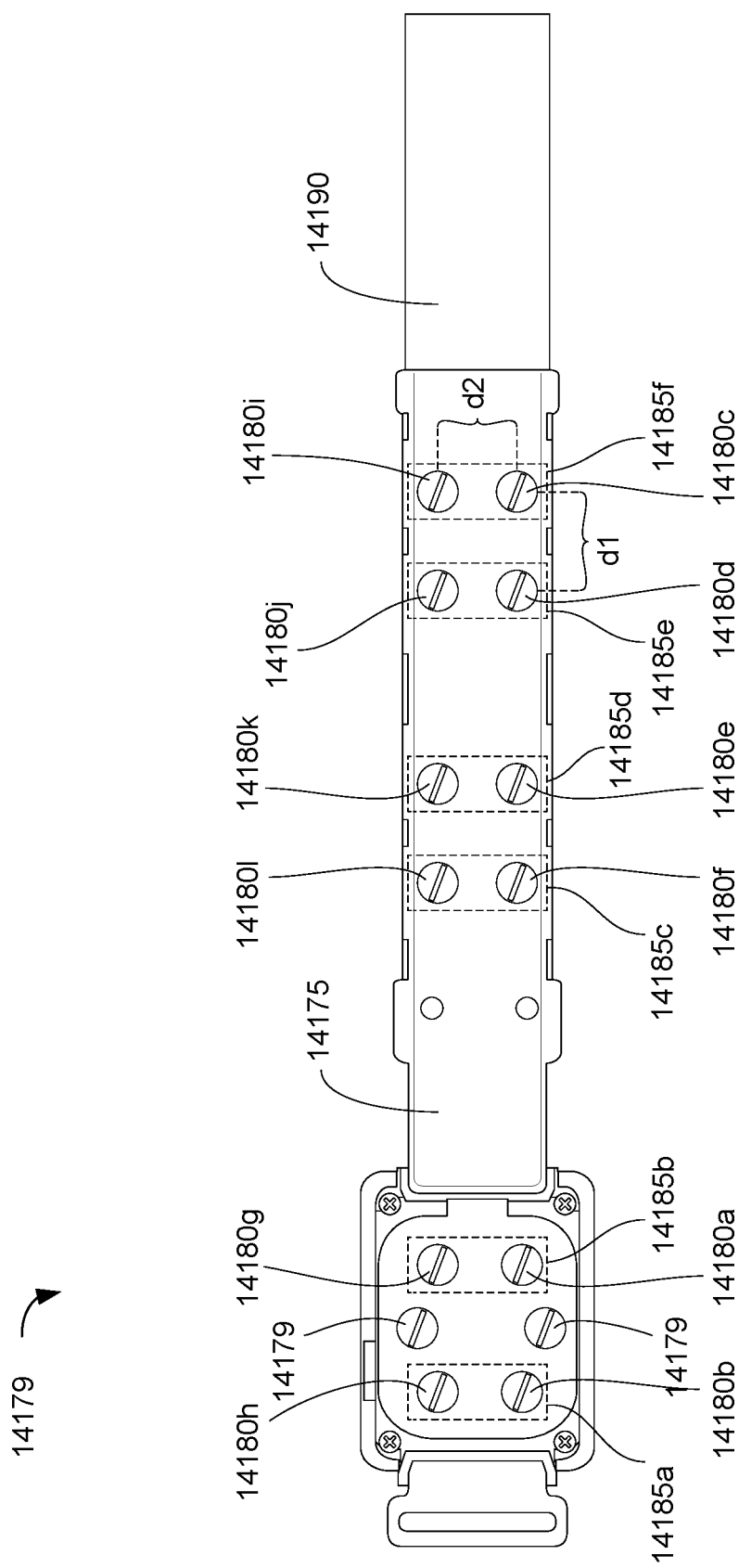

FIG. 14E illustrates a wearable device 14179 in accordance with some embodiments. The wearable device 14179 includes paired sensor channels 14185a-14185f along an interior surface of a wearable structure 14175 that are configured to detect neuromuscular signals. Different number of paired sensors channels can be used (e.g., one pair of sensors, three pairs of sensors, four pairs of sensors, or six pairs of sensors). The wearable structure 14175 can include a band portion 14190, a capsule portion 14195, and a cradle portion (not pictured) that is coupled with the band portion 14190 to allow for the capsule portion 14195 to be removably coupled with the band portion 14190. For embodiments in which the capsule portion 14195 is removable, the capsule portion 14195 can be referred to as a removable structure, such that in these embodiments the wearable device includes a wearable portion (e.g., band portion 14190 and the cradle portion) and a removable structure (the removable capsule portion which can be removed from the cradle). In some embodiments, the capsule portion 14195 includes the one or more processors and/or other components of the wearable device 1688 described above in reference to FIGS. 16A and 16B. The wearable structure 14175 is configured to be worn by a user 1611. More specifically, the wearable structure 14175 is configured to couple the wearable device 14179 to a wrist, arm, forearm, or other portion of the user's body. Each paired sensor channels 14185a-14185f includes two electrodes 14180 (e.g., electrodes 14180a-14180h) for sensing neuromuscular signals based on differential sensing within each respective sensor channel. In accordance with some embodiments, the wearable device 14170 further includes an electrical ground and a shielding electrode.

The techniques described above can be used with any device for sensing neuromuscular signals, including the arm-wearable devices of FIG. 14A-14C, but could also be used with other types of wearable devices for sensing neuromuscular signals (such as body-wearable or head-wearable devices that might have neuromuscular sensors closer to the brain or spinal column).

In some embodiments, a wrist-wearable device can be used in conjunction with a head-wearable device described below, and the wrist-wearable device can also be configured to be used to allow a user to control aspect of the artificial reality (e.g., by using EMG-based gestures to control user interface objects in the artificial reality and/or by allowing a user to interact with the touchscreen on the wrist-wearable device to also control aspects of the artificial reality). Having thus described example wrist-wearable device, attention will now be turned to example head-wearable devices, such AR glasses and VR headsets.

Example Head-Wearable Devices

Figure 15A:
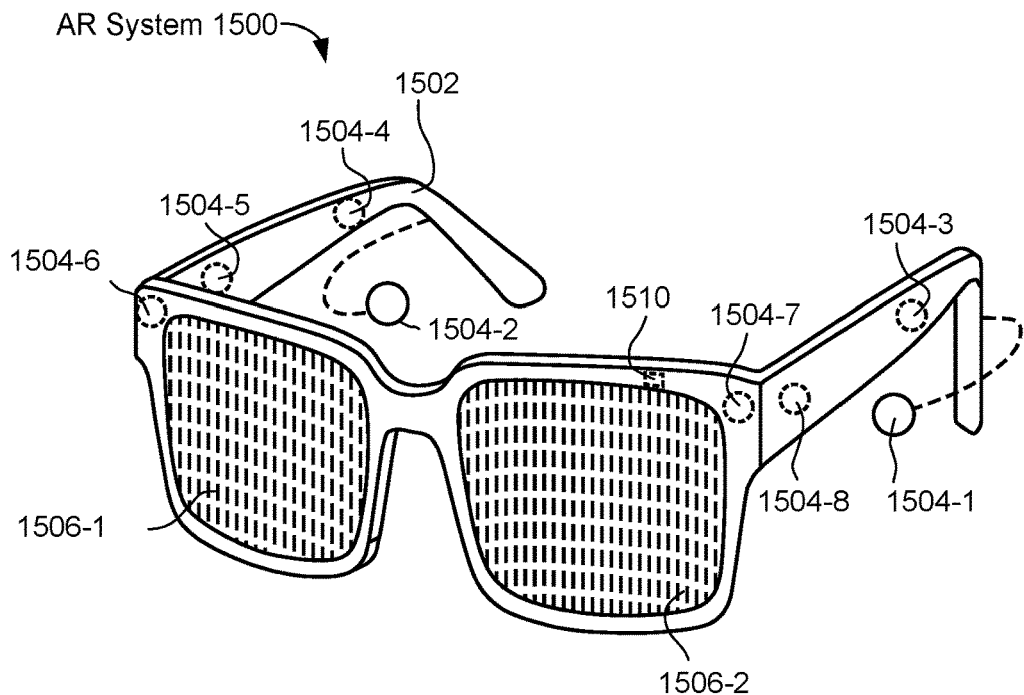
FIGS. 15A-15B illustrate an example AR system which can be controlled by using the knitted structures (e.g., wearable gloves or other wearable structures formed in accordance with the knitting techniques described herein), in accordance with some embodiments.

FIG. 15A shows an example AR system 1500 which can be controlled by using the knitted structures (e.g., wearable gloves or other wearable structures formed in accordance with the knitting techniques described herein), in accordance with some embodiments. In FIG. 15A, the AR system 1500 includes an eyewear device with a frame 1502 configured to hold a left display device 1506-1 and a right display device 1506-2 in front of a user's eyes. The display devices 1506-1 and 1506-2 may act together or independently to present an image or series of images to a user. While the AR system 1500 includes two displays, embodiments of this disclosure may be implemented in AR systems with a single near-eye display (NED) or more than two NEDs.

In some embodiments, the AR system 1500 includes one or more sensors, such as the acoustic sensors 1504. For example, the acoustic sensors 1504 can generate measurement signals in response to motion of the AR system 1500 and may be located on substantially any portion of the frame 1502. Any one of the sensors may be a position sensor, an IMU, a depth camera assembly, or any combination thereof. In some embodiments, the AR system 1500 includes more or fewer sensors than are shown in FIG. 15A. In embodiments in which the sensors include an IMU, the IMU may generate calibration data based on measurement signals from the sensors. Examples of the sensors include, without limitation, accelerometers, gyroscopes, magnetometers, other suitable types of sensors that detect motion, sensors used for error correction of the IMU, or some combination thereof.

In some embodiments, the AR system 1500 includes a microphone array with a plurality of acoustic sensors 1504-1 through 1504-8, referred to collectively as the acoustic sensors 1504. The acoustic sensors 1504 may be transducers that detect air pressure variations induced by sound waves. In some embodiments, each acoustic sensor 1504 is configured to detect sound and convert the detected sound into an electronic format (e.g., an analog or digital format). In some embodiments, the microphone array includes ten acoustic sensors: 1504-1 and 1504-2 designed to be placed inside a corresponding ear of the user, acoustic sensors 1504-3, 1504-4, 1504-5, 1504-6, 1504-7, and 1504-8 positioned at various locations on the frame 1502, and acoustic sensors positioned on a corresponding neckband, where the neckband is an optional component of the system that is not present in certain embodiments of the artificial-reality systems discussed herein.

The configuration of the acoustic sensors 1504 of the microphone array may vary. While the AR system 1500 is shown in FIG. 15A having ten acoustic sensors 1504, the number of acoustic sensors 1504 may be more or fewer than ten. In some situations, using more acoustic sensors 1504 increases the amount of audio information collected and/or the sensitivity and accuracy of the audio information. In contrast, in some situations, using a lower number of acoustic sensors 1504 decreases the computing power required by a controller to process the collected audio information. In addition, the position of each acoustic sensor 1504 of the microphone array may vary. For example, the position of an acoustic sensor 1504 may include a defined position on the user, a defined coordinate on the frame 1502, an orientation associated with each acoustic sensor, or some combination thereof.

The acoustic sensors 1504-1 and 1504-2 may be positioned on different parts of the user's ear. In some embodiments, there are additional acoustic sensors on or surrounding the ear in addition to acoustic sensors 1504 inside the ear canal. In some situations, having an acoustic sensor positioned next to an ear canal of a user enables the microphone array to collect information on how sounds arrive at the ear canal. By positioning at least two of the acoustic sensors 1504 on either side of a user's head (e.g., as binaural microphones), the AR device 1500 is able to simulate binaural hearing and capture a 3D stereo sound field around a user's head. In some embodiments, the acoustic sensors 1504-1 and 1504-2 are connected to the AR system 1500 via a wired connection, and in other embodiments, the acoustic sensors 1504-1 and 1504-2 are connected to the AR system 1500 via a wireless connection (e.g., a Bluetooth connection). In some embodiments, the AR system 1500 does not include the acoustic sensors 1504-1 and 1504-2.

The acoustic sensors 1504 on the frame 1502 may be positioned along the length of the temples, across the bridge of the nose, above or below the display devices 1506, or in some combination thereof. The acoustic sensors 1504 may be oriented such that the microphone array is able to detect sounds in a wide range of directions surrounding the user that is wearing the AR system 1500. In some embodiments, a calibration process is performed during manufacturing of the AR system 1500 to determine relative positioning of each acoustic sensor 1504 in the microphone array.

In some embodiments, the eyewear device further includes, or is communicatively coupled to, an external device (e.g., a paired device), such as the optional neckband discussed above. In some embodiments, the optional neckband is coupled to the eyewear device via one or more connectors. The connectors may be wired or wireless connectors and may include electrical and/or non-electrical (e.g., structural) components. In some embodiments, the eyewear device and the neckband operate independently without any wired or wireless connection between them. In some embodiments, the components of the eyewear device and the neckband are located on one or more additional peripheral devices paired with the eyewear device, the neckband, or some combination thereof. Furthermore, the neckband is intended to represent any suitable type or form of paired device. Thus, the following discussion of neckband may also apply to various other paired devices, such as smart watches, smart phones, wrist bands, other wearable devices, hand-held controllers, tablet computers, or laptop computers.

In some situations, pairing external devices, such as the optional neckband, with the AR eyewear device enables the AR eyewear device to achieve the form factor of a pair of glasses while still providing sufficient battery and computation power for expanded capabilities. Some, or all, of the battery power, computational resources, and/or additional features of the AR system 1500 may be provided by a paired device or shared between a paired device and an eyewear device, thus reducing the weight, heat profile, and form factor of the eyewear device overall while still retaining desired functionality. For example, the neckband may allow components that would otherwise be included on an eyewear device to be included in the neckband thereby shifting a weight load from a user's head to a user's shoulders. In some embodiments, the neckband has a larger surface area over which to diffuse and disperse heat to the ambient environment. Thus, the neckband may allow for greater battery and computation capacity than might otherwise have been possible on a stand-alone eyewear device. Because weight carried in the neckband may be less invasive to a user than weight carried in the eyewear device, a user may tolerate wearing a lighter eyewear device and carrying or wearing the paired device for greater lengths of time than the user would tolerate wearing a heavy, stand-alone eyewear device, thereby enabling an artificial-reality environment to be incorporated more fully into a user's day-to-day activities.

In some embodiments, the optional neckband is communicatively coupled with the eyewear device and/or to other devices. The other devices may provide certain functions (e.g., tracking, localizing, depth mapping, processing, storage, etc.) to the AR system 1500. In some embodiments, the neckband includes a controller and a power source. In some embodiments, the acoustic sensors of the neckband are configured to detect sound and convert the detected sound into an electronic format (analog or digital).

The controller of the neckband processes information generated by the sensors on the neckband and/or the AR system 1500. For example, the controller may process information from the acoustic sensors 1504. For each detected sound, the controller may perform a direction of arrival (DOA) estimation to estimate a direction from which the detected sound arrived at the microphone array. As the microphone array detects sounds, the controller may populate an audio data set with the information. In embodiments in which the AR system 1500 includes an IMU, the controller may compute all inertial and spatial calculations from the IMU located on the eyewear device. The connector may convey information between the eyewear device and the neckband and between the eyewear device and the controller. The information may be in the form of optical data, electrical data, wireless data, or any other transmittable data form. Moving the processing of information generated by the eyewear device to the neckband may reduce weight and heat in the eyewear device, making it more comfortable and safer for a user.

In some embodiments, the power source in the neckband provides power to the eyewear device and the neckband. The power source may include, without limitation, lithium-ion batteries, lithium-polymer batteries, primary lithium batteries, alkaline batteries, or any other form of power storage. In some embodiments, the power source is a wired power source.

As noted, some artificial-reality systems may, instead of blending an artificial reality with actual reality, substantially replace one or more of a user's sensory perceptions of the real world with a virtual experience. One example of this type of system is a head-worn display system, such as the VR system 1550 in FIG. 15B, which mostly or completely covers a user's field of view.

Figure 15B:
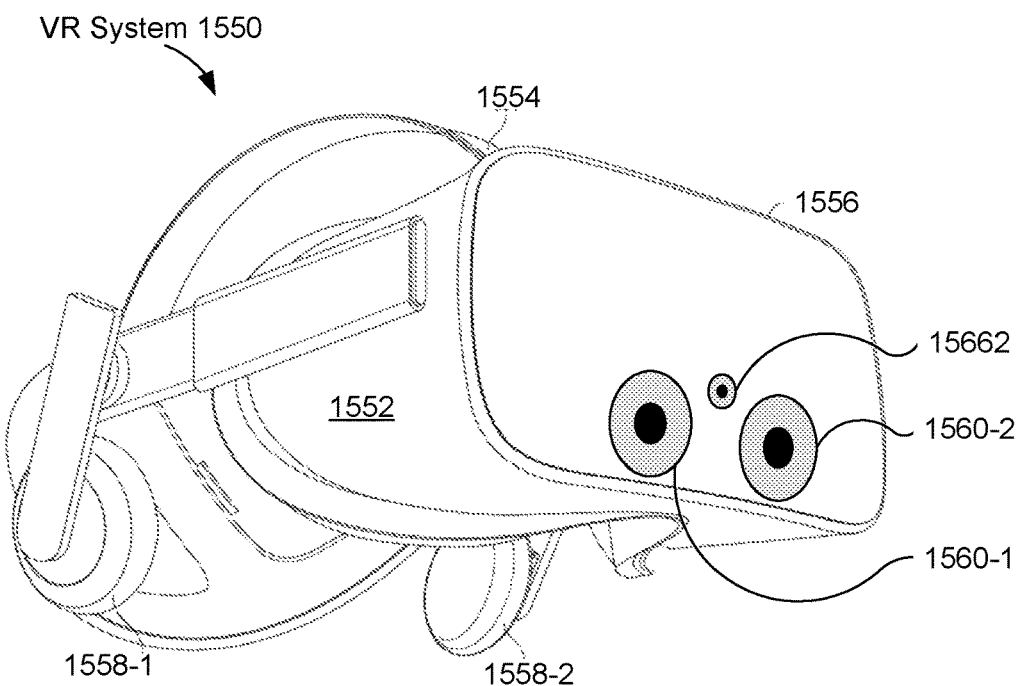

FIG. 15B shows a VR system 1550 (e.g., also referred to herein as VR headsets or VR headset) in accordance with some embodiments. The VR system 1550 includes a head-mounted display (HMD) 1552. The HMD 1552 includes a front body 1556 and a frame 1554 (e.g., a strap or band) shaped to fit around a user's head. In some embodiments, the HMD 1552 includes output audio transducers 1558-1 and 1558-2, as shown in FIG. 15B (e.g., transducers). In some embodiments, the front body 1556 and/or the frame 1554 includes one or more electronic elements, including one or more electronic displays, one or more IMUs, one or more tracking emitters or detectors, and/or any other suitable device or sensor for creating an artificial-reality experience.

Artificial-reality systems may include a variety of types of visual feedback mechanisms. For example, display devices in the AR system 1500 and/or the VR system 1550 may include one or more liquid-crystal displays (LCDs), light emitting diode (LED) displays, organic LED (OLED) displays, and/or any other suitable type of display screen. Artificial-reality systems may include a single display screen for both eyes or may provide a display screen for each eye, which may allow for additional flexibility for varifocal adjustments or for correcting a refractive error associated with the user's vision. Some artificial-reality systems also include optical subsystems having one or more lenses (e.g., conventional concave or convex lenses, Fresnel lenses, or adjustable liquid lenses) through which a user may view a display screen.

In addition to or instead of using display screens, some artificial-reality systems include one or more projection systems. For example, display devices in the AR system 1500 and/or the VR system 1550 may include micro-LED projectors that project light (e.g., using a waveguide) into display devices, such as clear combiner lenses that allow ambient light to pass through. The display devices may refract the projected light toward a user's pupil and may enable a user to simultaneously view both artificial-reality content and the real world. Artificial-reality systems may also be configured with any other suitable type or form of image projection system.

Artificial-reality systems may also include various types of computer vision components and subsystems. For example, the AR system 1500 and/or the VR system 1550 can include one or more optical sensors such as two-dimensional (2D) or three-dimensional (3D) cameras, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions. For example, FIG. 15B shows VR system 1550 having cameras 1560-1 and 1560-2 that can be used to provide depth information for creating a voxel field and a two-dimensional mesh to provide object information to the user to avoid collisions. FIG. 15B also shows that the VR system includes one or more additional cameras 1562 that are configured to augment the cameras 1560-1 and 1560-2 by providing more information. For example, the additional cameras 1562 can be used to supply color information that is not discerned by cameras 1560-1 and 1560-2. In some embodiments, cameras 1560-1 and 1560-2 and additional cameras 1562 can include an optional IR cut filter configured to remove IR light from being received at the respective camera sensors.

In some embodiments, the AR system 1500 and/or the VR system 1550 can include haptic (tactile) feedback systems, which may be incorporated into headwear, gloves, body suits, handheld controllers, environmental devices (e.g., chairs or floormats), and/or any other type of device or system, such as the wearable devices discussed herein. The haptic feedback systems may provide various types of cutaneous feedback, including vibration, force, traction, shear, texture, and/or temperature. The haptic feedback systems may also provide various types of kinesthetic feedback, such as motion and compliance. The haptic feedback may be implemented using motors, piezoelectric actuators, fluidic systems, and/or a variety of other types of feedback mechanisms. The haptic feedback systems may be implemented independently of other artificial-reality devices, within other artificial-reality devices, and/or in conjunction with other artificial-reality devices.

The techniques described above can be used with any device for interacting with an artificial-reality environment, including the head-wearable devices of FIG. 15A-15B, but could also be used with other types of wearable devices for sensing neuromuscular signals (such as body-wearable or head-wearable devices that might have neuromuscular sensors closer to the brain or spinal column). Having thus described example wrist-wearable device and head-wearable devices, attention will now be turned to example feedback systems that can be integrated into the devices described above or be a separate device.

Example Feedback Devices

Figure 16A:
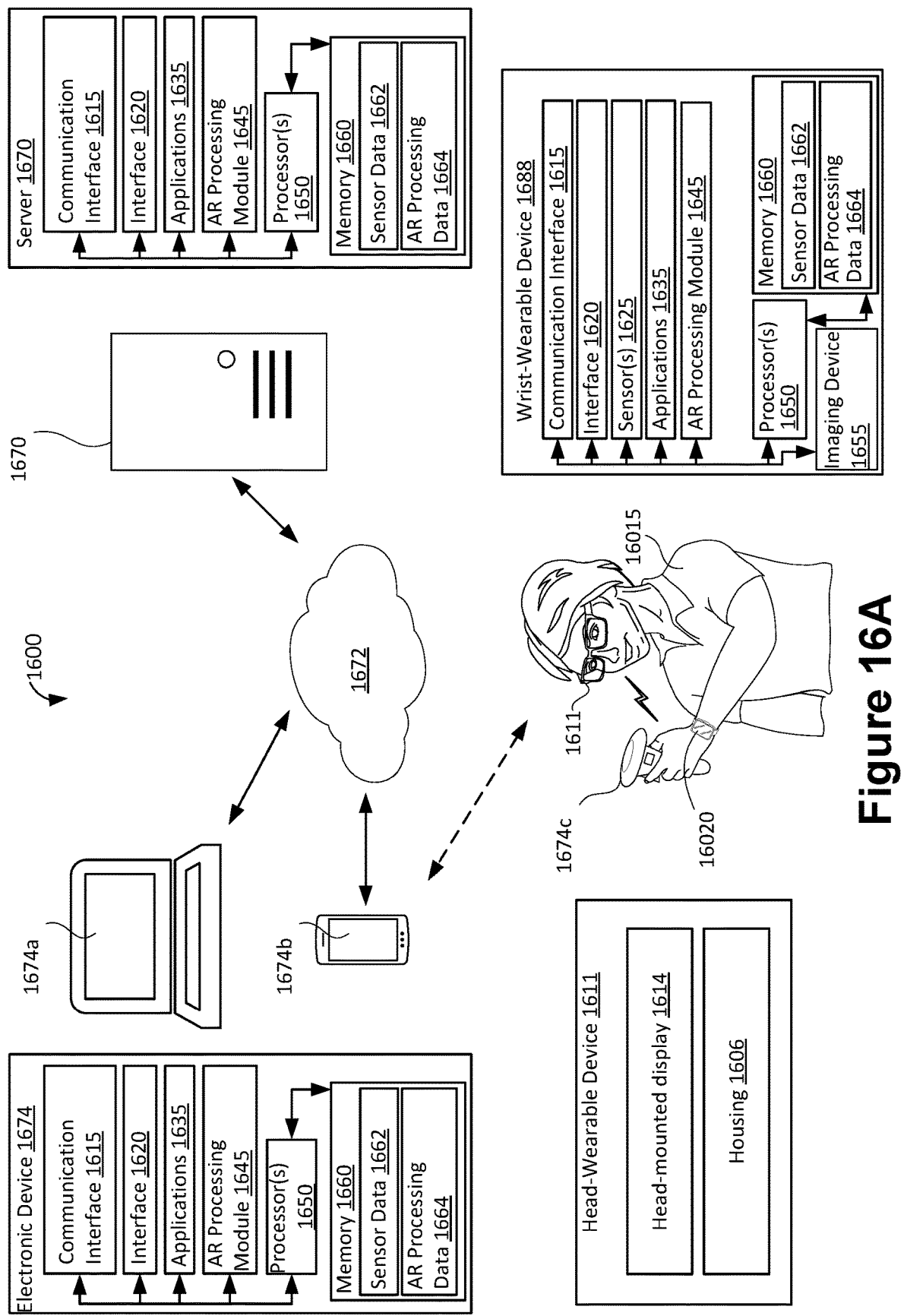
FIGS. 16A and 16B are block diagrams illustrating an example artificial-reality system in accordance with some embodiments.
Figure 16B:
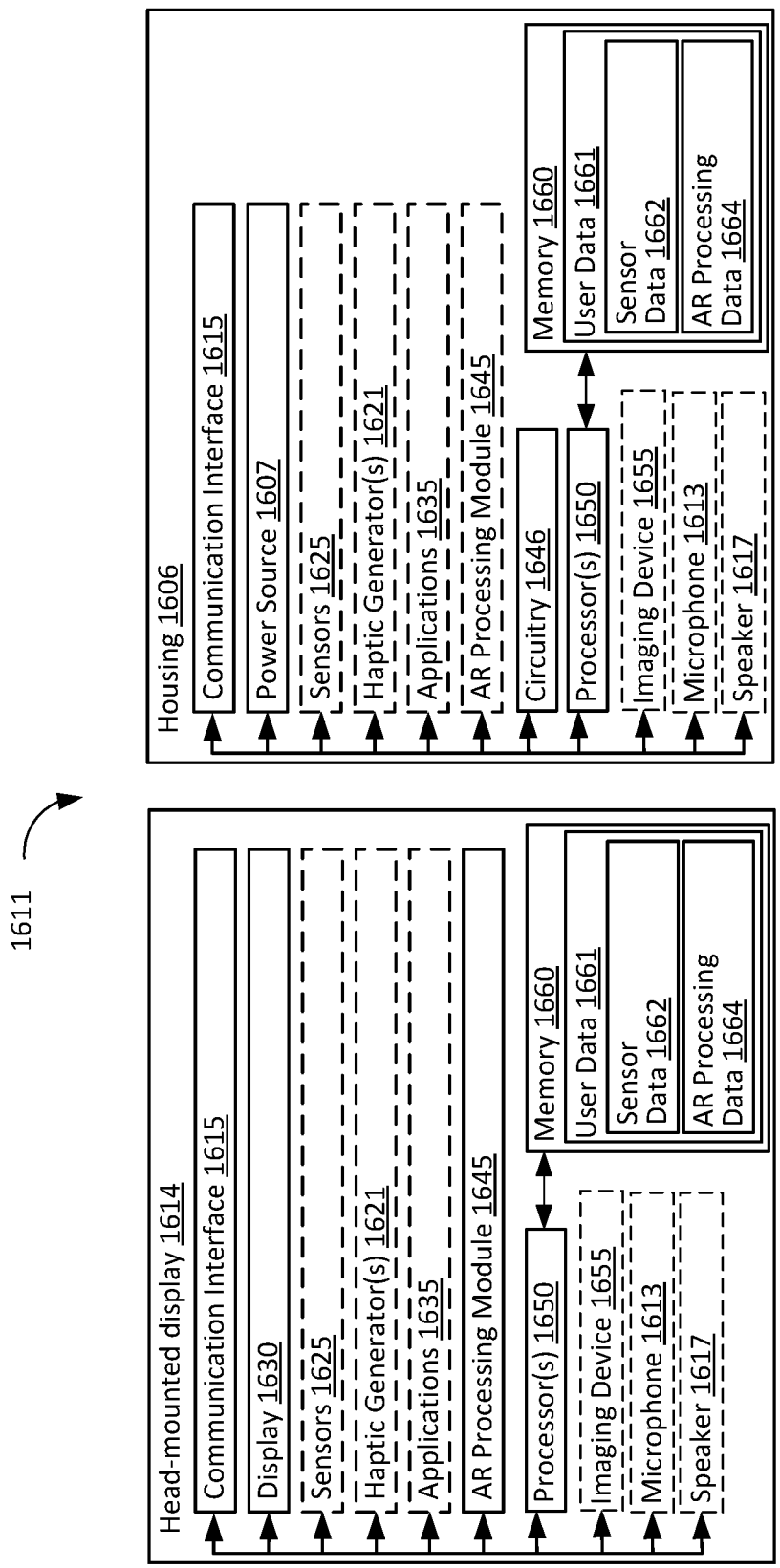
Figure 17:
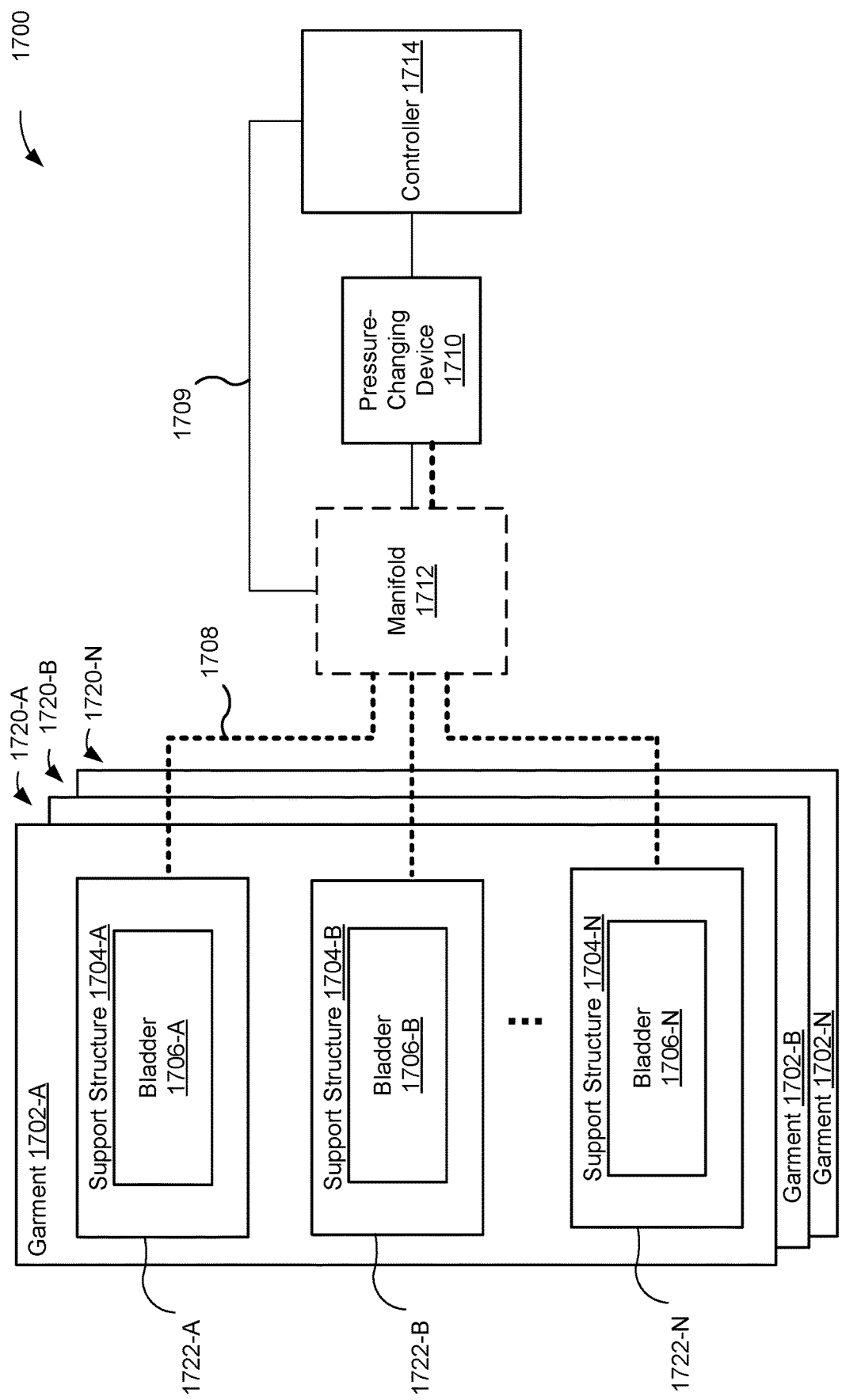
FIG. 17 is a schematic showing additional components (e.g., additional components to allow for providing haptic feedback using aspects of the knitted structures described herein) that can be used with the artificial-reality system of FIGS. 16A and 16B, in accordance with some embodiments.

FIG. 17 is a schematic showing additional components e.g., additional components to allow for providing haptic feedback using aspects of the knitted structures described herein) that can be used with the artificial-reality system 1600 of FIG. 16A and FIG. 16B, in accordance with some embodiments. The components in FIG. 17 are illustrated in a particular arrangement for ease of illustration and one skilled in the art will appreciate that other arrangements are possible. Moreover, while some example features are illustrated, various other features have not been illustrated for the sake of brevity and so as not to obscure pertinent aspects of the example implementations disclosed herein.

The artificial-reality system 1600 may also provide feedback to the user that the action was performed. The provided feedback may be visual via the electronic display in the head-mounted display 1611 (e.g., displaying the simulated hand as it picks up and lifts the virtual coffee mug) and/or haptic feedback via the haptic assembly 1722 in the device 1720. For example, the haptic feedback may prevent (or, at a minimum, hinder/resist movement of) one or more of the user's fingers from curling past a certain point to simulate the sensation of touching a solid coffee mug. To do this, the device 1720 changes (either directly or indirectly) a pressurized state of one or more of the haptic assemblies 1722. Each of the haptic assemblies 1722 includes a mechanism that, at a minimum, provides resistance when the respective haptic assembly 1722 is transitioned from a first pressurized state (e.g., atmospheric pressure or deflated) to a second pressurized state (e.g., inflated to a threshold pressure). Structures of haptic assemblies 1722 can be integrated into various devices configured to be in contact or proximity to a user's skin, including, but not limited to devices such as glove worn devices, body worn clothing device, headset devices (e.g., artificial-reality headset 803 in FIGS. 8A-8B).

As noted above, the haptic assemblies 1722 described herein are configured to transition between a first pressurized state and a second pressurized state to provide haptic feedback to the user. Due to the ever-changing nature of artificial reality, the haptic assemblies 1722 may be required to transition between the two states hundreds, or perhaps thousands of times, during a single use. Thus, the haptic assemblies 1722 described herein are durable and designed to quickly transition from state to state. To provide some context, in the first pressurized state, the haptic assemblies 1722 do not impede free movement of a portion of the wearer's body. For example, one or more haptic assemblies 1722 incorporated into a glove are made from flexible materials that do not impede free movement of the wearer's hand and fingers (e.g., an electrostatic-zipping actuator). The haptic assemblies 1722 are configured to conform to a shape of the portion of the wearer's body when in the first pressurized state. However, once in the second pressurized state, the haptic assemblies 1722 are configured to impede free movement of the portion of the wearer's body. For example, the respective haptic assembly 1722 (or multiple respective haptic assemblies) can restrict movement of a wearer's finger (e.g., prevent the finger from curling or extending) when the haptic assembly 1722 is in the second pressurized state. Moreover, once in the second pressurized state, the haptic assemblies 1722 may take different shapes, with some haptic assemblies 1722 configured to take a planar, rigid shape (e.g., flat and rigid), while some other haptic assemblies 1722 are configured to curve or bend, at least partially.

As a non-limiting example, the system 17 includes a plurality of devices 1720-A, 1720-B, . . . 1720-N, each of which includes a garment 1702 and one or more haptic assemblies 1722 (e.g., haptic assemblies 1722-A, 1722-B, . . . , 1722-N). As explained above, the haptic assemblies 1722 are configured to provide haptic stimulations to a wearer of the device 1720. The garment 1702 of each device 1720 can be various articles of clothing (e.g., gloves, socks, shirts, or pants), and thus, the user may wear multiple devices 1720 that provide haptic stimulations to different parts of the body. Each haptic assembly 1722 is coupled to (e.g., embedded in or attached to) the garment 1702. Further, each haptic assembly 1722 includes a support structure 1704 and at least one bladder 1706. The bladder 1706 (e.g., a membrane) is a sealed, inflatable pocket made from a durable and puncture resistance material, such as thermoplastic polyurethane (TPU), a flexible polymer, or the like. The bladder 1706 contains a medium (e.g., a fluid such as air, inert gas, or even a liquid) that can be added to or removed from the bladder 1706 to change a pressure (e.g., fluid pressure) inside the bladder 1706. The support structure 1704 is made from a material that is stronger and stiffer than the material of the bladder 1706. A respective support structure 1704 coupled to a respective bladder 1706 is configured to reinforce the respective bladder 1706 as the respective bladder changes shape and size due to changes in pressure (e.g., fluid pressure) inside the bladder.

The system 1700 also includes a controller 1714 and a pressure-changing device 1710. In some embodiments, the controller 1714 is part of the computer system 1730 (e.g., the processor of the computer system 1730). The controller 1714 is configured to control operation of the pressure-changing device 1710, and in turn operation of the devices 1720. For example, the controller 1714 sends one or more signals to the pressure-changing device 1710 to activate the pressure-changing device 1710 (e.g., turn it on and off). The one or more signals may specify a desired pressure (e.g., pounds-per-square inch) to be output by the pressure-changing device 1710. Generation of the one or more signals, and in turn the pressure output by the pressure-changing device 1710, may be based on information collected by sensors 1625 in FIGS. 16A and 16B. For example, the one or more signals may cause the pressure-changing device 1710 to increase the pressure (e.g., fluid pressure) inside a first haptic assembly 1722 at a first time, based on the information collected by the sensors 1625 in FIGS. 16A and 16B (e.g., the user makes contact with the artificial coffee mug). Then, the controller may send one or more additional signals to the pressure-changing device 1710 that cause the pressure-changing device 1710 to further increase the pressure inside the first haptic assembly 1722 at a second time after the first time, based on additional information collected by the sensors 1714 and/or sensors 1724 (e.g., the user grasps and lifts the artificial coffee mug). Further, the one or more signals may cause the pressure-changing device 1710 to inflate one or more bladders 1706 in a first device 1720-A, while one or more bladders 1706 in a second device 1720-B remain unchanged. Additionally, the one or more signals may cause the pressure-changing device 1710 to inflate one or more bladders 1706 in a first device 1720-A to a first pressure and inflate one or more other bladders 1706 in the first device 1720-A to a second pressure different from the first pressure. Depending on the number of devices 1720 serviced by the pressure-changing device 1710, and the number of bladders therein, many different inflation configurations can be achieved through the one or more signals and the examples above are not meant to be limiting.

The system 1700 may include an optional manifold 1712 between the pressure-changing device 1710 and the devices 1720. The manifold 1712 may include one or more valves (not shown) that pneumatically couple each of the haptic assemblies 1722 with the pressure-changing device 1710 via tubing 1708. In some embodiments, the manifold 1712 is in communication with the controller 1714, and the controller 1714 controls the one or more valves of the manifold 1712 (e.g., the controller generates one or more control signals). The manifold 1712 is configured to switchably couple the pressure-changing device 1710 with one or more haptic assemblies 1722 of the same or different devices 1720 based on one or more control signals from the controller 1714. In some embodiments, instead of using the manifold 1712 to pneumatically couple the pressure-changing device 1710 with the haptic assemblies 1722, the system 1700 may include multiple pressure-changing devices 1710, where each pressure-changing device 1710 is pneumatically coupled directly with a single (or multiple) haptic assembly 1722. In some embodiments, the pressure-changing device 1710 and the optional manifold 1712 can be configured as part of one or more of the devices 1720 (not illustrated) while, in other embodiments, the pressure-changing device 1710 and the optional manifold 1712 can be configured as external to the device 1720. A single pressure-changing device 1710 may be shared by multiple devices 1720.

In some embodiments, the pressure-changing device 1710 is a pneumatic device, hydraulic device, a pneudraulic device, or some other device capable of adding and removing a medium (e.g., fluid, liquid, gas) from the one or more haptic assemblies 1722.

The devices shown in FIG. 17 may be coupled via a wired connection (e.g., via busing 1709). Alternatively, one or more of the devices shown in FIG. 17 may be wirelessly connected (e.g., via short-range communication signals). Having thus described example wrist-wearable device, example head-wearable devices, and example feedback devices, attention will now be turned to example systems that integrate one or more of the devices described above.

Example Systems

FIGS. 16A and 16B are block diagrams illustrating an example artificial-reality system in accordance with some embodiments. The system 1600 includes one or more devices for facilitating an interactivity with an artificial-reality environment in accordance with some embodiments. For example, the head-wearable device 1611 can present to the user 16015 with a user interface within the artificial-reality environment. As a non-limiting example, the system 1600 includes one or more wearable devices, which can be used in conjunction with one or more computing devices. In some embodiments, the system 1600 provides the functionality of a virtual-reality device, an augmented-reality device, a mixed-reality device, hybrid-reality device, or a combination thereof. In some embodiments, the system 1600 provides the functionality of a user interface and/or one or more user applications (e.g., games, word processors, messaging applications, calendars, clocks, etc.).

The system 1600 can include one or more of servers 1670, electronic devices 1674 (e.g., a computer, 1674a, a smartphone 1674b, a controller 1674c, and/or other devices), head-wearable devices 1611 (e.g., the AR system 1500 or the VR system 1550), and/or wrist-wearable devices 1688 (e.g., the wrist-wearable device 16020). In some embodiments, the one or more of servers 1670, electronic devices 1674, head-wearable devices 1611, and/or wrist-wearable devices 1688 are communicatively coupled via a network 1672. In some embodiments, the head-wearable device 1611 is configured to cause one or more operations to be performed by a communicatively coupled wrist-wearable device 1688, and/or the two devices can also both be connected to an intermediary device, such as a smartphone 1674b, a controller 1674c, or other device that provides instructions and data to and between the two devices. In some embodiments, the head-wearable device 1611 is configured to cause one or more operations to be performed by multiple devices in conjunction with the wrist-wearable device 1688. In some embodiments, instructions to cause the performance of one or more operations are controlled via an artificial-reality processing module 1645. The artificial-reality processing module 1645 can be implemented in one or more devices, such as the one or more of servers 1670, electronic devices 1674, head-wearable devices 1611, and/or wrist-wearable devices 1688. In some embodiments, the one or more devices perform operations of the artificial-reality processing module 1645, using one or more respective processors, individually or in conjunction with at least one other device as described herein. In some embodiments, the system 1600 includes other wearable devices not shown in FIG. 16A and FIG. 16B, such as rings, collars, anklets, gloves, and the like.

In some embodiments, the system 1600 provides the functionality to control or provide commands to the one or more computing devices 1674 based on a wearable device (e.g., head-wearable device 1611 or wrist-wearable device 1688) determining motor actions or intended motor actions of the user. A motor action is an intended motor action when before the user performs the motor action or before the user completes the motor action, the detected neuromuscular signals travelling through the neuromuscular pathways can be determined to be the motor action. Motor actions can be detected based on the detected neuromuscular signals, but can additionally (using a fusion of the various sensor inputs), or alternatively, be detected using other types of sensors (such as cameras focused on viewing hand movements and/or using data from an inertial measurement unit that can detect characteristic vibration sequences or other data types to correspond to particular in-air hand gestures). The one or more computing devices include one or more of a head-mounted display, smartphones, tablets, smart watches, laptops, computer systems, augmented reality systems, robots, vehicles, virtual avatars, user interfaces, a wrist-wearable device, and/or other electronic devices and/or control interfaces.

In some embodiments, the motor actions include digit movements, hand movements, wrist movements, arm movements, pinch gestures, index finger movements, middle finger movements, ring finger movements, little finger movements, thumb movements, hand clenches (or fists), waving motions, and/or other movements of the user's hand or arm.

In some embodiments, the user can define one or more gestures using the learning module. In some embodiments, the user can enter a training phase in which a user defined gesture is associated with one or more input commands that when provided to a computing device cause the computing device to perform an action. Similarly, the one or more input commands associated with the user-defined gesture can be used to cause a wearable device to perform one or more actions locally. The user-defined gesture, once trained, is stored in the memory 1660. Similar to the motor actions, the one or more processors 1650 can use the detected neuromuscular signals by the one or more sensors 1625 to determine that a user-defined gesture was performed by the user.

The electronic devices 1674 can also include a communication interface 1615, an interface 1620 (e.g., including one or more displays, lights, speakers, and haptic generators), one or more sensors 1625, one or more applications 1635, an artificial-reality processing module 1645, one or more processors 1650, and memory 1660. The electronic devices 1674 are configured to communicatively couple with the wrist-wearable device 1688 and/or head-wearable device 1611 (or other devices) using the communication interface 1615. In some embodiments, the electronic devices 1674 are configured to communicatively couple with the wrist-wearable device 1688 and/or head-wearable device 1611 (or other devices) via an application programming interface (API). In some embodiments, the electronic devices 1674 operate in conjunction with the wrist-wearable device 1688 and/or the head-wearable device 1611 to determine a hand gesture and cause the performance of an operation or action at a communicatively coupled device.

The server 1670 includes a communication interface 1615, one or more applications 1635, an artificial-reality processing module 1645, one or more processors 1650, and memory 1660. In some embodiments, the server 1670 is configured to receive sensor data from one or more devices, such as the head-wearable device 1611, the wrist-wearable device 1688, and/or electronic device 1674, and use the received sensor data to identify a gesture or user input. The server 1670 can generate instructions that cause the performance of operations and actions associated with a determined gesture or user input at communicatively coupled devices, such as the head-wearable device 1611.

The head-wearable device 1611 includes smart glasses (e.g., the augmented-reality glasses), artificial-reality headsets (e.g., VR/AR headsets), or other head worn device. In some embodiments, one or more components of the head-wearable device 1611 are housed within a body of the HMD 1614 (e.g., frames of smart glasses, a body of a AR headset, etc.). In some embodiments, one or more components of the head-wearable device 1611 are stored within or coupled with lenses of the HMD 1614. Alternatively or in addition, in some embodiments, one or more components of the head-wearable device 1611 are housed within a modular housing 1606. The head-wearable device 1611 is configured to communicatively couple with other electronic device 1674 and/or a server 1670 using communication interface 1615 as discussed above.

FIG. 16B describes additional details of the HMD 1614 and modular housing 1606 described above in reference to 16A, in accordance with some embodiments.

The housing 1606 include(s) a communication interface 1615, circuitry 1646, a power source 1607 (e.g., a battery for powering one or more electronic components of the housing 1606 and/or providing usable power to the HMD 1614), one or more processors 1650, and memory 1660. In some embodiments, the housing 1606 can include one or more supplemental components that add to the functionality of the HMD 1614. For example, in some embodiments, the housing 1606 can include one or more sensors 1625, an AR processing module 1645, one or more haptic generators 1621, one or more imaging devices 1655, one or more microphones 1613, one or more speakers 1617, etc. The housing 1606 is configured to couple with the HMD 1614 via the one or more retractable side straps. More specifically, the housing 1606 is a modular portion of the head-wearable device 1611 that can be removed from head-wearable device 1611 and replaced with another housing (which includes more or less functionality). The modularity of the housing 1606 allows a user to adjust the functionality of the head-wearable device 1611 based on their needs.

In some embodiments, the communications interface 1615 is configured to communicatively couple the housing 1606 with the HMD 1614, the server 1670, and/or other electronic device 1674 (e.g., the controller 1674c, a tablet, a computer, etc.). The communication interface 1615 is used to establish wired or wireless connections between the housing 1606 and the other devices. In some embodiments, the communication interface 1615 includes hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, or MiWi), custom or standard wired protocols (e.g., Ethernet or HomePlug), and/or any other suitable communication protocol. In some embodiments, the housing 1606 is configured to communicatively couple with the HMD 1614 and/or other electronic device 1674 via an application programming interface (API).

In some embodiments, the power source 1607 is a battery. The power source 1607 can be a primary or secondary battery source for the HMD 1614. In some embodiments, the power source 1607 provides useable power to the one or more electrical components of the housing 1606 or the HMD 1614. For example, the power source 1607 can provide usable power to the sensors 1621, the speakers 1617, the HMD 1614, and the microphone 1613. In some embodiments, the power source 1607 is a rechargeable battery. In some embodiments, the power source 1607 is a modular battery that can be removed and replaced with a fully charged battery while it is charged separately.

The one or more sensors 1625 can include heart rate sensors, neuromuscular-signal sensors (e.g., electromyography (EMG) sensors), SpO2 sensors, altimeters, thermal sensors or thermal couples, ambient light sensors, ambient noise sensors, and/or inertial measurement units (IMU)s. Additional non-limiting examples of the one or more sensors 1625 include, e.g., infrared, pyroelectric, ultrasonic, microphone, laser, optical, Doppler, gyro, accelerometer, resonant LC sensors, capacitive sensors, acoustic sensors, and/or inductive sensors. In some embodiments, the one or more sensors 1625 are configured to gather additional data about the user (e.g., an impedance of the user's body). Examples of sensor data output by these sensors includes body temperature data, infrared range-finder data, positional information, motion data, activity recognition data, silhouette detection and recognition data, gesture data, heart rate data, and other wearable device data (e.g., biometric readings and output, accelerometer data). The one or more sensors 1625 can include location sensing devices (e.g., GPS) configured to provide location information. In some embodiment, the data measured or sensed by the one or more sensors 1625 is stored in memory 1660. In some embodiments, the housing 1606 receives sensor data from communicatively coupled devices, such as the HMD 1614, the server 1670, and/or other electronic device 1674. Alternatively, the housing 1606 can provide sensors data to the HMD 1614, the server 1670, and/or other electronic device 1674.

The one or more haptic generators 1621 can include one or more actuators (e.g., eccentric rotating mass (ERM), linear resonant actuators (LRA), voice coil motor (VCM), piezo haptic actuator, thermoelectric devices, solenoid actuators, ultrasonic transducers or sensors, etc.). In some embodiments, the one or more haptic generators 1621 are hydraulic, pneumatic, electric, and/or mechanical actuators. In some embodiments, the one or more haptic generators 1621 are part of a surface of the housing 1606 that can be used to generate a haptic response (e.g., a thermal change at the surface, a tightening or loosening of a band, increase or decrease in pressure, etc.). For example, the one or more haptic generators 1625 can apply vibration stimulations, pressure stimulations, squeeze simulations, shear stimulations, temperature changes, or some combination thereof to the user. In addition, in some embodiments, the one or more haptic generators 1621 include audio generating devices (e.g., speakers 1617 and other sound transducers) and illuminating devices (e.g., light-emitting diodes (LED)s, screen displays, etc.). The one or more haptic generators 1621 can be used to generate different audible sounds and/or visible lights that are provided to the user as haptic responses. The above list of haptic generators is non-exhaustive; any affective devices can be used to generate one or more haptic responses that are delivered to a user.

In some embodiments, the one or more applications 1635 include social-media applications, banking applications, health applications, messaging applications, web browsers, gaming application, streaming applications, media applications, imaging applications, productivity applications, social applications, etc. In some embodiments, the one or more applications 1635 include artificial reality applications. The one or more applications 1635 are configured to provide data to the head-wearable device 1611 for performing one or more operations. In some embodiments, the one or more applications 1635 can be displayed via a display 1630 of the head-wearable device 1611 (e.g., via the HMD 1614).

In some embodiments, instructions to cause the performance of one or more operations are controlled via an artificial reality (AR) processing module 1645. The AR processing module 1645 can be implemented in one or more devices, such as the one or more of servers 1670, electronic devices 1674, head-wearable devices 1611, and/or wrist-wearable devices 1670. In some embodiments, the one or more devices perform operations of the AR processing module 1645, using one or more respective processors, individually or in conjunction with at least one other device as described herein. In some embodiments, the AR processing module 1645 is configured process signals based at least on sensor data. In some embodiments, the AR processing module 1645 is configured process signals based on image data received that captures at least a portion of the user hand, mouth, facial expression, surrounding, etc. For example, the housing 1606 can receive EMG data and/or IMU data from one or more sensors 1625 and provide the sensor data to the AR processing module 1645 for a particular operation (e.g., gesture recognition, facial recognition, etc.). The AR processing module 1645, causes a device communicatively coupled to the housing 1606 to perform an operation (or action). In some embodiments, the AR processing module 1645 performs different operations based on the sensor data and/or performs one or more actions based on the sensor data.

In some embodiments, the one or more imaging devices 1655 can include an ultra-wide camera, a wide camera, a telephoto camera, a depth-sensing cameras, or other types of cameras. In some embodiments, the one or more imaging devices 1655 are used to capture image data and/or video data. The imaging devices 1655 can be coupled to a portion of the housing 1606. The captured image data can be processed and stored in memory and then presented to a user for viewing. The one or more imaging devices 1655 can include one or more modes for capturing image data or video data. For example, these modes can include a high-dynamic range (HDR) image capture mode, a low light image capture mode, burst image capture mode, and other modes. In some embodiments, a particular mode is automatically selected based on the environment (e.g., lighting, movement of the device, etc.). For example, a wrist-wearable device with HDR image capture mode and a low light image capture mode active can automatically select the appropriate mode based on the environment (e.g., dark lighting may result in the use of low light image capture mode instead of HDR image capture mode). In some embodiments, the user can select the mode. The image data and/or video data captured by the one or more imaging devices 1655 is stored in memory 1660 (which can include volatile and non-volatile memory such that the image data and/or video data can be temporarily or permanently stored, as needed depending on the circumstances).

The circuitry 1646 is configured to facilitate the interaction between the housing 1606 and the HMD 1614. In some embodiments, the circuitry 1646 is configured to regulate the distribution of power between the power source 1607 and the HMD 1614. In some embodiments, the circuitry 746 is configured to transfer audio and/or video data between the HMD 1614 and/or one or more components of the housing 1606.

The one or more processors 1650 can be implemented as any kind of computing device, such as an integrated system-on-a-chip, a microcontroller, a fixed programmable gate array (FPGA), a microprocessor, and/or other application specific integrated circuits (ASICs). The processor may operate in conjunction with memory 1660. The memory 1660 may be or include random access memory (RAM), read-only memory (ROM), dynamic random access memory (DRAM), static random access memory (SRAM) and magnetoresistive random access memory (MRAM), and may include firmware, such as static data or fixed instructions, basic input/output system (BIOS), system functions, configuration data, and other routines used during the operation of the housing and the processor 1650. The memory 1660 also provides a storage area for data and instructions associated with applications and data handled by the processor 1650.

In some embodiments, the memory 1660 stores at least user data 1661 including sensor data 1662 and AR processing data 1664. The sensor data 1662 includes sensor data monitored by one or more sensors 1625 of the housing 1606 and/or sensor data received from one or more devices communicative coupled with the housing 1606, such as the HMD 1614, the smartphone 1674*b*, the controller 1674*c*, etc. The sensor data 1662 can include sensor data collected over a predetermined period of time that can be used by the AR processing module 1645. The AR processing data 1664 can include one or more one or more predefined camera-control gestures, user defined camera-control gestures, predefined non-camera-control gestures, and/or user defined non-camera-control gestures. In some embodiments, the AR processing data 1664 further includes one or more predetermined threshold for different gestures.

The HMD 1614 includes a communication interface 1615, a display 1630, an AR processing module 1645, one or more processors, and memory. In some embodiments, the HMD 1614 includes one or more sensors 1625, one or more haptic generators 1621, one or more imaging devices 1655 (e.g., a camera), microphones 1613, speakers 1617, and/or one or more applications 1635. The HMD 1614 operates in conjunction with the housing 1606 to perform one or more operations of a head-wearable device 1611, such as capturing camera data, presenting a representation of the image data at a coupled display, operating one or more applications 1635, and/or allowing a user to participate in an AR environment.

Any data collection performed by the devices described herein and/or any devices configured to perform or cause the performance of the different embodiments described above in reference to any of the Figures, hereinafter the "devices," is done with user consent and in a manner that is consistent with all applicable privacy laws. Users are given options to allow the devices to collect data, as well as the option to limit or deny collection of data by the devices. A user is able to opt-in or opt-out of any data collection at any time. Further, users are given the option to request the removal of any collected data.

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method of manufacturing a knitted fabric that includes a non-knitted structure, the method comprising:
    while knitting a fabric structure in accordance with a programmed knit sequence for a multi-dimensional knitting machine:
        providing a non-knitted structure to the multi-dimensional knitting machine at a point in time when the fabric structure has a first knit portion, wherein the first knit portion is formed based on a first type of knit pattern; and
        after the providing of the non-knitted structure, following the programmed knit sequence to automatically adjust the multi-dimensional knitting machine to use a second type of knit pattern, distinct from the first type of knit pattern, to accommodate the non-knitted structure within a second knit portion that is adjacent to the first knit portion within the fabric structure,
    wherein the fabric structure is configured to retain the non-knitted structure through contact with both the first knitted pattern and the second knitted pattern, and the non-knitted structure includes an electronic component.

2. The method of claim 1, wherein the non-knitted structure is provided to the multi-dimensional knitting machine via an insertion device that is distinct from the multi-dimensional knitting machine.

3. The method of claim 2, wherein the insertion device is passed through the multi-dimensional knitting machine.

4. The method of claim 2, wherein the insertion device is attached to the multi-dimensional knitting machine and feeds the non-knitted structure into the multi-dimensional knitting machine in accordance with the programmed knit sequence.

5. The method of claim 1, wherein the first type of knit pattern has a higher knit density than the second type of knit pattern.

6. The method of claim 1, wherein the first type of knit pattern uses a type of knit pattern than stretches more than the second type of knit pattern.

7. The method of claim 1, wherein the programmed knit sequence for a multi-dimensional knitting machine is configured to accommodate multiple non-knitted structures while knitting the fabric structure.

8. The method of claim 7, wherein one of the multiple non-knitted structures is a different material than the non-knitted structure.

9. The method of claim 7, wherein one of the multiple non-knitted structures is a different shape than the non-knitted structure.

10. The method of claim 1, wherein the non-knitted structure is a flexible circuit board.

11. The method of claim 1, wherein the non-knitted structure is an electrical wire or bundle of wires.

12. The method of claim 1, wherein the non-knitted structure is a semi-rigid support for providing rigidity to the fabric structure.

13. The method of claim 1, wherein the first knit portion and the non-knitted structure within a second knit portion have substantially the same stretchability.

14. The method of claim 1, including:
    after providing a non-knitted structure to the multi-dimensional knitting machine at a point in time when the fabric structure has a first knit portion, formed based on a first type of knit pattern, and before following the programmed knit sequence to automatically adjust the multi-dimensional knitting machine to use a second type of knit pattern:
        following the programmed knit sequence to automatically create a transition area where the fabric has a second type of knit pattern, wherein the second type of knit pattern allows for more movement of the non-knitted structure.

15. The method of claim 1, wherein the non-knitted structure is inserted such that it follows a meandering pattern along an axis, wherein the meandering pattern allows the non-knitted structure to stretch along the axis with knitted portions of the fabric structure.

16. The method of claim 1, wherein the second type of knit pattern can be a volumetric knit to allow for a non-knitted structure to be placed in a volume of the volumetric knit.

17. A method of manufacturing a knitting machine, comprising:
    providing a multi-dimensional knitting machine;
    attaching an insertion mechanism to the multi-dimensional knitting machine;
    interconnecting the multi-dimensional knitting machine and the insertion mechanism to a processor, wherein the processor is configured to cause:
        while knitting a fabric structure in accordance with a programmed knit sequence for the multi-dimensional knitting machine:

providing a non-knitted structure, via the insertion mechanism, to the multi-dimensional knitting machine at a point in time when the fabric structure has a first knit portion, formed based on a first type of knit pattern; and after the providing of the non-knitted structure, following the programmed knit sequence to automatically adjust the multi-dimensional knitting machine to use a second type of knit pattern, distinct from the first type of knit pattern, to accommodate the non-knitted structure within a second knit portion that is adjacent to the first knit portion within the fabric structure, wherein the fabric structure is configured to retain the non-knitted structure through contact with both the first knitted pattern and the second knitted pattern, and the non-knitted structure includes an electronic component.

18. A wearable structure with a knitted fabric that includes a non-knitted structure, the wearable structure comprising:

a fabric structure having a first knit portion, wherein the first knit portion has a first type of knit pattern that was formed in accordance with a programmed knit sequence for a multi-dimensional knitting machine; and the fabric structure also having a second type of knit pattern, distinct from the first type of knit pattern, to accommodate a non-knitted structure within a second knit portion that is adjacent to the first knit portion within the fabric structure, wherein the second knit pattern was formed in accordance with the programmed knit sequence for the multi-dimensional knitting machine, wherein the fabric structure is configured to retain the non-knitted structure through contact with both the first knitted pattern and the second knitted pattern, and the non-knitted structure includes an electronic component.

* * * * *